United States Patent [19]

Jurek

[11] Patent Number: 4,459,457
[45] Date of Patent: Jul. 10, 1984

[54] FEEDBACK WELDER CONTROL SYSTEM
[75] Inventor: Dennis J. Jurek, Grafton, Wis.
[73] Assignee: Square D Company, Palatine, Ill.
[21] Appl. No.: 430,448
[22] Filed: Sep. 30, 1982

Related U.S. Application Data
[63] Continuation of Ser. No. 197,426, Oct. 16, 1980, abandoned.

[51] Int. Cl.³ .............................................. B23K 11/24
[52] U.S. Cl. ..................................... 219/110; 219/114
[58] Field of Search ....................... 219/108, 110, 114; 323/205, 211, 212, 244, 246, 345

[56] References Cited
U.S. PATENT DOCUMENTS

| | | | |
|---|---|---|---|
| 3,588,438 | 6/1971 | Vanderheist | 219/110 |
| 4,104,724 | 8/1978 | Dix et al. | 219/108 |
| 4,271,387 | 6/1981 | Mukai et al. | 323/246 |
| 4,289,948 | 9/1981 | Jurek et al. | 219/110 |
| 4,302,653 | 11/1981 | Denning et al. | 219/110 |

Primary Examiner—C. C. Shaw
Attorney, Agent, or Firm—William H. Schmeling; Richard T. Guttman

[57] ABSTRACT

A control system for resistance welders of the type in which welding current is supplied to a workpiece through a transformer. The system assures weld quality by monitoring the change in resistance across the weld during the welding operation without the need for auxillary leads or separate sensing transducers at or near the workpiece and automatically terminates the welding current when a quality weld is made as determined by weld resistivity characteristics. The system monitors discrete changes in the characteristics of the current in the welding transformer which occur as a result of changes in weld resistance. Immunity to line voltage disturbances which cause charges in current characteristics unrelated to resistance change in the weld is achieved by the use of a modeling circuit which is subjected to the same line voltage disturbances as the actual welder circuit and which simulates the current characteristics of the actual welder but is unresponsive to the resistive changes which occur across the weld during the welding operation. The system compares the current characteristics of the modeling circuit with those of the actual welding current and terminates the welding current in response to the true resistance change which occurs during welding formation.

9 Claims, 46 Drawing Figures

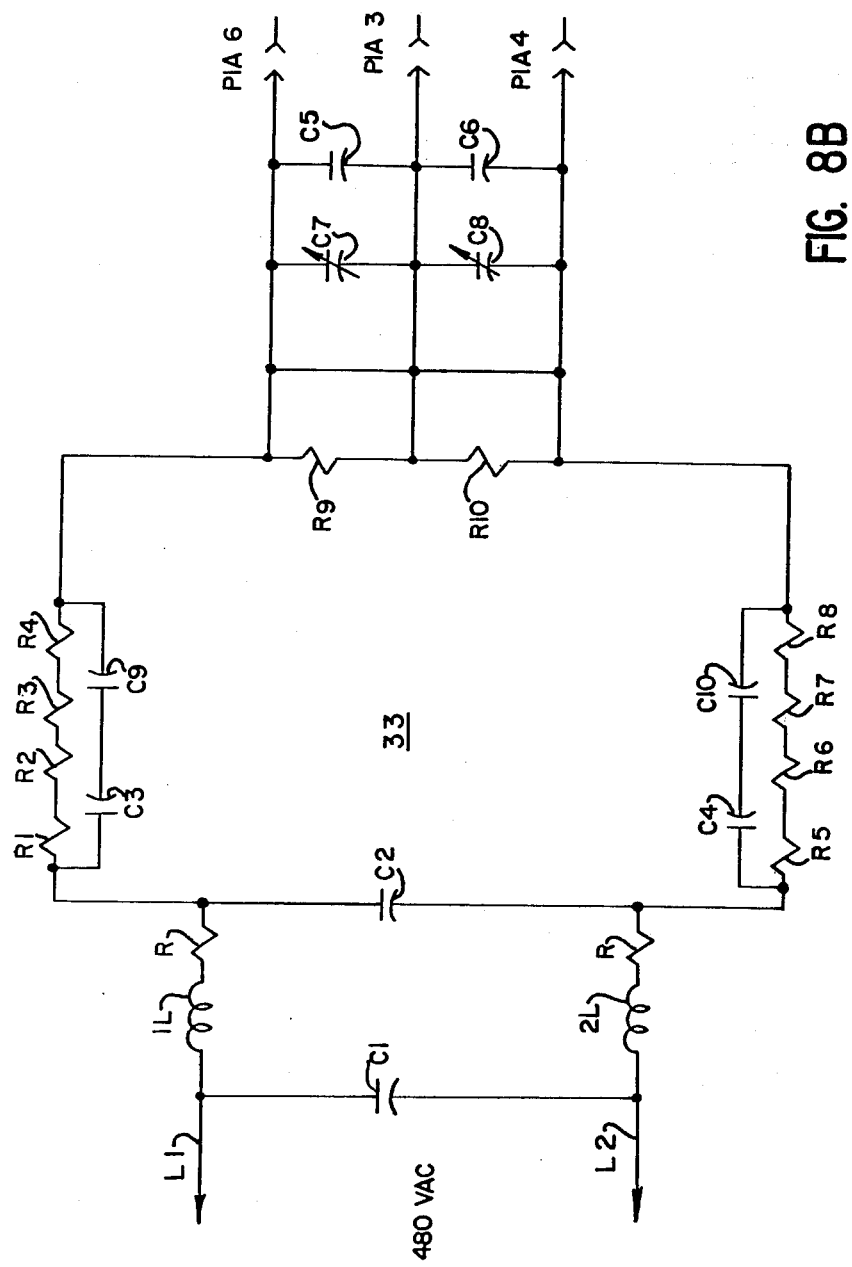

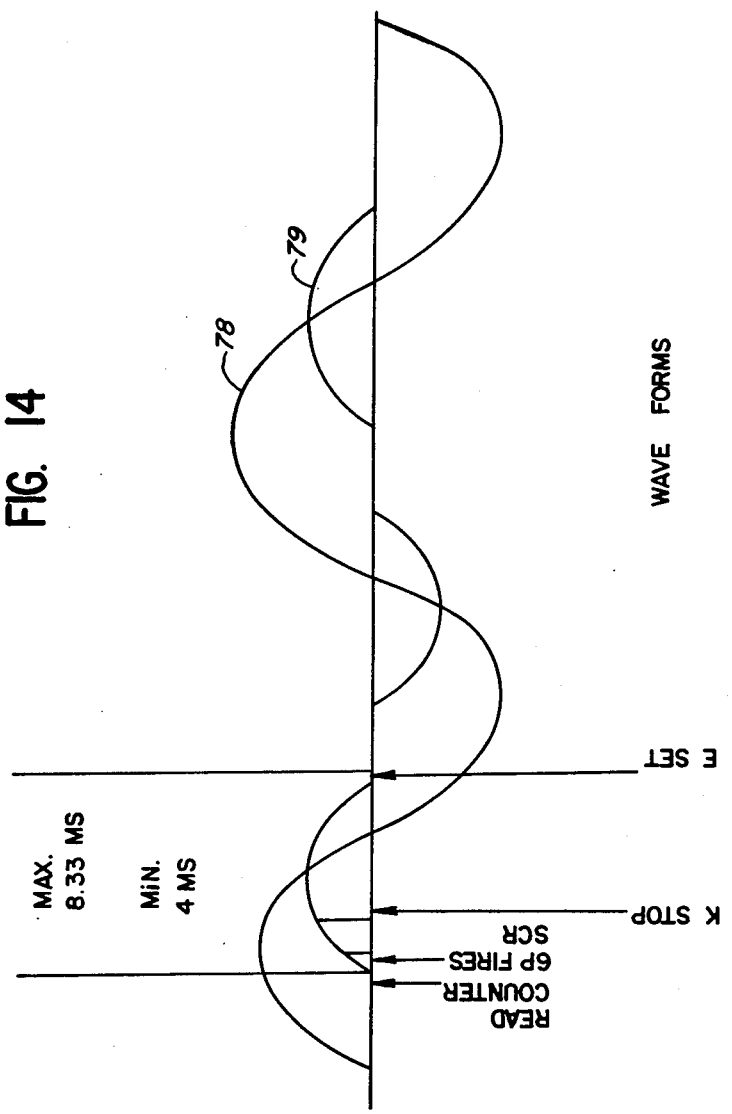

FIG. 15

| FUNCTION | SEQ 1 | SEQ 2 | SEQ 3 |
|---|---|---|---|
| SQUEEZE DELAY (CYCLES) | 40 | 40 | 40 |
| SQUEEZE (CYCLES) | 10 | 20 | 30 |
| WELD 1 (CYCLES) | 11 | 21 | 31 |
| PERCENT CURRENT (WELD 1) | 12 | 22 | 32 |
| COOL (CYCLES) | 13 | 23 | 33 |
| WELD 2 (CYCLES) | 14 | 24 | 34 |
| PERCENT CURRENT (WELD 2) | 15 | 25 | 35 |
| HOLD (CYCLES) | 16 | 26 | 36 |
| OFF (CYCLES) | 17 | 27 | 37 |
| MINIMUM WELD (CYCLES) | 18 | 28 | 38 |
| FEED BACK ADJUST | 19 | 29 | 39 |

| M.I.C.C. | | STEP 1 | STEP 2 | STEP 3 | STEP 4 |
|---|---|---|---|---|---|
| WELD COUNT | | 50 | 51 | 52 | 53 |
| SEQ 1 | %CURRENT-WELD 1 | 60 | 61 | 62 | 63 |
| | %CURRENT-WELD 2 | 64 | 65 | 66 | 67 |
| SEQ 2 | %CURRENT-WELD 1 | 70 | 71 | 72 | 73 |
| | %CURRENT-WELD 2 | 74 | 75 | 76 | 77 |
| SEQ 3 | %CURRENT-WELD 1 | 80 | 81 | 82 | 83 |
| | %CURRENT-WELD 2 | 84 | 85 | 86 | 87 |
| SEQ. SELECT-1-SEQ.1,2-SEQ.-1 2 3-SEQ.1 2 3 | | | | | 41 |

| | |
|---|---|
| ADJ DELAY (CYCLES) | 42 |
| DYNAMIC STEPPER DELAY (WELDS) | 43 |
| SPECIAL DUAL PULSE SELECTOR | 44 |

| DIAGNOSTICS | |
|---|---|
| FLASHING DISPLAY | MESSAGE |
| 99 | OVERRIDE TIME OUT |
| 98 | SCR HALF CYCLE |
| 97 | WELD TRANSFORMER OVER TEMPERATURE |
| 96 | SCR LOW WATER FLOW |
| 95 | SCR SHORTED |
| 94 | MICC-INVALID DATA |
| 93 | NON MICC %CURRENT INVALID |
| 92 | MICC % CURRENT DECREASING |

| STATUS INDICATORS | | |
|---|---|---|
| MICC STEP NUMBER | | 59 |
| MICC WELD COUNTER | | 58 |
| % CURRENT IN USE | | 90 |
| LOW LINE VOLTAGE COUNTER | | 93 |
| WELD COUNTER | 98 | 99 |

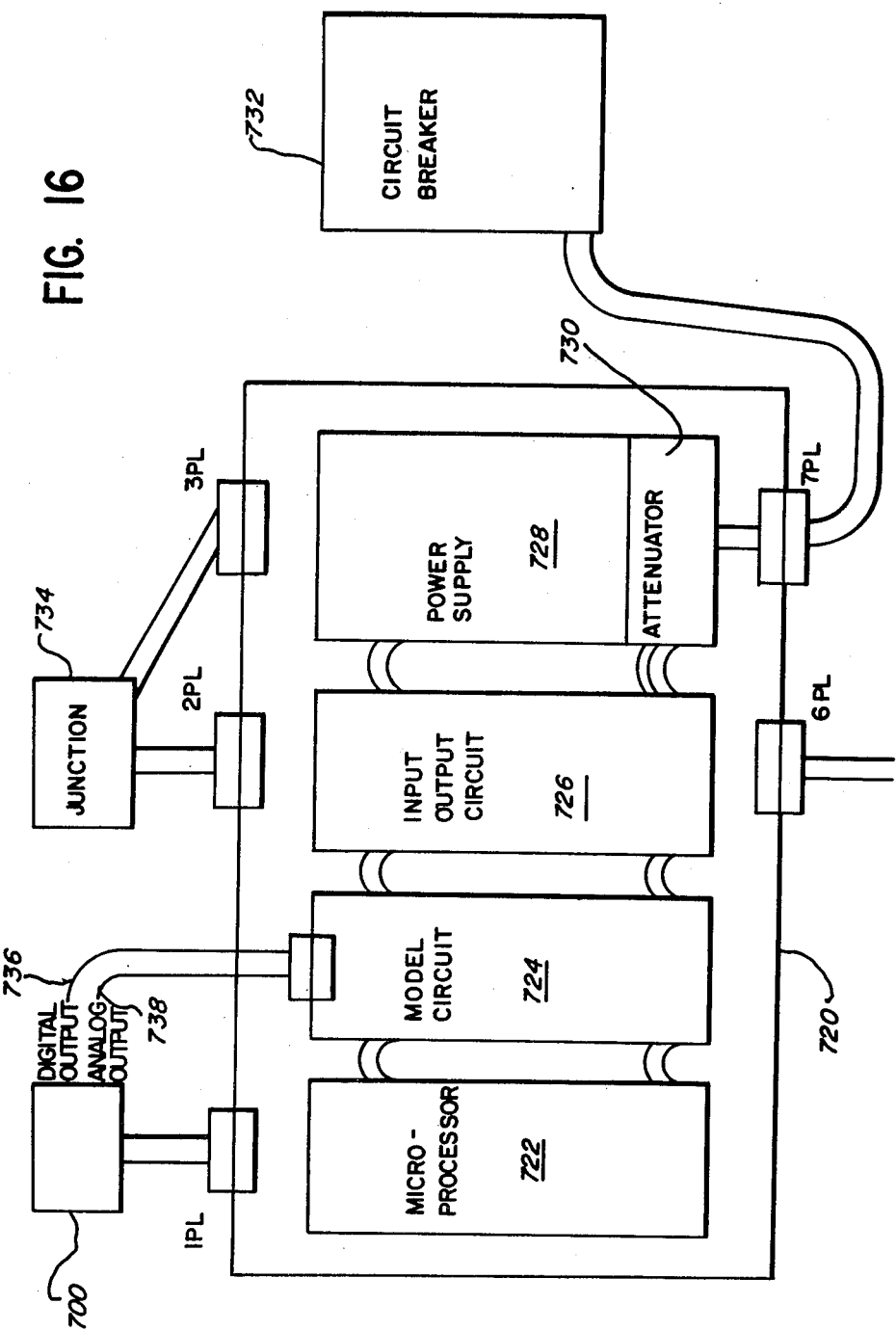

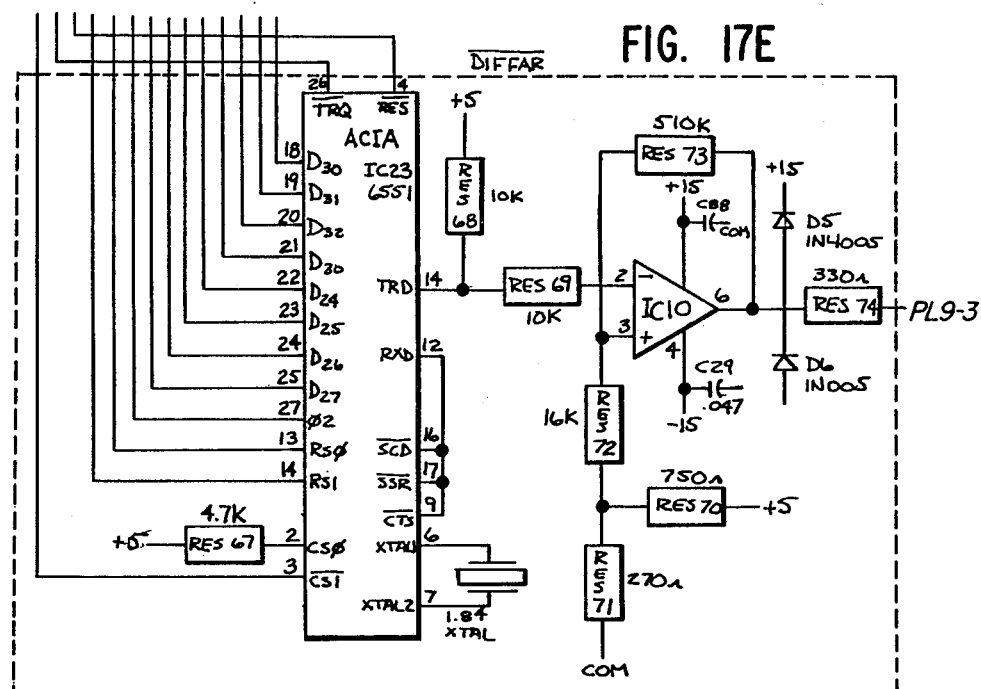
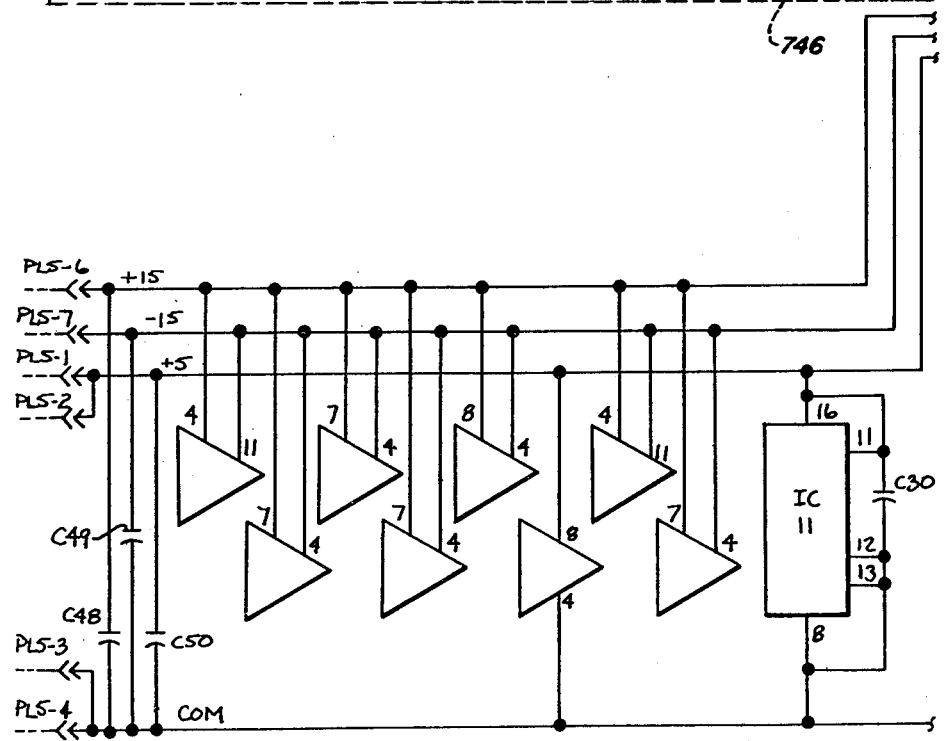
FIG. 17E

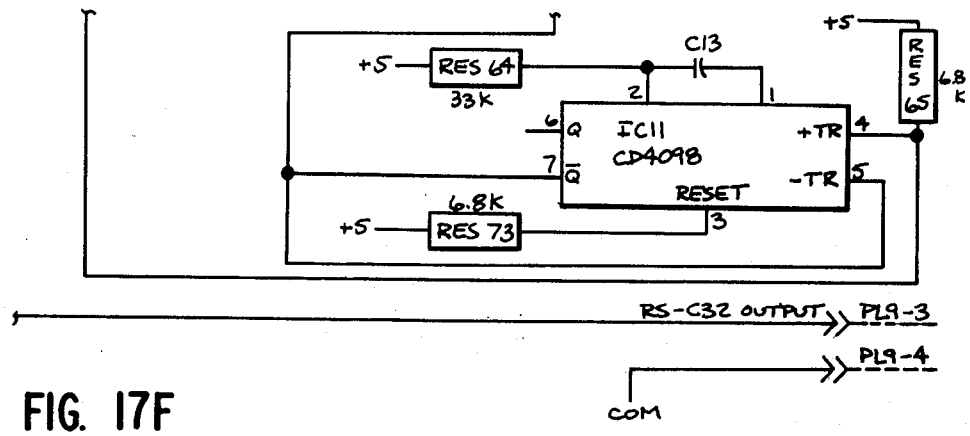
FIG. 17F
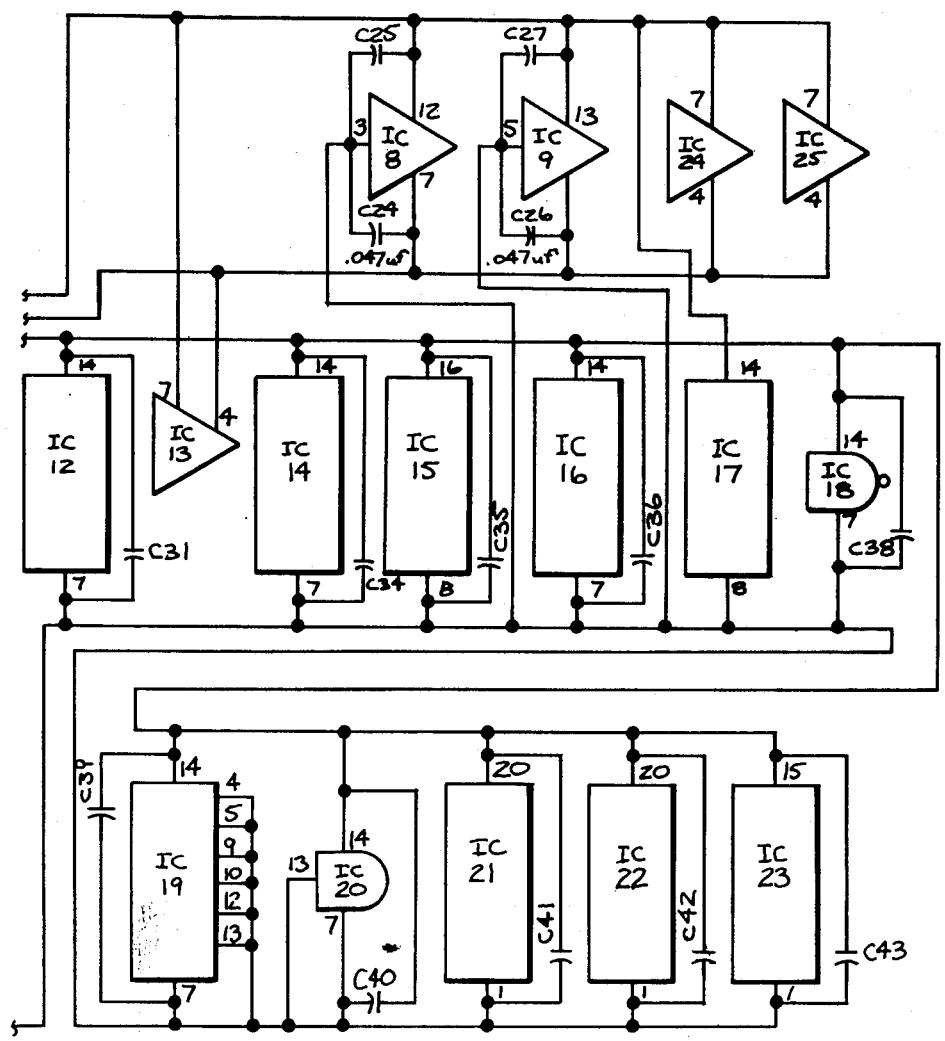

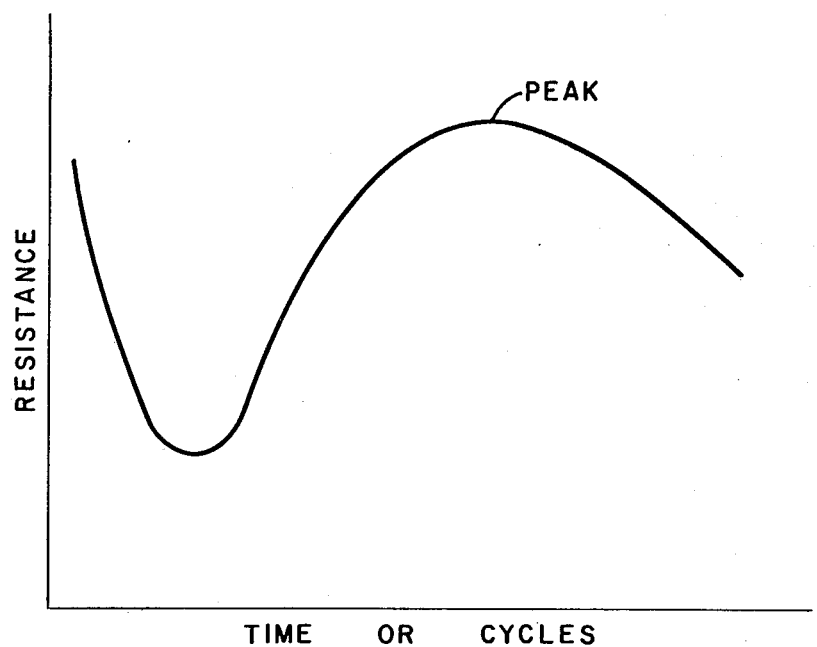
FIG. 18A  Resistance Curve For Bare Steel Welds
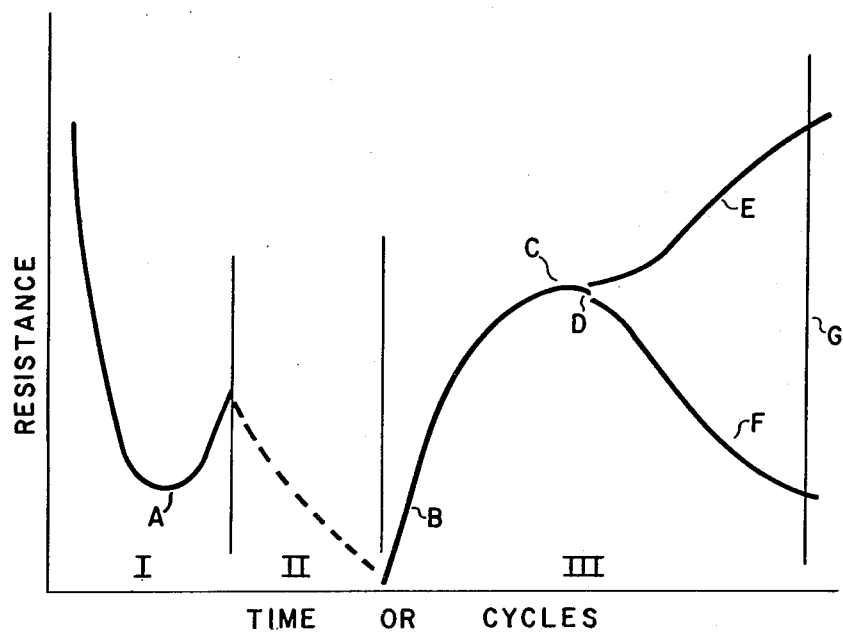
FIG. 18B  Resistance Curve Of Galvanized Steel Dual Pulse Welds

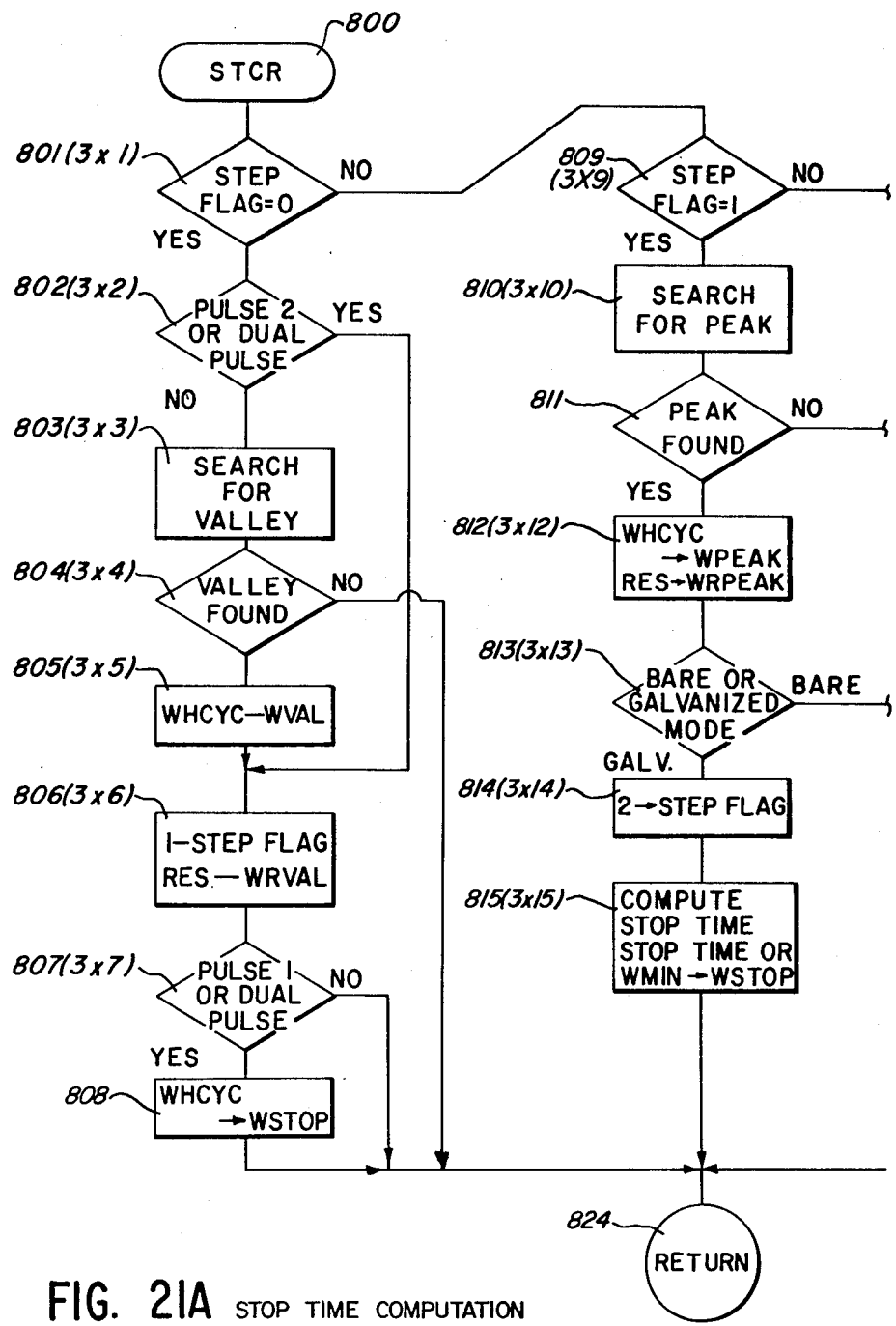
FIG. 21A STOP TIME COMPUTATION SUBROUTINE (STCR)

FIG. 22A TOUCH UP SUBROUTINE
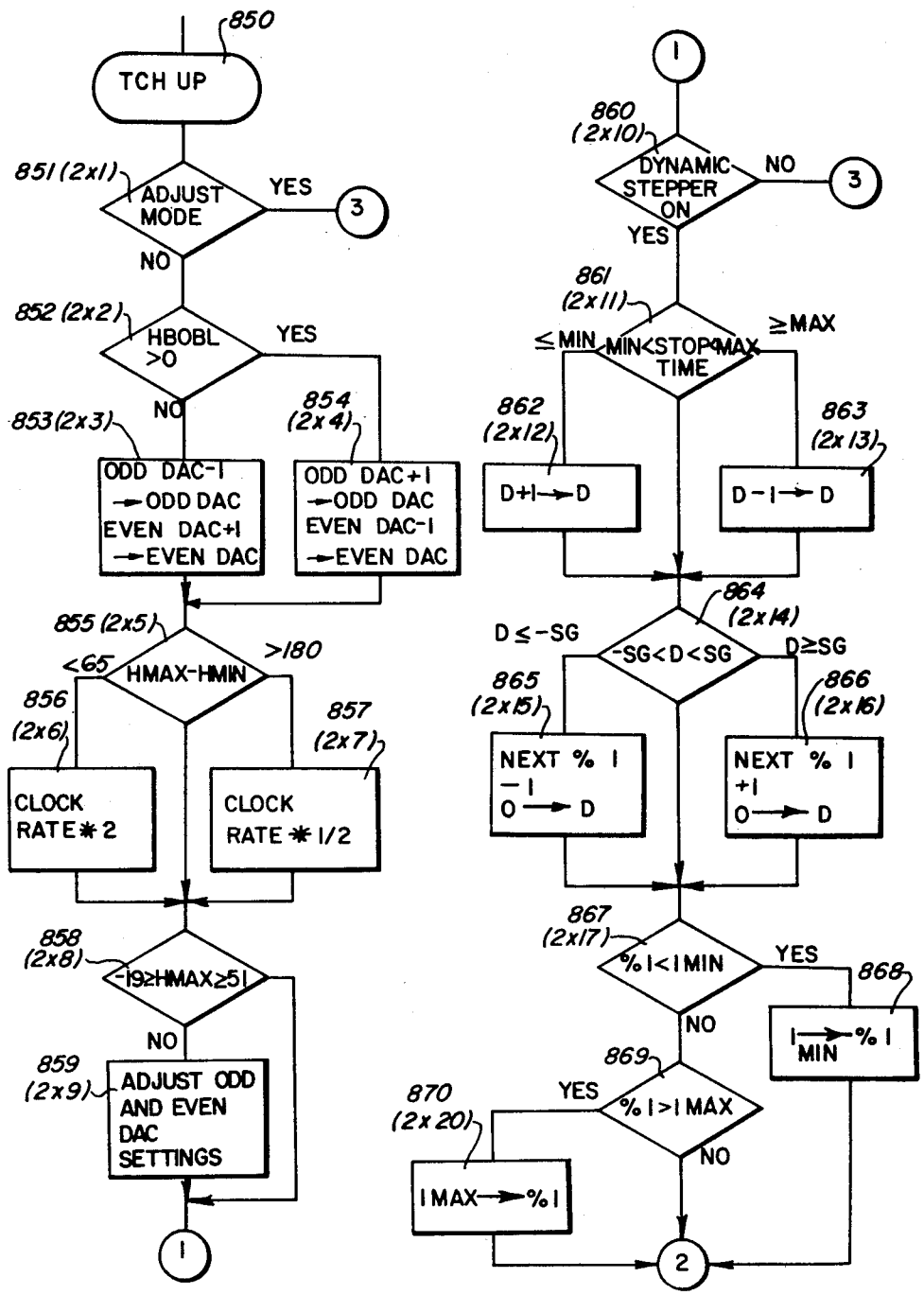

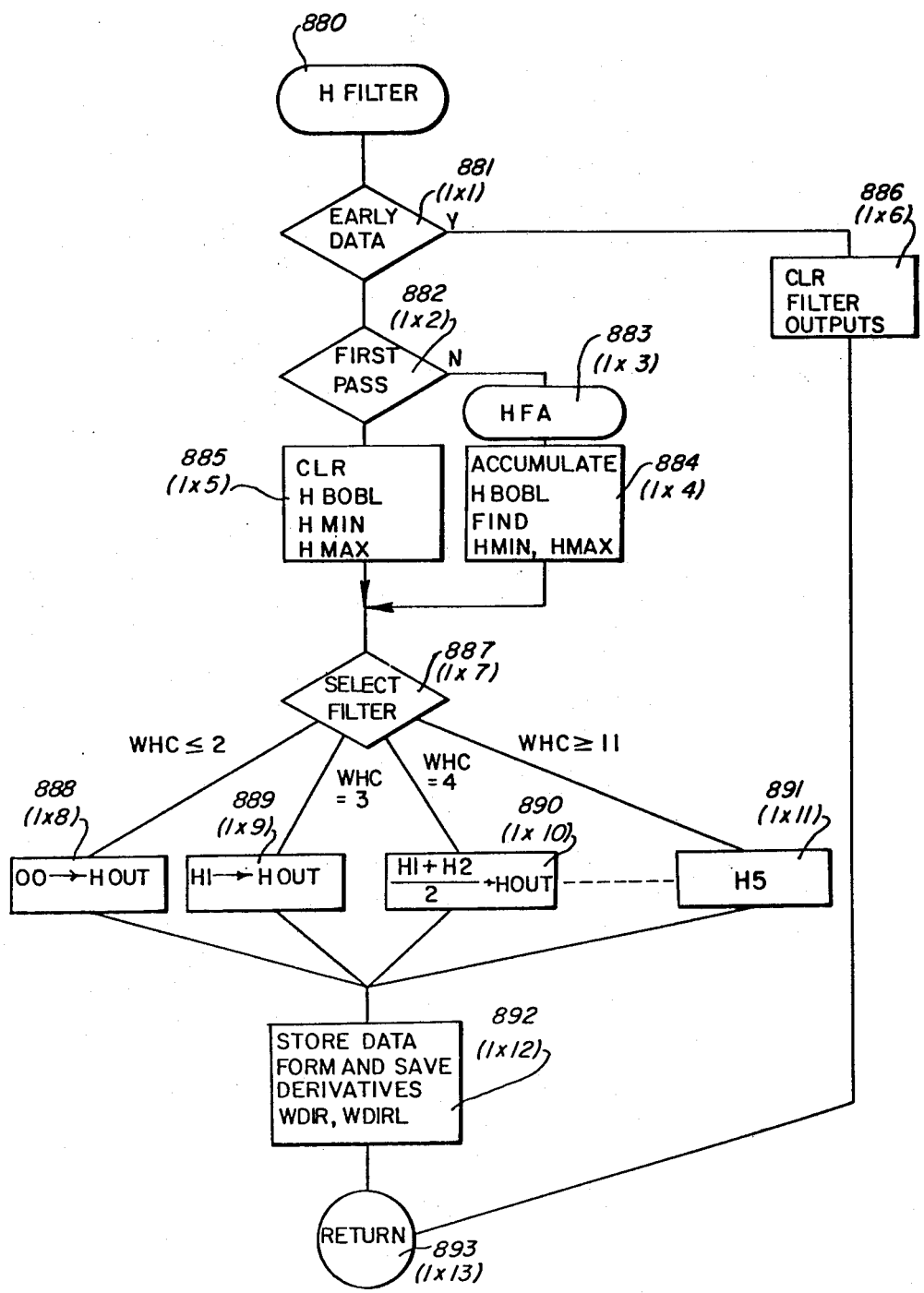
FIG. 23 FILTER SUBROUTINE

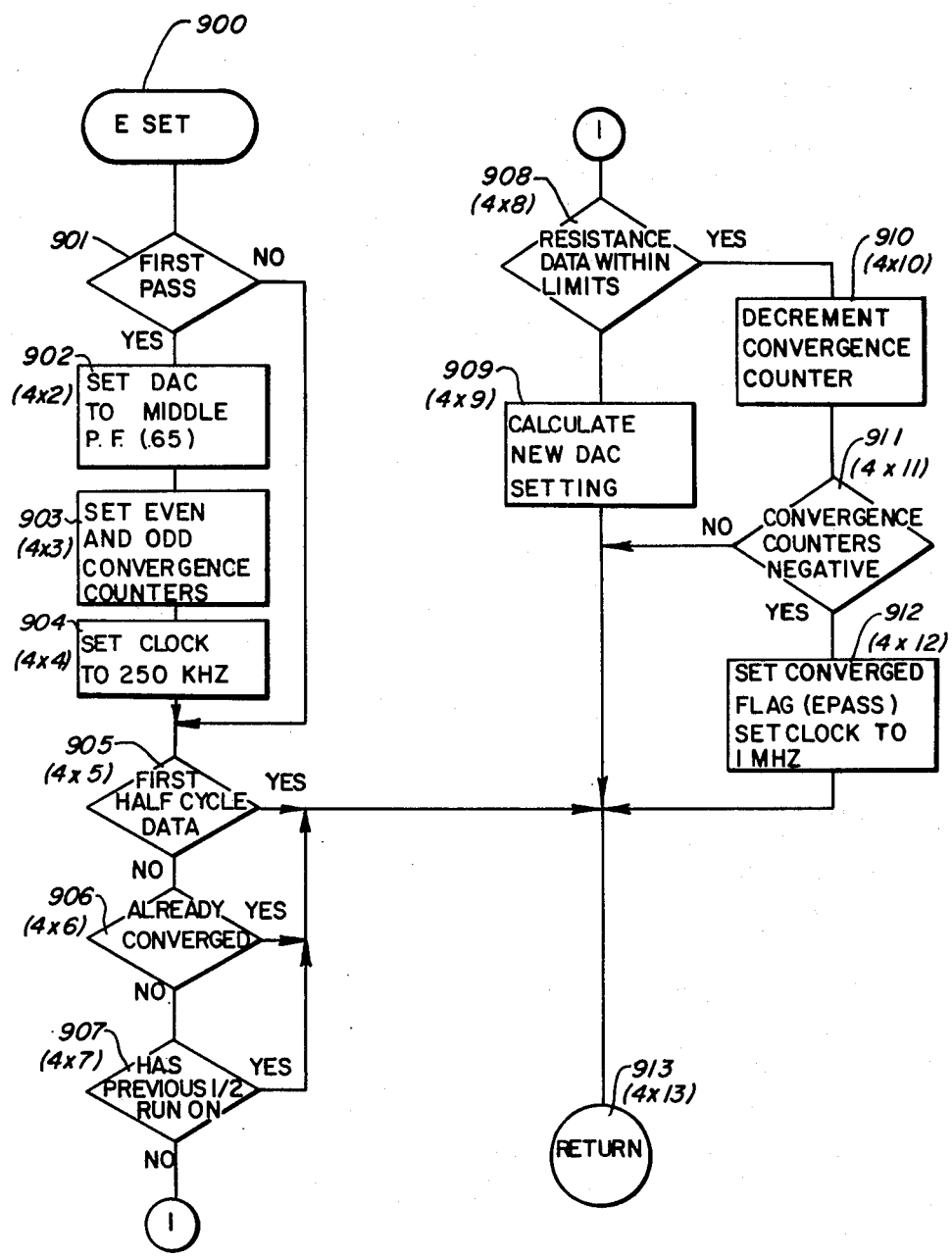
FIG. 24 THE FAST ADJUST SUBROUTINE (ESET)

FEEDBACK WELDER CONTROL SYSTEM

Control system which is immune to line voltage waveform disturbances. The control system senses changes in the power factor in the primary circuit of the welder to determine when a quality weld is made without requiring external leads or auxiliary devices in the secondary circuit of the welding transformer or positioning auxiliary sensing devices in the vicinity of the workpiece area.

The object of any resistance welding feedback welder control system is to sense the progress of the development of the weld nugget and to use this information for adjusting the weld schedule. One way of sensing the developing weld nugget is to measure the resistance across a weld as it is being formed and, based on changes in the measured resistance, terminating the weld when a desired resistance change has occurred. In short, the weld current is terminated when a fully formed weld is sensed through these resistance changes. Alternatively, the weld current can be changed to complete the weld in a preset time, or some combination of the above-mentioned techniques can be used.

Previously, methods used to sense the progress of the weld nugget have included detection of acoustical emissions, electrode movement, resistance changes in the workpiece, infra-red emission from the weld, and still others. In general, all such methods have required the placement of a sensor or some type of transducer with pick-up leads attached to, or in the immediate vicinity of, the welding electrodes where such sensing devices were vulnerable to accidental damage during the welding operation due to a number of factors, including heat generated by the welding process, welding flash, mechanical vibration, or physical damage such as severed leads, all of which can render the above feedback methods of sensing inoperative.

More recently, feedback welder control systems have been developed which utilize the measurement of resistance changes in the weld nugget without requiring auxiliary leads or sensing devices at or near the welding electrodes. The measurement of resistance change is accomplished indirectly by measuring the power factor during each half cycle of weld current and detecting the minute changes in power factor which occur as the resistance in the weld area changes. The technique of measuring changes in the resistance of a weld by observing very small changes in the power factor or phase angle of the weld current has a disadvantage, i.e., the system is sensitive to the line voltage waveform disturbances during the conduction interval. Previous attempts to overcome the problem of line voltage waveform disturbances have included an averaging technique in which a predetermined number of welds are evaluated to determine the level of energy to be delivered to the weld area for the next succeeding group of welds. One such approach is disclosed in the patent application entitled Power Factor Monitoring and Control System for Resistance Welding with Line Disturbance Immunity, Ser. No. 12,926, filed by the inventor Dennis J. Jurek on Feb. 16, 1979, and assigned to the assignee of the present invention. Although this system operates successfully under automated conditions where workpiece uniformity can be assured, it has been discovered that the averaging technique does not permit the system to respond to random changes in weld conditions such as may result from operator interaction, fit-up, surface contamination, and the like.

SUMMARY OF THE INVENTION

With this invention, the foregoing problems are substantially overcome. The feedback welder control system according to the present invention uses the resistance change technique of measuring weld progress and is immune to line voltage waveform disturbances in the AC supply to the welder. As recounted earlier in lesser detail, it is well known that the electrical resistance of a workpiece, as measured between the welding tips or electrodes, changes during formation of a weld nugget. This change in resistance is reflected in the primary circuit of the welding transformer as a small change in the power factor or phase angle of the weld current. By sensing or measuring this change in power factor or phase angle, it is possible to monitor the weld progress without attaching external transducers or pick-up leads in the vicinity of the welding electrodes or to the secondary circuitry, respectively.

However, many techniques of measuring a power factor change in weld current in the primary winding of the welding transformer are disadvantaged by their sensitivity to line voltage waveform disturbances which commonly occur in large factories having a multitude of welders and other pieces of electrical equipment connected to the same voltage source. In such an environment, the line voltage waveform disturbances have been found to cause changes in the power factor or phase angle of the weld current which are different from the power factor change which would have occurred solely as a result of the resistance change in the nugget area of the weld. In order to use the technique of measuring changes in the power factor as caused by a change in the resistance of a weld in an industrial environment, the monitoring circuitry must operate substantially as though it were independent of the line voltage waveform disturbances.

The immunity of the control system in accordance with the present invention may be accomplished by comparing the phase relationship between the weld currents of two identical welders operating simultaneously on the same line voltage so that both welders are subjected to the same line voltage waveform disturbances. A first of the two welders includes a workpiece between its welding tips or electrodes; the second welder serves as a reference and operates with its tips closed and without a workpiece. Both welders are subjected to the same line voltage waveform disturbances and therefore will respond identically to any given disturbance in the line voltage waveform. Thus, except for changes resulting from changes in the resistance of the workpiece in the first welder, the weld currents of the welders will remain in phase with one another regardless of line voltage waveform disturbances. Accordingly, differences in phase relationship of the weld current will occur as the resistance of the workpiece changes during a weld. In actual practice, the difference in phase relationship can be represented by the difference between the extinction angles of the weld currents in the welders i.e., the angle at which the weld currents pass through zero during each half cycle.

In one embodiment of this invention, the second welder is replaced by an electronic simulator or modeling circuit which produces, as an output, a voltage waveform which, ideally, is identical in shape and extinction angle to the primary current of the actual welder before the occurrence of any change in resistance of the workpiece. The electronic simulator circuit is adjusted to closely match the response of the actual welding circuit to the line voltage waveform. And for optimum immunity from line voltage waveform disturbances, the welder and the electronic simulator circuit should be conducting simultaneously for identical periods of time. Thus, by comparing the apparent power factor or phase angle of the welding circuit with that of the electronic simulator or modeling circuit, the difference which will be observed will be due exclusively to changes in the resistance of the workpiece in the actual welding circuit and not due to disturbances in the line voltage waveform. Differences in extinction time between the welder current and the electronic simulator circuit output may be measured with a high speed counter and clock during each half cycle of weld current. For small changes in weld resistance, as are normally experienced in resistance welding, there is a linear relationship between the change in resistance and the counter output. Thus, a measure of the workpiece resistance is available at the end of each half cycle of the weld current.

By observing the progression of the changes in the work pieces resistance as the weld is being made, the feedback welder control system determines on a half-cycle-by-half-cycle basis when the weld current should be interrupted. The resistive curve formed by plotting the resistance versus time of a number of half cycles of weld current take on the characteristic shape and height of a dynamic resistive curve applicable to the materials being joined together by the weld. Further, the circuitry of the present invention may use a pattern recognition technique on a half-cycle-by-half cycle basis to extract from the curve a plurality of quantitative features in determining when the resistive changes have proceeded along an appropriate path indicative of a formation of a satisfactory weld nugget. These features may include: (1) Area—the area under the dynamic resistive curve must be within the lower and upper limits set for the particular metal being welded; (2) Convexity—the measure of curvature which is taken as positive for a curve with a center higher than either end and, again, this curvature is checked against upper and lower limits for the particular metal being welded; and, (3) Drop—the drop in resistance from the peak value which is generally the most indicative of a weld completion although this characteristic is the most prone to spurious high or low amplitude data errors. Once a weld has been initiated, it will be terminated only if all of the preselected curve features simultaneously fall within the operator-determined limits, or failing this, when the maximum allowed number of weld cycles, as programmed by the operator, are expended, such as disclosed in U.S. Pat. No. 4,104,724 ('724 patent), entitled Digital Welder Control System, issued Aug. 1, 1978, to James Dix, et al, and incorporated herein by reference.

The above-mentioned pattern recognition technique is particularly suited for use with bare steel welds having the classic dynamic resistance curve, as shown in FIG. 3A. However, when a variety of steel materials are to be welded together, including galvanized steel to galvanized steel or a plurality of steels of varying thickness, a second recognition technique may be used with a slightly modified modeling circuitry. This second recognition technique includes a single recognition parameter for bare steel, a predictive recognition parameter for galvanized steel and a blanking recognition parameter for steels of varying thicknesses.

The predictive recognition technique may be used instead of the pattern recognition technique for bare steel in the case of welding galvanized steel to determine a quality weld. The blanking recognition technique automatically ignores the first current pulse in a dual pulse weld sequence and approximately one-half of its second pulse leaving approximately the remaining half of the second current pulse for determining a quality weld when steels of varying thicknesses are to be welded together. In the case of bare steel, only a single parameter may be used and that is the resistance drop from the peak in the classic dynamic resistive curve to a predetermined amount of resistive drop indicating a quality weld.

Once any of the foregoing types of welds are initiated, they will be terminated when the predetermined limits are satisfied or the maximum allowed number of predetermined weld cycles are expended. In the case of expulsion, which is highly indicative of a proper weld nugget formation, the weld current will be terminated before the present limits are reached.

It is an object of the present invention to provide a feedback welder control system with immunity from line voltage waveform disturbances which utilizes a circuit means for sensing the changes in the power factor in the windings of a welding transformer during the formation of a weld to provide a feedback signal which indicates when a weld is completed without attaching external leads to the electrodes of the welder or placing a transducer in the vicinity of said electrodes.

Another object is to provide a feedback welder control system which senses a change in the power factor of the weld current in the primary circuit of the welding transformer during a weld and which uses a feedback signal responsive to sensed changes in the resistance of the workpiece between the electrode tips so that the weld current is terminated after a proper weld nugget is formed without the feedback signal being affected by line voltage waveform distortions.

An additional object is to provide a control for a resistive welding apparatus with a means that provides a weld signal indicative of the current through a pair of welding electrodes when selected parts to be welded together are positioned between the electrodes and a model signal indicative of a model current through the electrodes when the selected parts are absent from a position between the electrodes and means for measuring intervals between the model signal and the weld signal and interrupting the welding current when a measured interval is at least equal to a preselected value.

Other objects and advantages will become apparent from the description wherein reference is made to the accompanying drawings illustrating the preferred embodiments of the invention.

BRIEF DESCRIPTION OF THE DRAWINGS

FIG. 14 shows the relative timings of specific events in relation to the welder supply voltage and current waveforms FIG. 15 is a front elevation of a sequence module for use with a different embodiment of the invention;

FIG. 16 is a modified block diagram of module interconnections for the feedback welder control system of FIG. 15;

FIGS. 17(A–F) show portions of a circuit diagram of the apparatus in FIG. 16.

FIGS. 18A and 18B shows waveforms of resistance curves for bare and galvanized steel, respectively;

FIGS. 21A and 21B show a block diagram of a flow chart of the stop-time computation subroutine referred to in FIG. 20;

FIGS. 22A and 22B show the block diagram of a flow chart of the touch-up subroutine referred to in FIG. 20 and;

FIG. 23 shows a block diagram of a flow chart of the filter subroutine referred to in FIG. 20 used in embodiment in FIG. 15;

FIG. 24 shows a block diagram of a flow chart of the fast adjust subroutine used in the embodiment of FIG. 14.

DESCRIPTION OF A BASIC EMBODIMENT

The term "power factor" is conventionally defined as the cosine of the phase angle between the voltage and the current under conditions of continuous sinusoidal excitation. It is used in the preceeding and following descriptions in a qualitative sense to include the case where the voltage and current waveforms are chopped or discontinuous as is commonly the case in SCR controlled systems such as resistance welders. In both the chopped or discontinuous case and the continuous case, the qualitative effect is the same, i.e. a higher power factor in an inductive circuit results in earlier current extinction (zero crossing in the continuous case) relative to the applied voltage waveform and a lower power factor results in later current extinction.

Figure 1:
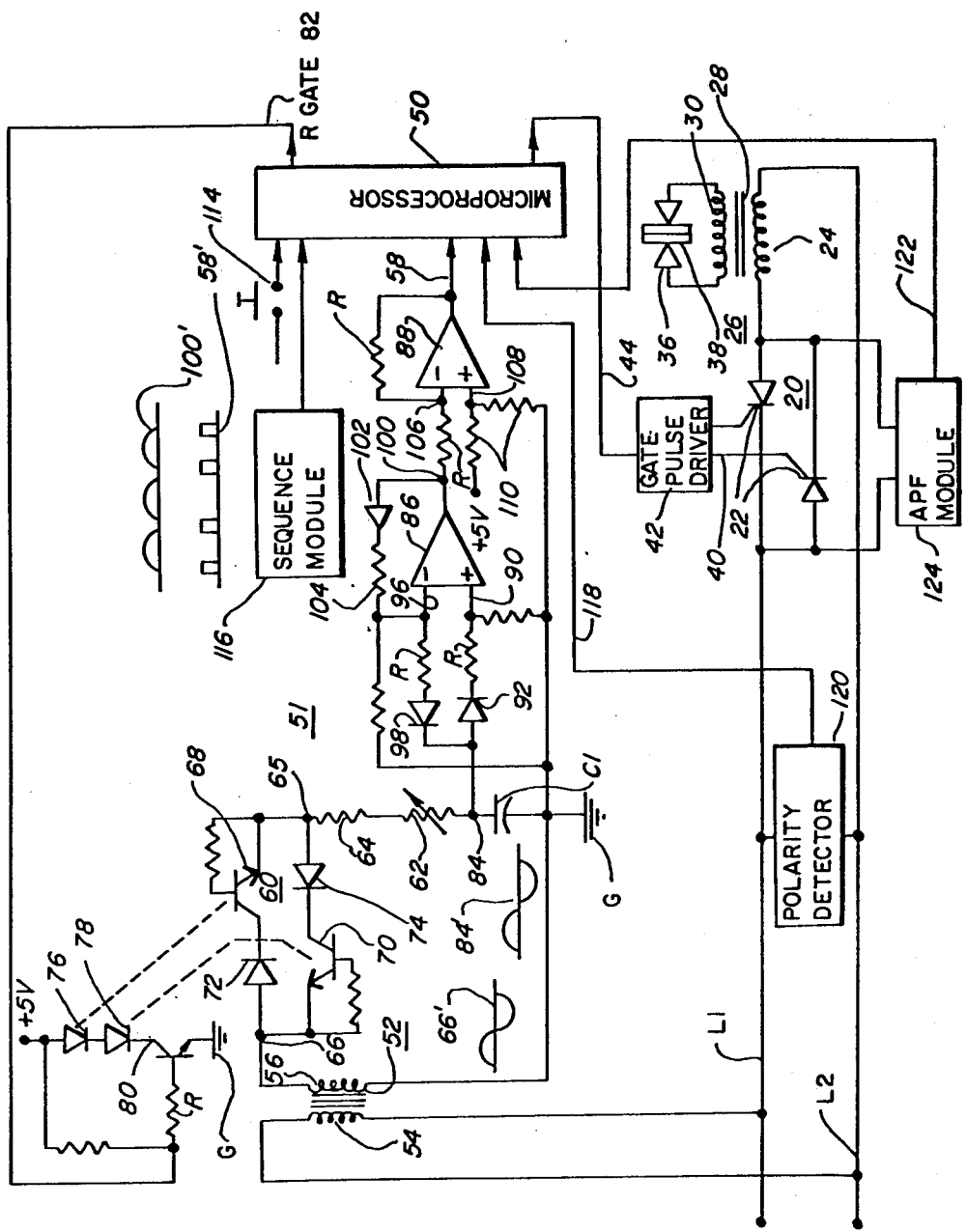
FIG. 1 shows a partial block and schematic representation of a power factor monitoring and control system for resistance welding embodying the principles of the present invention.

Referring to FIG. 1, a welding contactor 20 includes a pair of inversely connected thyristors (SCR's) 22 that control current delivered to a primary winding 24 of a welding transformer 26 from an alternating current source connected to lines L1 and L2. The transformer 26 includes the primary winding 24, an iron core 28 and a secondary winding 30. The secondary winding 30 is connected in a secondary circuit including a pair of welding electrodes 36 with work pieces 38, to be welded together, clamped between the electrodes 36.

The current conduction of the thyristors 22 is controlled by output signals 40 from a gate pulse driver circuit 42. The output signals of the gate pulse driver circuit 42 in turn are controlled by a signal 44 that is furnished by a microprocessor 50 as will be later described. A simplified form of a simulator or modeling circuit 51 according to the present invention includes a transformer 52 having a primary winding 54 connected to lines L1 and L2 to energize a secondary winding 56. The secondary winding 56 supplies power to the circuit 51 and provides an output signal 58 that serves as an input to the microprocessor 50. The secondary winding 56 is connected through a full wave switching circuit 60 to impress a voltage signal across a series circuit including potentiometer resistor 62, a resistor 64 and a capacitor C1. The capacitor C1 has one side connected through a junction 84 and the series circuit including the potentiometer resistor 62 and the resistor 64 to a terminal 65 of the full wave switching circuit 60. The other terminal 66 of the circuit 60 is connected to one side of the secondary winding 56. The other side of the secondary winding 56 is connected to a ground G and the other side of the capacitor C1.

The full wave switching circuit 60 includes a pair of oppositely poled transistors 68 and 70 and diodes 72 and 74. The transistors 68 and 70 are of the light sensitive type which conduct when exposed to light from an external source. The diode 72 and the transistor 68, connected in series, are polarized in their associated circuit to conduct current from the terminal 66 to 65. The diode 74 and the transistor 70 are likewise connected in series, but are polarized to conduct current from the terminal 65 to the terminal 66. The transistors 68 and 70 receive switching illumination from light emitting diodes 76 and 78 which have their conduction controlled by a transistor 80. The transistor 80 is part of a switching circuit that responds to a R-GATE signal 82 from an output of the microprocessor 50. The transistor 80 has its collector connected through the diodes 76 and 78 to a positive supply and its emmitter connected to a ground G. The base of the transistor 80 is connected through a baseload resistor R to receive the R-GATE signal 82 output signal of the microprocessor 50.

The leading edges of the signals 44 and 82 occur simultaneously. The signal 44 consists of a voltage pulse of short duration which occurs during each half cycle of voltage across lines L1 and L2 when current flow through the SCR's 22 is to be initiated. The signal 82 is initiated simultaneously with the initiation of the signal 44 and continues until the signal 58 indicates that the voltage at the junction 84 is zero. The voltage signal at the junction 84 is analogous to the signal which would be provided by actual welding current through the primary winding 24 of the welding transformer 26. The term analogous as used herein, means that the voltage waveform at the junction 84 and the current waveform in the primary winding 24 are substantially identical in time of initiation, shape, and time of extinction when the resistor potentiometer 62 is properly adjusted as will be later described.

The circuit 51 includes a section that converts the signal appearing at the junction 84 to the input signal 58 of the microprocessor 50. The circuit includes a pair of operational amplifiers 86 and 88. The operational amplifier 86 has its non-inverting input 90 connected through a resistor R and a diode 92 to the junction 84. An inverting input 96 of the amplifier 86 is connected through a resistor R and a diode 98 to the junction 84. The negative feedback of the operational amplifier 86 is provided by a series circuit that is connected between an output 100 of the operational amplifier 86 and the inverting input 96. The negative feedback circuit includes a diode 102 and a resistor 104. The operational amplifier 88 has an inverting input 106 connected through a resistor R to the output 100. The non-inverting input 108 of the operational amplifier 88 is connected to a voltage divider comprising a pair of equal impedance resistors 110 that are connected between a 5 V source and ground so that a bias voltage of approximately 2½ V is present at input 108. The negative feedback of the amplifier 88 is provided through a resistor R connected between the output of the amplifier 88 and the inverting input 106.

The signals appearing in the modeling circuit 51 at the various junctions in the circuit are as follows. The terminal 66 has a fullwave alternating voltage designated as 66' impressed thereon from the transformer 52. The fullwave signal at the terminal 66 is modified by the circuits including the fullwave switching circuit 60 and the resistors 62 and 64 in the charging circuit of the capacitor C1. The voltage signal shown by the wave 84' appears across the capacitor C1 as a series of alternate polarity half cycle voltage pulses which are analagous to the pulses of current in the welding transformer 26. The signal at junction 84 is converted by the circuit that includes the amplifier 86 and appears at the output 100 as precision fullwave rectified voltage pulses as shown on the curve designated as 100'. The output provided by the operational amplifier 88, which acts like an inverting comparator, is a series of pulses shown on the waveform labeled 58'. The pulses at output 58 occur during the interval between each of the voltage pulses of waveform 100'.

The operation of the microprocessor 50 is described in the U.S. Pat. No. 4,104,724 which was granted on Aug. 1, 1978, to the inventors James A. Dix, et al and assigned to the assignee of the present invention. In the '724 patent, the functions provided by an initiating switch 114, a welder sequence module 116, and a lead trail signal 118 which is provided by a polarity detector 120 connected between lines L1 and L2, are fully described. As described in the '724 patent, a signal 122 is provided by an automatic power factor (APF) module 124. The module 124 has a pair of input leads connected across the contactor 20 so as to be responsive to the voltage appearing across the parallel-connected SCR's 22. During current flow through the transformer primary 24, i.e. when the SCR's 22 are conducting, no significant voltage drop appears across the contactor 20. When neither of the SCR's 22 are conducting, a voltage will appear across the contactor 20 and provide an input to the APF module 124. The output signal 122 of the APF module 124 is an input to the microprocessor 50, and when current is flowing in the transformer primary 24, the signal 122 is present. During the interval when the SCR's 22 are non-conducting, the signal 122 input to the microprocessor 50 will be absent.

The microprocessor system 50, consisting preferably of an 8-bit Motorola M6800 microprocessor and its associated memory and various ancillary devices, receives the line voltage polarity information via the signal 118 as well as the state of conduction of the SCR welding contactor 20 as signal 122. The microprocessor 50 generates appropriately timed SCR welding contactor gate signals 44 and feeds the gate signals via the gate pulse driver 42 to gates of the welding SCR's 22 based on operator input data such as the desired welding current, the duration of the weld, etc., stored via a sequence module 116 as fully described in the '724 patent. Based on an analysis of the relative timing representing a change in power factor between the modeling circuit 51 output signal 58 and the cessation of the conduction of the welding current through the SCR's 22 represented by the output signal 122, the microprocessor 50 terminates the weld period.

Figure 2:
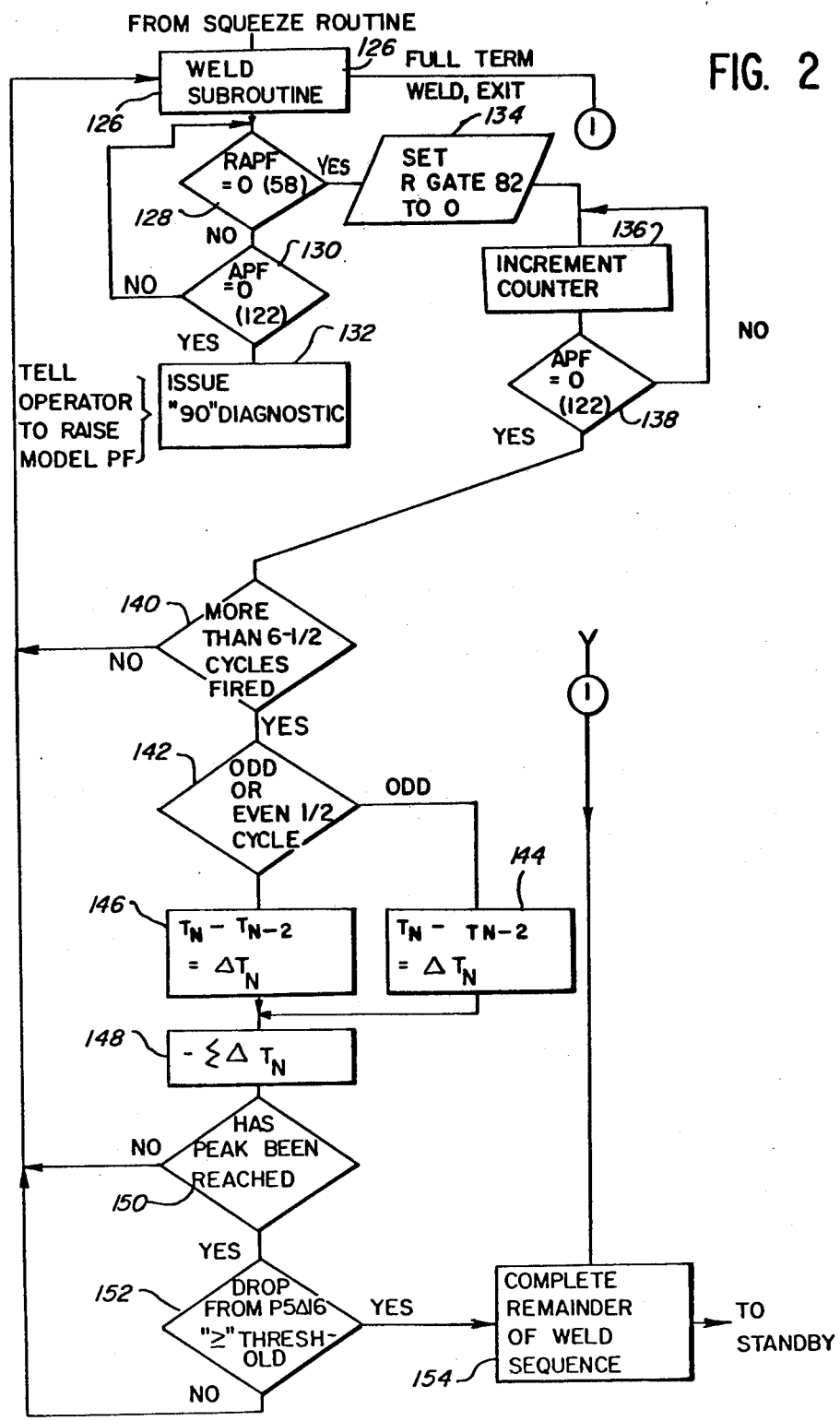
FIG. 2 is a block diagram of a flowchart utilized by the microprocessor in FIG. 1.

Turning to the flow chart as shown in FIG. 2, the operation sequence of the welding control system is similar to that described in the '724 patent with the exception of the measurement of the timing periods. Upon initiation of a weld sequence and the completion of the squeeze time, the microprocessor 50 leaves the squeeze routine and enters a weld subroutine 126. The weld subroutine 126 includes certain checks and timing information necessary to fire the SCR welding contactor 20 at the appropriate time. Upon generation of the SCR gate signal 44 which initiates the firing of the SCR welding contactor 20, the microprocessor system 50 issues the R-GATE signal 82 which switches the transistor 80 into a conducting state and initiates the operation of the modeling circuit 51.

Control is then transferred to a decision block 128 which tests the state of the signal 58. If the signal 58 is not a logic zero, control is transferred to block 130. If the signal 58 is a logic zero, control is transferred to an output block 134 the significance of which will be later described. Block 130 then tests the state of the signal 122. If the signal 122 is a logic zero, control transfers to a block 132. The significance of the operation of the block 132 will be later described. If the signal 122 is a logic 1, control transfers from the block 130 and is returned to the block 128. The control remains in a loop defined by the blocks 128 and 130 until one of the signals 58 or 122 is detected as a logic zero. If the signal 58 is detected as a logic zero prior to the detection of the signal 122 as a logic zero, control transfers to block 134. If the signal 122 is detected as a logic zero prior to the detection of the signal 58 as a logic zero, control transfers to block 132.

Output block 134 sets the R-GATE 82 signal to a logic zero which terminates conduction of transistor 80 and results in a turnoff of the switching circuit 60 thus simulating the action of the weld contactor 20. Control is then transferred to the timing loop made up of blocks 136 and 138. Block 136 increments a timing counter within the microprocessor 50 for every traverse of the loop made up of blocks 136 and 138. Decision block 138 terminates the traverse of the loop when the signal 122 becomes a logic zero indicating extinction of the actual welder current. Thus the loop counter in the block 136 contains a count of the number of traversals of the loop defined by blocks 136 and 138 which is a measure of the time interval between the switching of the signals 58 and 122 in that order to a logic zero. Control then transfers to a block 140.

As previously mentioned, if the signal 122 becomes a logic zero prior to the signal 58 becoming a logic zero, control is transferred to the block 132. This occurs when the potentiometer 62 in the modeling circuit 51 is improperly adjusted causing the signal at the junction 84 to extinguish after the actual welder current extinguishes. Block 132 issues a diagnostic message advising the operator to increase the power factor of the modeling circuit by adjusting potentiometer 62. The potentiometer 62 is incrementally adjusted and another weld is initiated. The adjustment of the potentiometer 62 is repeated until welds are completed without a diagnostic message from block 132.

The decision block 140 is used to prevent an analysis of the timing data occuring during the first few half cycles of a weld period because the resistance of work piece 38 varies indeterminately during the beginning of the period and thus does not produce reliable data. The timing data occuring during the first four half cycles of the weld period is ignored by the block 140 and the results of half cycles 5 and 6 are retained and respectively stored in the odd or even memory storage locations in a block, not shown of the microprocessor 50. Control of the weld is returned from the decision block 140 to the weld subroutine 126 during the first six half cycles of the weld period. Beginning with the seventh half cycle, the decision block 140 control is transferred to a decision block 142 which determines whether a half cycle under consideration is numerically odd or numerically even. In the case of the seventh half cycle, which is odd, the control is transferred to an arithmetic block 144 where the time T7, in 5 microsecond increments, has subtracted from it the time of the previous odd half cycle, e.g. time T5. Therefore, the arithmetic equation is $T_n - T_{n-2} = \Delta T_n$. Thus, the result of this subtraction forms Delta T7. In the next half cycle which is an even numbered half cycle, an arithmetic block 146 is used as a control to form Delta T8 which is equal to time T8 minus time T6 ($\Delta T8 = T8 - T6$). In this manner, the Delta T's for all the subsequent half cycles are formed. Preferably the Delta T's are determined on an odd minus odd and even minus even basis to cancel polarity sensitive timing errors such as rectification at the welding tips due to oxide and other impurities, or unequal response times of the SCR's in the welding contactor 20.

It can be demonstrated that for small changes in resistance, the Delta T's derived in the foregoing manner are proportional to the negative time derivative of the resistance versus time function of the dynamic resistance curve produced during the progress of a weld. To reconstruct a numerical representation of the resistance versus time function suitable for analysis by the microprocessor, it is necessary to form a negative integral of the Delta T function. In numerical terms, this is accomplished by a summation operation performed in summation block 148. If the output of the block 148 is plotted with respect to time or weld cycles, a curve similar to FIG. 3B results which is an approximation of the dynamic resistance curve shown in FIG. 3A. The height of the curve in FIG. 3B at any instant is equal to sum of the preceding Delta T's.

Figure 3A:
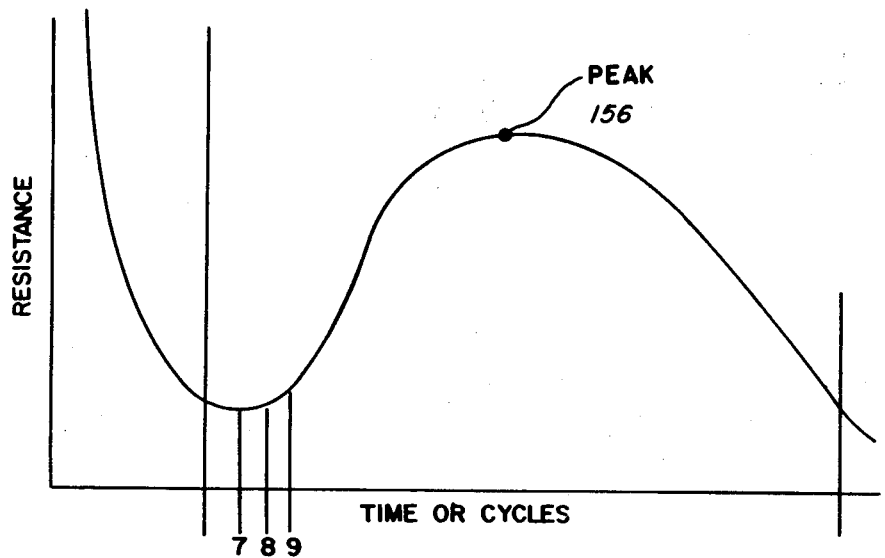
FIG. 3A shows the characteristic dynamic resistance curve of mild steels in resistance welding occurring during the half cycles of a weld.
Figure 3B:
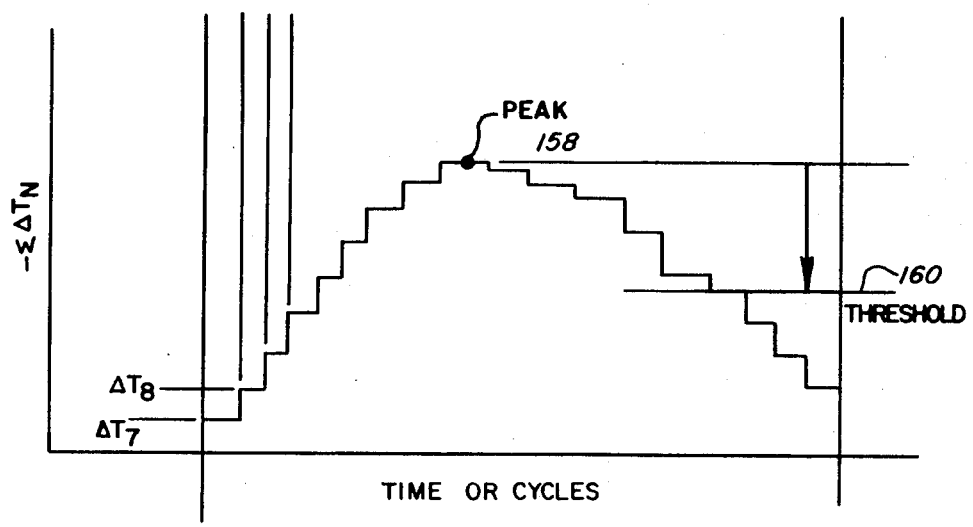
FIG. 3B illustrates graphically the reproduction of the curve in FIG. 3A by the controller of FIG. 1.

Studies of weld strength versus resistance of the weld area demonstrate that a quality weld is achieved if weld current is continued until the resistance across the weld is reduced a predetermined amount after peak 156 in FIG. 3A is reached, also approximated by the peak 158 in FIG. 3B. A decision block 150 determines if a peak in the data from the block 148 has occurred. If a peak is reached, a decision block 152 measures the drop from the peak value 158 in FIG. 3B and compares the value of the drop to a threshold value 160 as seen in FIG. 3B which is a preselected value. If the peak is not reached, the control exits decision block 150 and returns to the weld subroutine block 126 to continue a weld. If the drop from the peak 158 is equal to or greater than the threshold value as determined by decision block 152, the microprocessor 50 does not return to the weld subroutine 126 to continue the weld and transfers control to an operation block 154 where the operations such as "hold" that complete the weld sequence are performed. Exiting operation block 154, the microprocessor 50 returns to the standby mode. In the event block 152 does not transfer control to block 154 before the preprogrammed weld cycle counts have been reached, control is transferred from block 126 directly to block 154. Block 154 terminates the weld at its maximum duration and begins a hold period as described in the '724 patent.

Figure 4:
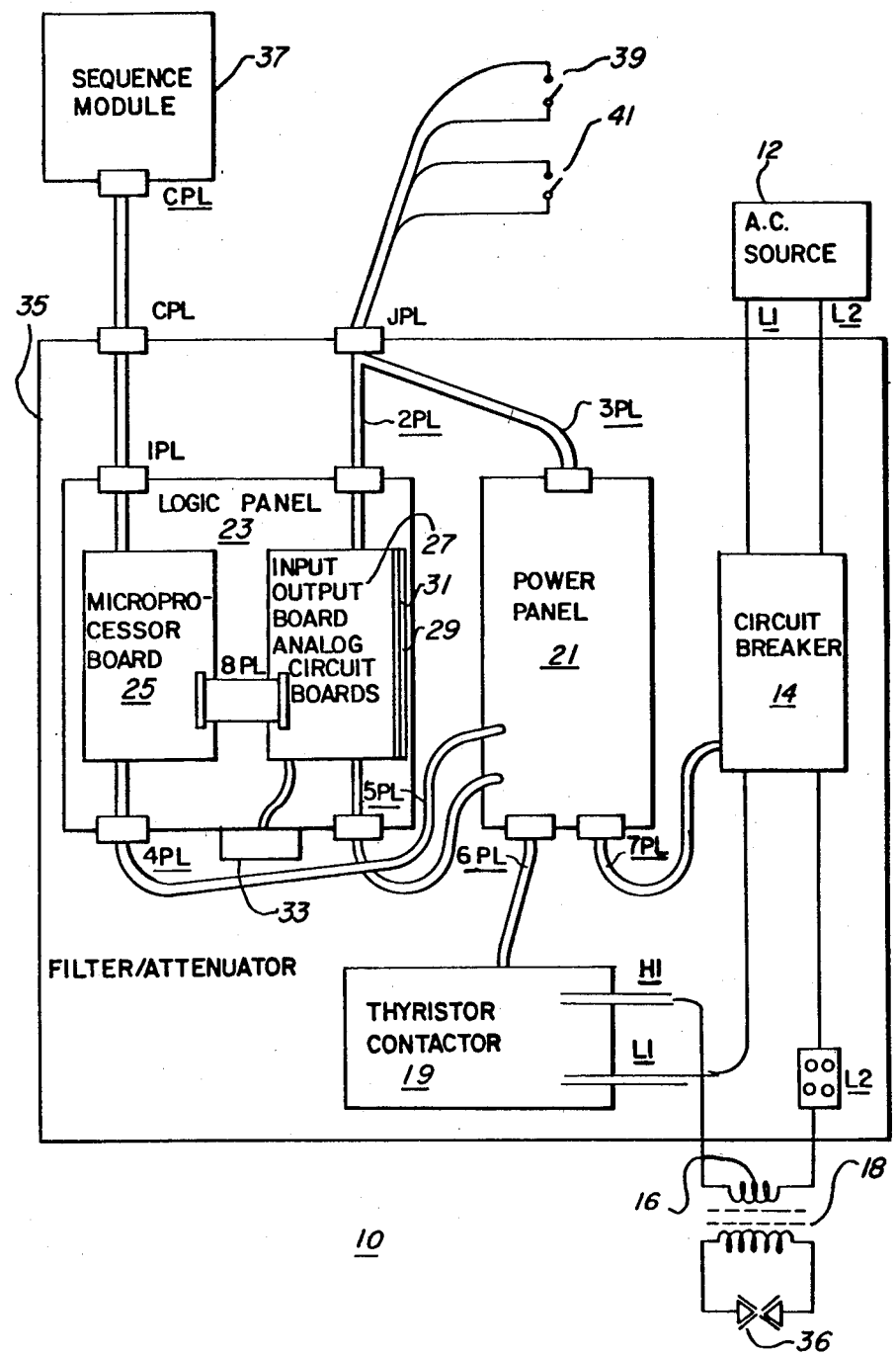
FIG. 4 shows a block diagram of the module interconnections for the feedback welder control system embodying the principles of the present invention.
Figure 7:
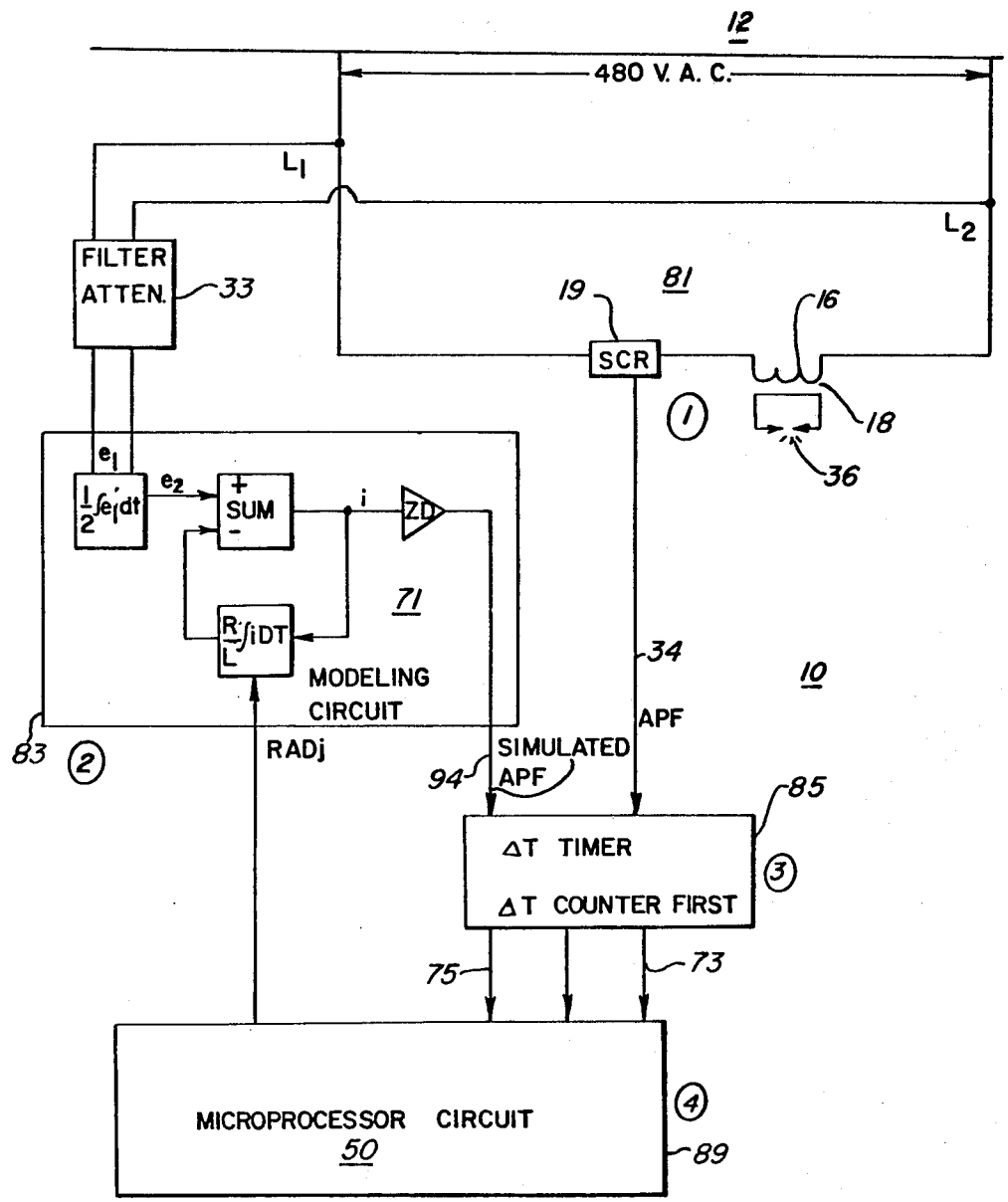
FIG. 7 is an elementary circuit and system block diagram of the embodiment shown in FIG. 4.

Referring to FIGS. 4 and 7, a feedback welder control system 10, that can be used in any general, industrial or commercial installation is connected to a power source, such as an alternating current power source 12 typically of a 480-volt potential having lines L1 and L2 which are connected in any known manner through a circuit breaker 14. Line L2 is connected to the primary of a welding transformer 18, and L1 is connected to the primary winding 16 of the welding transformer 18 through a thyristor or SCR contactor 19 and a line H1, as shown in FIG. 4. The circuit breaker side of power lines L1 and L2 are also connected to a power panel 21 through a cable 7PL, as shown in FIG. 4. The power panel 21 is connected to the thyristor contactor 19 through power cable 6PL. A logic panel 23 contains the microprocessor 50 including a board 25, an input/output board 27, and an analog circuit board 29 with a shield 31 therebetween or, alternatively, the analog and I/O boards could be combined on a single board, all of which are interconnected by a signal cable 8PL. The microprocessor board 25 contains an 8-bit microprocessor of any known type (not shown), such as a Motorola M6800. The 8-bit microprocessor includes read only memories and other registers containing the executive program, random access memories (RAM) containing the program constants of the weld sequence, port registers and various gate and amplifying circuits interconnecting the above-mentioned integrated circuits of the microprocessor in any known manner in the art.

The input/output board (hereinafter called I/O board) 27 serves as an I/O signal conditioner to interface the processor bus. The I/O board also contains initiation and fault relays which energize and de-energize the welder solenoid upon initiating the gun or upon a fault occurring, respectively. The I/O board also contains a solenoid amplifier for providing power to operate the selected solenoid. Both the microprocessor board 25 and I/O boards 27 communicate with the power panel 21 through cables 4PL and 5PL, respectively. The analog circuit board 29 is connected to lines L1 and L2 through a filter/attenuator 33 to be described in greater detail later. The logic panel 23, filter/attenuator 33, power panel 21, thyristor contactor 19, and circuit breaker 14 are all housed within a contactor module 35.

A sequence module 37 communicates with the microprocessor board 25 and the contactor module 35 through cable CPL and 1PL. The sequence module 37 provides a means for entering the weld schedule, setting pattern recognition limits, and interrogating the microprocessor 50 to be described in greater detail later. It also displays a diagnostic readout, provides a fast adjust and a feedback mode of operation and includes other operator controls for the feedback welder controller. A remote no-weld operator switch 39 and an initiation weld operator switch 41 are connected through cables JPL, 2PL and 3PL to the logic panel 23 and power panel 21. The operation of switches 39 and 41 will be described in greater detail later.

The feedback welder control system of the present invention operates in a similar manner to that described in the '724 patent with the exception of its operation during the time that weld current is flowing. Moreover, the maintenance interval counter and compensator (MICC) of the '724 patent is no longer required and is replaced on the address program chart of FIG. 5 corresponding to FIG. 4 of the '724 patent by addresses for pattern recognition limits to be later described. All other operations, such as communication with the sequence module, diagnostic checks, timing of the non-current steps in the welding sequence, etc. are carried on in a manner which is described in the '724 patent, incorporated herein by reference. For the sake of simplicity, this embodiment has only one sequence which can be selected by the operator, rather than three, as in the '724 patent. As previously mentioned, the circuitry and feature called MICC has been deleted from this description because the use of feedback to vary the length of weld used supplants the need for this feature.

Figure 5:
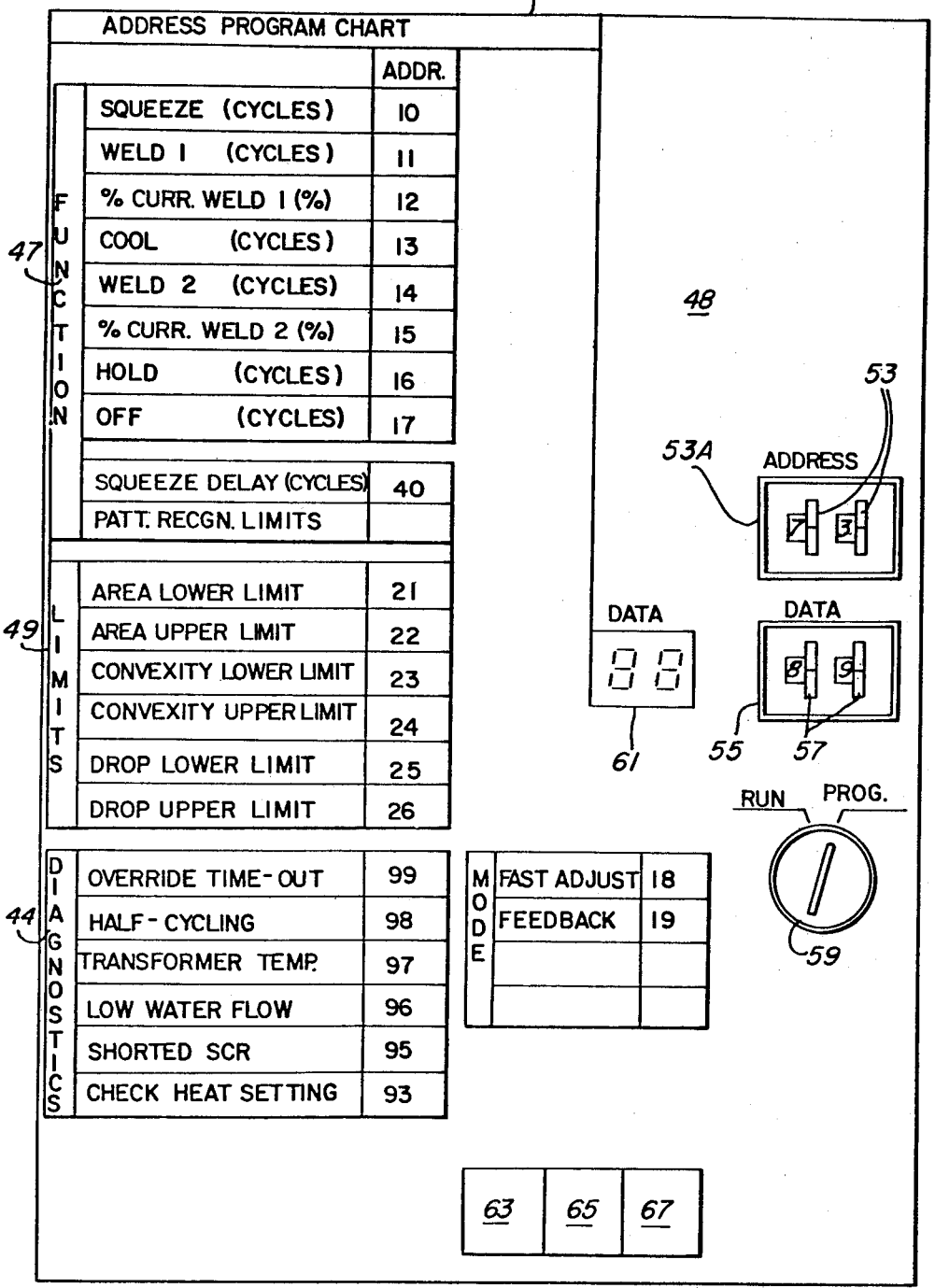
FIG. 5 is a front view of sequence module showing the programs and programming inputs of the feedback parameters of the control system in FIG. 4.

Referring to FIG. 5, a weld operator enters a weld schedule in a function section 47 having addresses 10-17 and 40 in the same manner as in the '724 patent. Ideally, for the current selected, the weld time is in excess of the minimum required to provide an acceptable weld. In addition, the acceptance limits of the features extracted from a dynamic resistive curve as each weld is performed are entered. The limits for area, convexity and drop are entered into addresses 21-26 of the pattern recognition limits 49. During the normal operation of the feedback welder control system, a control circuitry terminates the weld current when the values of the three features (area, convexity and drop) are all simultaneously between their upper and lower limits which are determined empirically for the material to be welded.

Prior to using the welder with its feedback welder control system, the electronic simulator or model circuit is adjusted to match the actual load circuit consisting of a welding transformer, its cables, and electrodes 36. This adjustment process is greatly expedited by weld-programming the welder control into a fast adjust mode. To accomplish this adjustment, reference is made to a front panel 48 of the sequence module 37 which includes an address and selector its thumbwheels 53, a data selector 55 and its thumbwheels 57, a key operated run/program switch 59 having a run and program mode, an LED data display 61 having a display of the data currently stored in the memory location set on the address selector thumb wheels 53 and entry switches having individual operator buttons 63, 65 and 67, which perform the same function as switches 82, 80 and 74, respectively, as described in the '724 patent. The welder control is placed in the fast adjust mode by dialing an address 18 on the thumbwheels 53 of address selector 53A and then entering a selected non-zero number on the data thumbwheels 57. This non-zero number on the data thumbwheels 57 is actually entered into a RAM memory location 18, the fast adjust mode, by depressing the enter/reset switch 67. Then, the LED data display 61 displays the data currently stored in the memory location 18 set on the address thumbwheels 57. In the fast adjust mode 18, the microprocessor 50 checks the "First" input and incrementally changes N (the power factor adjust word) in a manner which will minimize the difference between the welder extinction angle and the electronic simulator or modeling circuit extinction angle. For example, if the "First" input is a logic one, the modeling circuit power factor is too low and the microprocessor 50 will add one to N. Subtraction of one occurs in the opposite case. This adjustment process occurs on each half cycle until the electronic simulator or modeling converges to a unit one limit cycle around the ideal adjustment point for N. To obtain the optimum results, this adjustment can be made while over welding on a sample coupon (type of metal to be welded on) to include the workpiece resistance in the adjustment.

Figure 12:
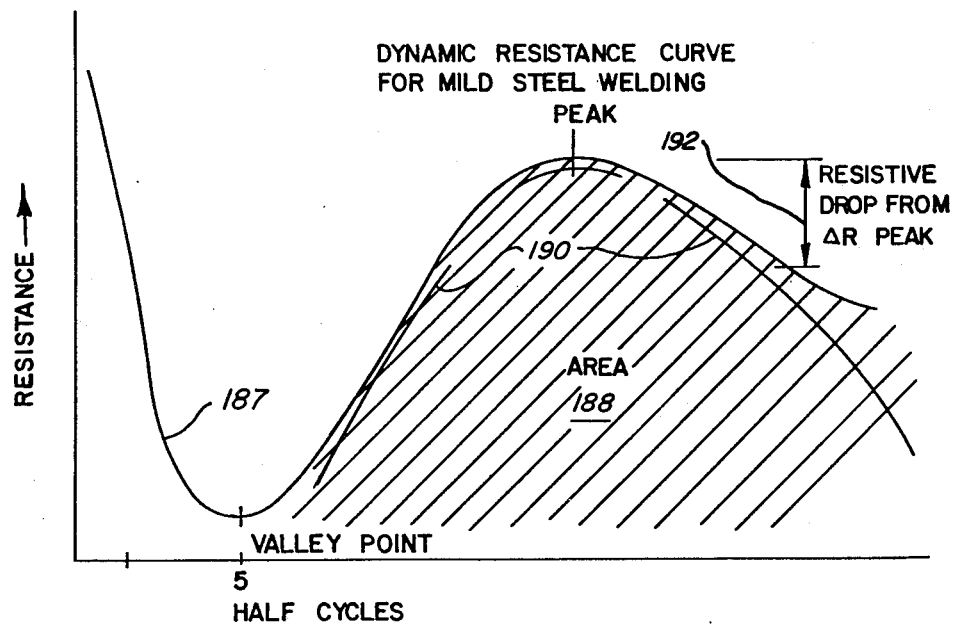
FIG. 12 shows a typical dynamic resistive curve of mild steel during welding.

After the fast adjustment of the welder controller has been completed, the welder controller is set-up to be used in the feedback mode. To program this mode of operation the address location 18 is reset to zero by dialing data thumbwheels 57 to read zero and entering that zero number into the RAM memory by depressing the enter/reset switch 67 to inhibit the fast adjust mode 18. The address selector thumbwheels 53 are set to the number 19 and data thumbwheels 57 are dialed to any non-zero number to enable the microprocessor 50 of the welder controller to halt the weld current when the dynamic resistive curve features are within the pattern recognition limits 40, previously dialed into the microprocessor 50 of the controller in a similar manner as the fast adjust and feedback modes were set. To compensate for the effects of cable heating, electronic component drift, etc., the microprocessor 50 checks the dynamic resistive curve during the valley of said curve and, based on the sign of this data, makes an incremental adjustment of N early in the next weld in a manner similar to that of the fast adjust mode. The valley point resistance is chosen as a basis for adjustment because it remains fairly constant from weld to weld and is in an area of minimal slope, as shown in FIG. 12.

Figure 6:
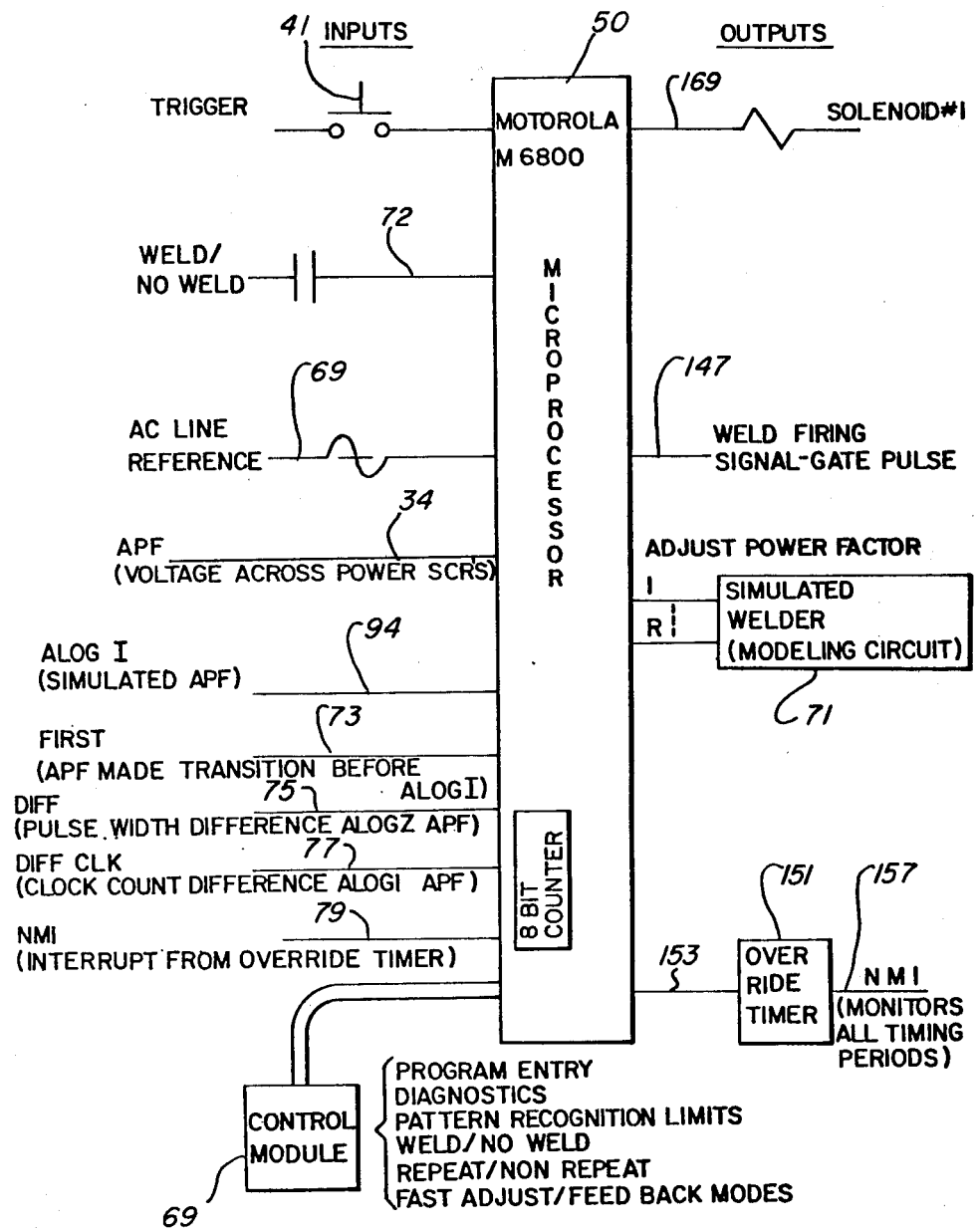
FIG. 6 is a block diagram of the inputs and outputs to a microprocessor disclosed in the embodiment in FIG. 4.

As in the '724 patent, all control signals are interfaced to the microprocessor 50 via its input/output structure. FIG. 6 shows the input and output signals of a microprocessor 50. When power is applied to the welding controller the microprocessor 50 and its supporting circuitry are energized. Once the welding controller is energized and is in a standby mode, communication exists between the sequence module 37 and the microprocessor 50. Another input to the welder is the weld-/no-weld contact 72 operated by the remote weld/no-weld switch 39 or by switch 65 on the front panel 48 which is a two position switch. With this switch in the weld position, welding current will be passed during a weld initiated by the trigger switch 41. In the no-weld position, the welding controller can be sequenced and no weld current is passed. An AC line reference signal 69 and automatic power factor signal 34, which reflect the voltage across the SCR contactor 19, are both inputs to the microprocessor 50 and function in the same manner as described in the '724 patent. An ALOG-I signal 94 is a simulated automatic power factor signal from the electronic simulator (modeling circuit). A FIRST input 73 which indicates that the actual weld current makes its transition before the ALOG-I signal 94, is another input signal to the microprocessor 50. A DIFF input 75, the pulse width of which is equal to the time difference between ALOG-I signal 94 and the automatic power factor signal 34 transitions, is another input to microprocessor 50. Differential clock signal 77, which contains clock counts proportional to the time difference between ALOG-I signal 94 and the automatic power factor signal 34, is another input. An NMI input signal 79 which is an interrupt signal from the override timer. The outputs of the microprocessor 50 are similar to that found in the '724 patent except for the signal fed to the electronic simulator which adjusts its power factor to closely match that of the actual welding circuit during this fast set-up mode 18.

THEORY OF OPERATION

As previously stated, the feedback welder control system of the present invention utilizes an 8 bit microprocessor as one of its main control elements. The software program to accomplish the welding controller function resides in the programmable read-only memory (PROM). This memory is non-volatile; that is, the executive program is permanent, even with the memory unpowered. However, the constants for the weld schedule (squeeze-weld-percent current-cool-weld-off times, pattern recognition limits, diagnostics, etc.) are stored in the programmable memory registers known as the RAMs.

Now, referring to FIG. 7, the feedback welder control system consists essentially of four circuit sections. The first section 81 consists of the actual welding transformer 18, welding apparatus with its electrodes 36 and cables and an SCR thyristor contactor 19 used to control the current through the welding transformer 18. The second major section 83 of circuitry consists of an electronic simulator or modeling circuit 71 which, in this case, is an analog circuit but could be just as well a digital circuit that is used to simulate the actual welder circuit. A third section 85 includes a timer circuit which determines the timing differences between the simulated signals from the electronic simulator 71 and the actual signals coming from the primary winding 16 of the welder transformer 48. These timing differences are then fed to the microprocessor 50 where they are compared to the limits stored in the RAM memories of the microprocessor 50 which is the fourth section of this feedback welder control system.

The microprocessor 50 in the fourth section 89 of the system compares the information generated from the actual welder with that information generated by the simulated reference welder. The pattern recognition limits stored in the RAM memory locations of the microprocessor defines a three dimensional block 93. (FIG. 13A) The pattern recognition limits are originally determined empirically for the particular metal to be welded and correspond to a quality weld. Features are extracted during a weld and, when all of the features fall within the block 93, a satisfactory weld nugget is formed. The extracted features representing a change in the resistance fall into the following categories: (1) area under the dynamic resistive curve; (2) convexity or shape of the curve; and, (3) the resistive drop, as shown in FIG. 12, indicative of a completed weld. As noted above, a heuristic process is involved in the determination of the range of these limits which change according to the materials and equipment used.

The electronic simulator or modeling circuit section 83, referred to as the simulated reference welder, includes the filter/attenuator 33 which provides the input reference signal 69 derived from the line voltage source 12 as is the actual welding circuit so that a simulated current waveform can be constructed as fully affected by line voltage waveform distortions. In essence, the electronic simulator (modeling circuit 71) solves a differential equation representing the equivalent RL network of the actual welder. This modeling circuit 71 is adjusted by the microprocessor 50 to closely match the actual welding circuit to be described in greater detail later. The primary difference between the simulated reference welder and the actual welder is that the actual welder has material to be welded between its electrodes and the simulated reference welder has no such material. Therefore, any changes in the signals from the simulated reference welder and the actual welder should exclusively reflect the resistive changes in the material being welded.

Figure 8A:
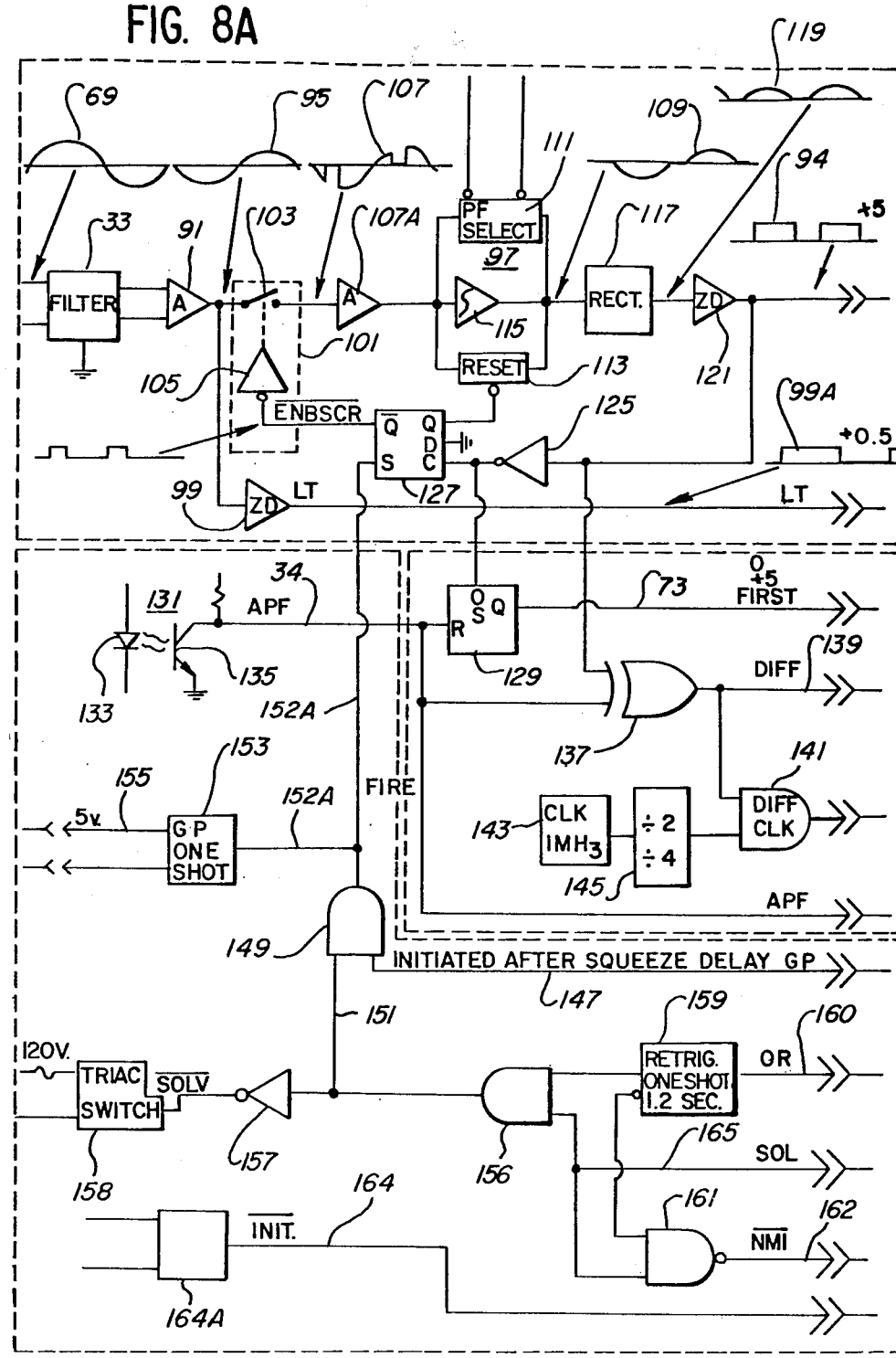
FIGS. 8A, 8B, 8C(A), 8C(B), 8D(A), and 8D(B) are circuit and logic block diagrams in greater detail of a portion of the embodiment of FIG. 4.

Referring to FIG. 8A, a more detailed circuit logic block diagram is shown which represents the analog circuitry of the electronic simulator 71. Also included is a portion of the circuitry of the first section 81 and section 85 of FIG. 7. This circuitry includes a digital timer as well as the I/O signals necessary for operation of the welding tool. The voltage reference signal 69 from the 480-volt line is inputted to the filter/attenuator 33. The input voltage signal 69 is sinusoidal voltage as shown in waveform 69. The purpose of the filter/attenuator 33 is to filter out differential mode noise, and divide the voltage to a usable logic level, of approximately +10 or −10 volts and, in the present embodiment 4-6 volts. The reduced signal 69 is fed as an input to a differential operational amplifier block 91, which has a high common mode rejection characteristic. The signal 69 is inverted, and appears as a signal 95 which is divided into two separate routes. One route provides an input to a simulator 97, and a second route provides an input to a zero detection circuit 99. The output of the zero detection circuit 99 becomes a lead trail reference signal 99A. In the first route, the signal proceeds to a circuit block or SCR simulator 101 illustrated by a switch 103 operated by an amplifier 105. The switch 103 and the amplifier simulate the operation of the welding contactor in the actual welder circuit. The switch 103 is closed at the same time a gate pulse is initiated to fire the SCRs in the actual welder contactor 19. The action of the SCR simulator 101 produces a chopped signal as shown by a waveform 107 which is then fed into an amplifier 107A which receives the chopped sinusoidal waveform 107 and acts as a buffer and inverts the signal. The inverted signal is then fed into an integrator circuit 115. The integrator 115 solves a differential equation for an equivalent RL network corresponding to the actual RL network of the welder and converts the voltage waveform 107 into a current waveform 109.

The power factor of the reference welder represented by the analog circuitry can be varied to match the actual welder power factor by an adjustment of a power factor select circuit 111. The power factor select circuit 111 is a network of binary weighted resistors which are selectively included in the circuit by analog switches. When all switches in the select circuit 111 have a logic zero output, the highest power factor of 0.8 is simulated. However, this power factor select circuit 111 can also be a Digital to Analog Converter (DAC), such as a National Semiconductor DAC 1020 having the switches plus an R-2R ladder resistor network. In this case, when all switches have a logic one output, then the highest power factor of approximately 0.8 is simulated. All zeros on the PIA ports result in the lowest power factor of 0.4. A total of 8 bits will divide the amount of feedback from zero to 255 parts. At the end of each cycle of current conduction, a reset circuit 113 will discharge a capacitor, not shown in the integrator circuit 115. The discharge of the capacitor conditions the capacitor for re-initiation of the integrator 115 for the next half cycle of current conduction. The waveform signal 109 is then fed into a fullwave rectifying circuit 117 which produces a signal waveform 119, that is fed to a zero crossing detector 121. The output of the zero crossing detector 121 is a waveform 123 known as the ALOG-I signal 94. This ALOG-I signal 94 is analogus to the APF signal 34 from the actual welder and is the automatic power factor signal 123. The signal 123 is inverted by an inverter circuit 125 so that the trailing edge of the ALOG-I waveform 94 will clock in a zero to a flip-flop circuit 127, which acts as the control for the simulated SCR circuit 101 and the reset circuit 113. The 1-0 transition of ALOG-I waveform signal 94 opens the switch 103 simulating the SCR action which would normally turn off at the zero crossing of the current. The inverted ALOG-I signal 94 is also fed into a flip-flop 129. The APF signal 34 from the actual welder is also fed into flip-flop 129 via an isolation circuit 131 comprising a light-emitting diode 133 and a photosensitive transistor 135 so that the analog circuitry operating at logic level voltages is isolated from the power circuit of the actual welder. The ALOG-I signal 94 and the APF signal 34 determine which signal was the last signal to change its state. The ALOG-I and the APF signals 94 and 34, respectively, are also fed to an exclusive OR gate 137. The OR gate 137 is a logic one when there is a difference between ALOG-I signal 94 and APF signal 34. The difference between ALOG-I 94 and APF signals 34 is a difference signal 139 at the output of the exclusive OR gate 137 which is used to gate a clock signal and permit a number of clock pulses which are representative of a time difference between ALOG-I signal 94 and the APF signals 134. A difference clock circuit 141 has one input from the exclusive OR gate 137 and a second input from a clock 143. The signal to the difference clock circuit 141 is modified by a divide down network 145 known as a scaler. The clock 143 runs at a constant frequency.

A gate pulse signal (GP) 147 is sent from the microprocessor 50 to a gate circuit 149. The gate pulse signal 147 is ANDed with a signal 151 that includes the condition that an override timer is not timed out and the solenoid valve is initiated. The AND gate circuit 149 feeds the flip-flop 127 to initiate the operation of switch 103 of the SCR simulator circuit 101. The gate circuit 149 also initates the GP one-shot circuit 153 which provides an output signal 155 of approximately 5 volts for 25 microseconds. The pulse 155 is sent to the power panel 21 which has pulse transformers that fire the SCRs in the welder contactor 19. The ANDed condition of the override timer and solenoid valve are summed at an AND gate 156 which, in turn, feeds an inverter circuit 157 that serves as an amplifier for a triac switch circuit 158 to operate the solenoid valve in its 120-volt AC circuit. The triac switch circuit 158 is a solid state switch having an output of 120 volts and one amp. An override timer or retriggerable one-shot circuit 159 is initiated by an OR signal 160. The OR signal 160 is pulsed at least once every second by the microprocessor 50 or a time out condition will occur. If the override time, circuit 159 times out while the solenoid valve is on, a NAND circuit 161 produces an output signal 162. This signal 162 is a non-maskable interrupt signal (NMI) that is an input to the microprocessor 50. The microprocessor 50 resets the override timer 159 and at the same time, displays a flashing 99 error in data display 61 on the front panel 48 of the sequence module 37.

After the set-up procedure is completed and the parameters for am acceptable weld have been selected by programming the pattern recognition limits in addresses 21-26, as shown in FIG. 5, the feedback welder control system of the present invention is conditioned to begin a normal welding sequence. When the operator activates the initiating switch 41 an initiation signal 164 from circuit block 164A is received by the welder control system. Upon receiving the initiation signal 164, the microprocessor 50 of the welder searches for the lead trail signal 99A from the zero detection circuit 99. Once the controller is synchronized with the lead trail signal 99A, the overridetimer 159 is initiated. Once the timer 159 is initiated, a solenoid valve signal 165 is given. During a condition when the override timer is initiated or operative and the solenoid valve signal 165 is present, AND gate 156 has an output logic signal which activates inverter circuit 157 triac switch circuit 158, and the solenoid valve signal is issued to operate the solenoid valve. Concurrently the AND gate circuit 149 is activated and provides an input signal to the gate pulse circuit 153 which, in turn, provides the gate pulse 155. As outlined in the '724 patent, a ncrmal sequence of events is to go through the squeeze delay and then the actual squeeze of the electrode tips together. During the squeeze period, the microprocessor 50 looks for the lead trail signals and counts lead trail transitions.

When the squeeze delay and squeeze times have elapsed and a lead-trail transition has ocoured and a preselected time has elapsed after the transition, the microprocessor 50 fires the gate pulse circuit 153 to initiate a weld pulse. The one-shot output signal from the gate pulse circuit 153 initiates the conduction of welding current through the SCR's. When the SCR conduction is initiated, flip-flop 127 receives a signal 152A which operates the SCR simulator 101 and the switch 103 closes which, in turn, energizes the analog simulator 71, as previously described. The second section of FIG. 7, is tuned by adjusting the power factor to emulate that of the actual APF signal 34 from the actual welder. A certain number of weld cycles will be ignored after the initiation of a weld pulse and those first few cycles fall within what is called a blanking period before any reference signals are used by the feedback welder control system. Once the blanking period has passed, typically three to four half cycles, the microprocessor 50 obtains the differences in time between the APF 34 and ALOG-I signals 94 and enters the results in a RAM memory location. The results in the RAM memory are operated upon by the microprocessor 50 to extract a set of features. These features are compared to the pattern recognition limits which are indicative of a quality weld.

A more detailed discussion of the circuitry of FIG. 8A and the signal pocessing will be described through FIGS. 8B and 8C. The voltage reference signal goes through the filter/attenuator 33, as shown in FIG. 4, and is conditioned before it is fed to the simulated reference welder. The first stage of the filter/attenuator 33 as shown in FIG. 8B consists of a differential noise filter and a voltage divider network used to divide the 480 volts to a voltage level usable by integrated circuit components found in the electronic simulator, such as 4-6 volts peak-to-peak. The filter consists of two inductors 1L and 2L and capacitors C1 and C2. Two resistors R are connected in series to conductors L1 and L2 to moderate the natural resonance of the filter. A voltage divider is connected in series with the filter and is comprised of resistors R1-R10. Variable capacitors C7 and C8 are connected across resistors R9 and R10, respectively, and are adjustable to compensate the incoming signal for phase shift due to stray capacitance. From points across resistors R9 and R10, the conditioned logic level signal is fed to an input amplifier and buffer stage.

Figure 8C:
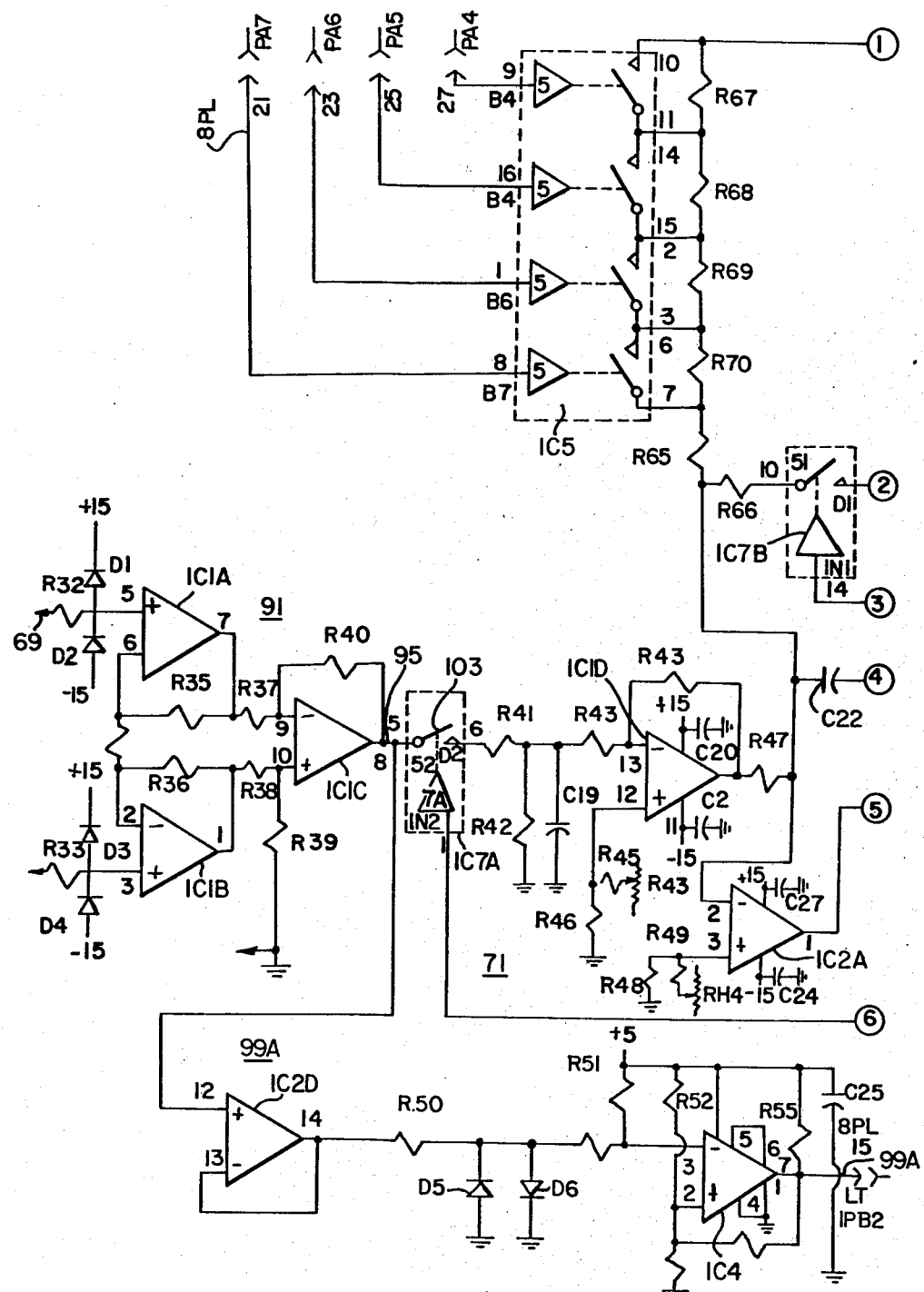
Figure 8C:
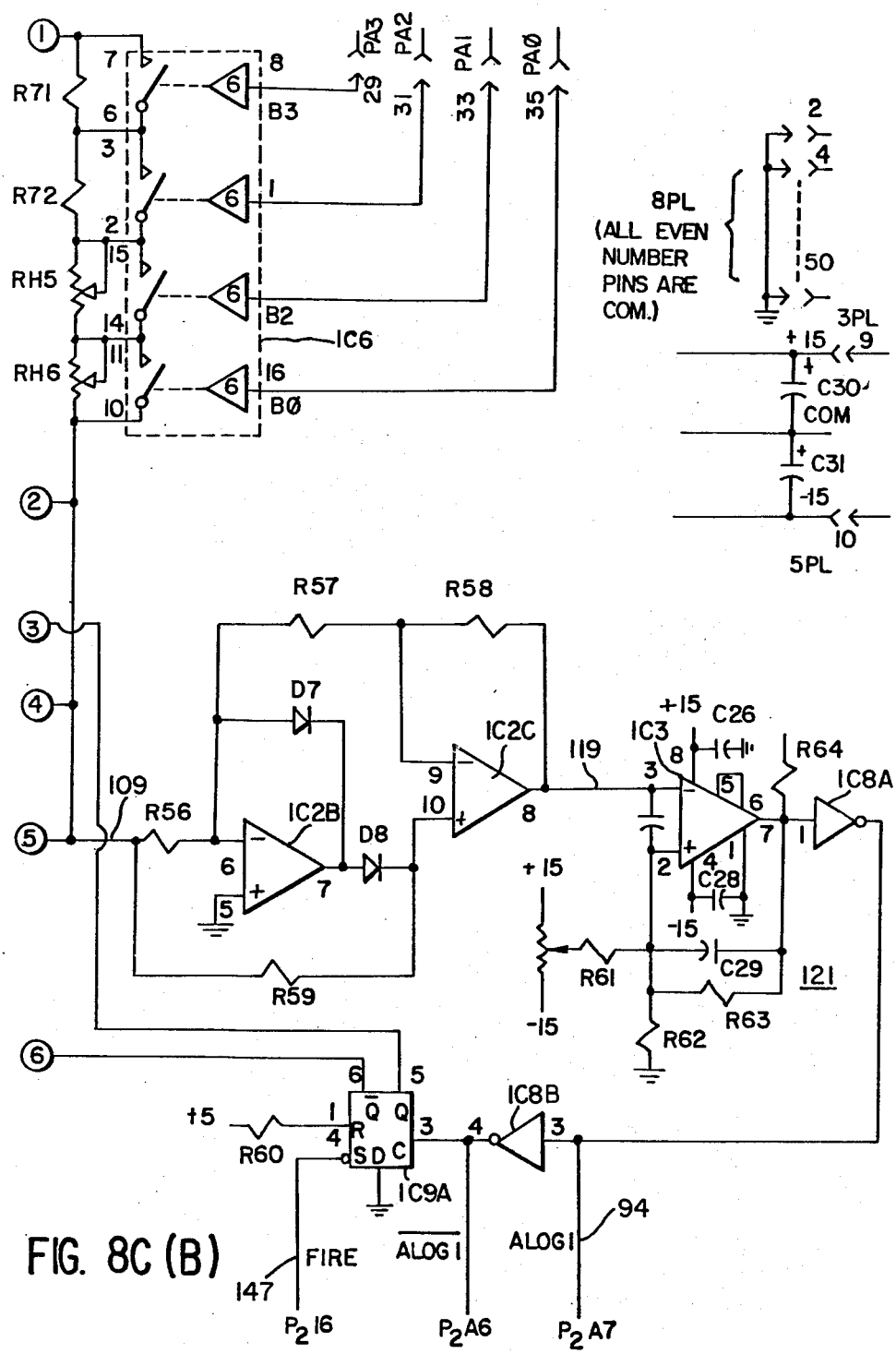

The conditioned logic level voltage reference signal 69 goes to a portion of an integrated circuit chip 1C1A-C in FIG. 8C(A) and its associated circuitry comprising a differential input instrumentation amplifier 91. The amplifier 91 has high common mode rejection and its primary purpose is to reduce unwanted common mode signal and act as a buffer. The output waveform of the amplifier 91 is shown as a waveform 95 on FIG. 8A and is inputted to circuits: (1) the welder simulator circuit via switch 103 and (2) the lead-trail circuit 99A.

The waveform signal 95 is routed to the lead trail circuit comprised of several integrated chips, including a chip IC2D which is a voltage follower. The output signal of IC2D feeds a zero crossing detection circuit including a chip IC4 and peripheral components. A pair of diodes D5 and D6 connected in series between the low voltage follower and the zero crossing detection circuit including the chip IC4 to limit the signal excursion. The output of the zero crossing detection chip IC4 is a logic level signal typified by waveform 99A on FIG. 8A, known as a lead trail signal. The 1-0 and 0-1 logic level transitions of the waveform 99A denote the zero crossing of the reference voltage signal waveform 69.

Figure 9A:
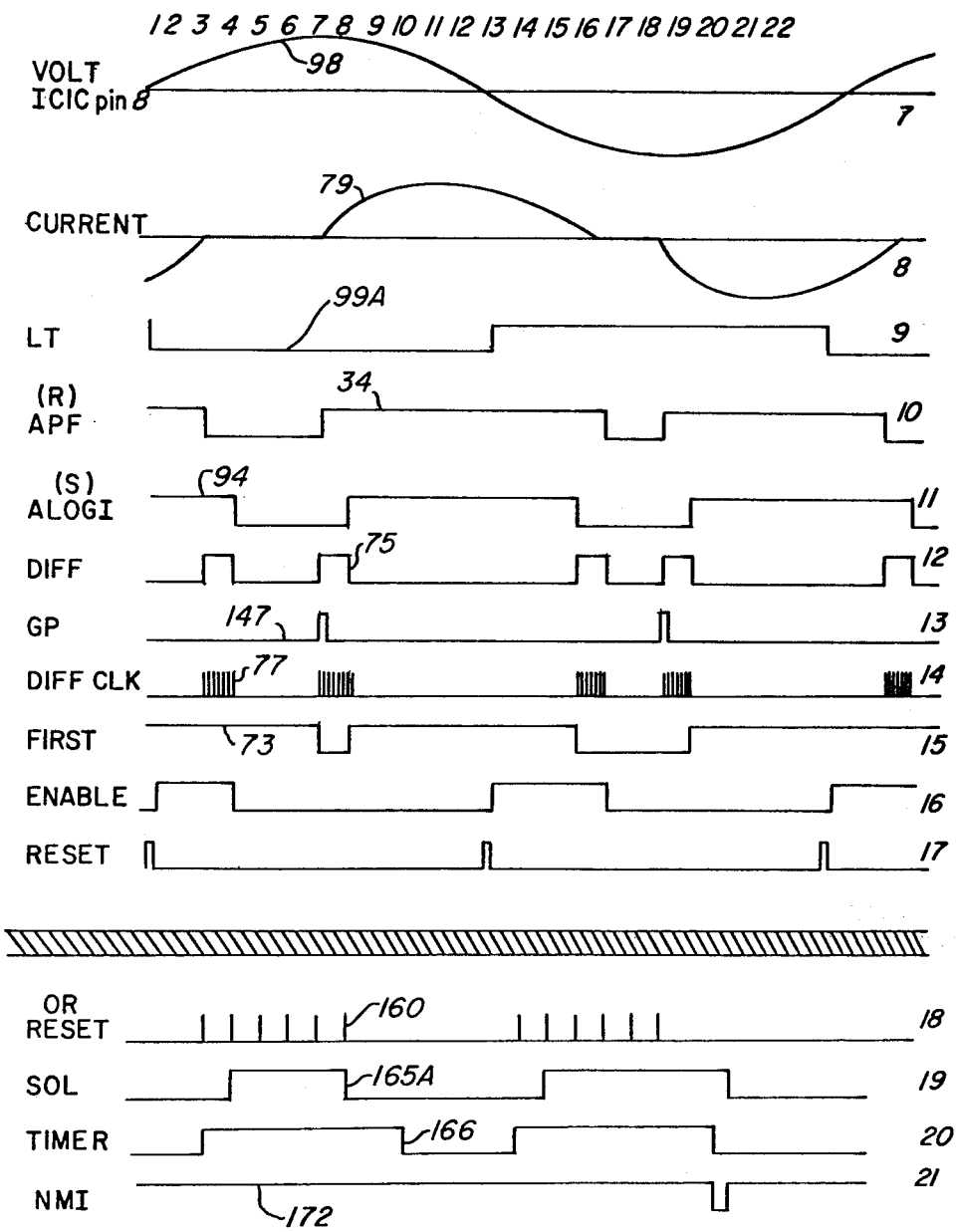
FIGS. 9(A and B) show waveforms illustrating the input and output signals to the appartus of FIG. 8.
Figure 9B:
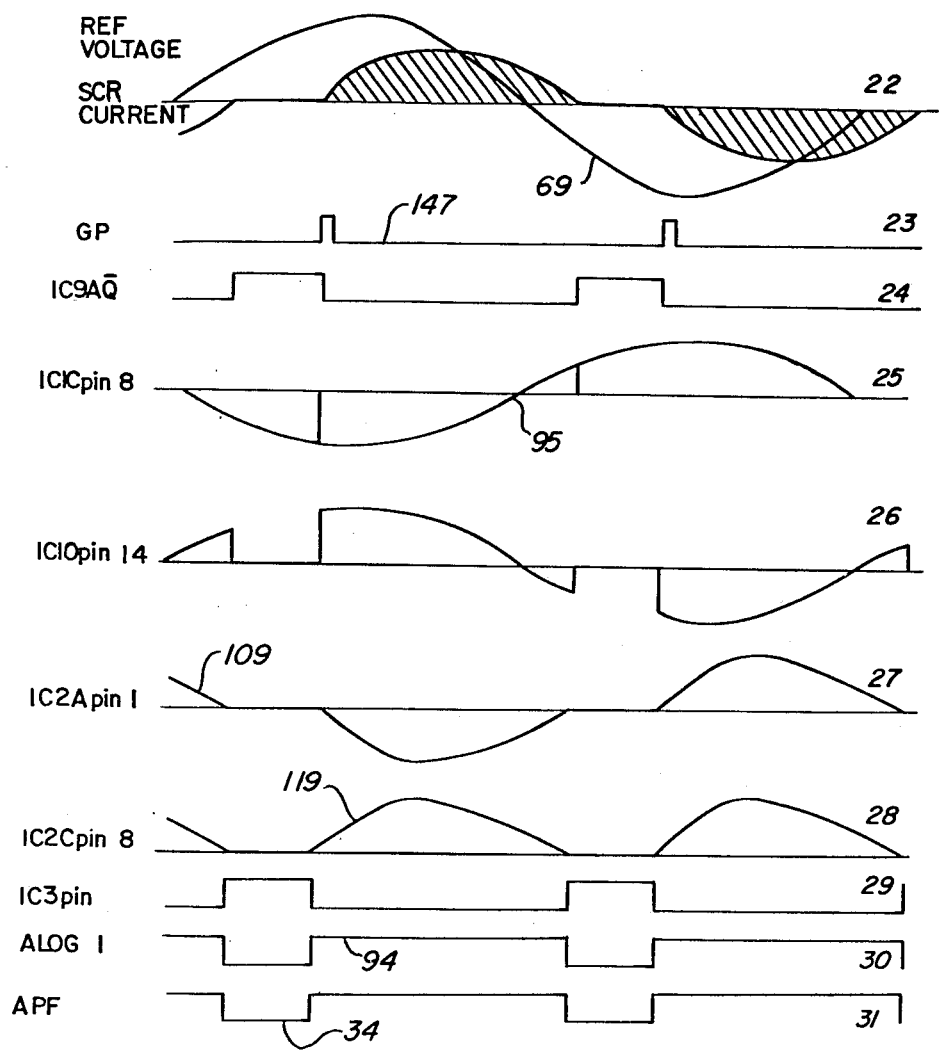

The modeling circuit 71 consists primarily of a number of integrated chips IC1D, IC2A-C, IC3, IC5, IC6, IC7A and IC8-A with their associated components. The voltage reference signal 95, which is fed to the electronic simulator circuitry or modeling circuit 71, goes through the switch 103 which simulates the conduction of the SCR contactor 18. The switch 103, which is an integrated chip, phase controls the voltage reference signal 95 delivered to an integrator 115 as shown in FIG. 8A connected in series through IC7A. This signal first goes to the buffer amplifier IC1D and into the integrator 115 which is made up of IC2A, capacitor C22, integrated circuits IC5 and IC6 and associated resistors R65-R72, and RH5 and RH6. The resistors R65-R72 and RH5 and RH6 in the analog switches in the feedback circuit of the integrator IC2A (115) allow the microprocessor to adjust the power factor of the simulator weld circuit. The switches IC5 and IC6 and the resistors connected thereto form a binary weighted resistor network. The setting of the switchable resistor network, which is adjusted by the microprocessor, determines the amount of feedback to the integrator IC2A. The logic one from the microprocessor 50 to all of the switches will cause all of the switches on IC5 and IC6 to open. This increases the resistance in the feedback loop and thus will decrease the power factor. When the inputs to all switches IC5 and IC6 is a logic zero, the highest power factor of 0.8 is simulated. The feedback welder control system is designed so that the lowest power factor (outputs of the microprocessor 50 to switches IC5 and IC6, all logic one) is approximately equal to 0.4. The output of IC2A is a simulated current waveform 109 of FIGS. 8A and 9B. the waveform 109 signal is, inputted to the precision rectifying circuit consisting of integrated chips IC2B and IC2C and their associated circuitry. The rectified signal shown as waveform 119 of FIGS. 8A and 9B is inputted through the zero crossing detection circuit 121 of integrated chip IC3 and its associated components. The output of IC3 is shown as waveform 123 of FIGS. 8A and 9B and is a logic one during the absence of simulated current and a logic zero during simulated current conduction. This signal is further conditioned by integrated chip IC8A which produces the ALOG-I waveform signal 94 in FIG. 9A. This simulated automatic power factor signal 94 is inputted to the counter circuit in the third section 85 of the feedback welder control system, as shown in FIG. 7. The zero crossing of the current signal ALOG-I will turn off the simulated SCR. The simulated SCR (switch 103) is turned off by using the ALOG-I signal 94 and IC8A-B and IC9A (a flipflop which controls the state of the switch 103. Simulated SCR switch 103 is turned on by the gate pulse (GP signal 147 of FIGS. 6, 8A and 9A). As shown in FIG. 8C(B) IC9A is set by a signal called FIRE (GP signal 152) and is cleared for reset by the ALOG-I signal 94. This causes the simulated SCR switch 103 to first close for a period of model current conduction and then open at the end of model current conduction in a manner similar to the operation of the welding contactor 18. After conduction increases, an output is used to dump the integrator portion of analog circuitry 1C9AQ. This is accomplished by a circuit consisting of integrated chip IC7B and resistor R66. This circuit resets the integrator and prepares the integrator for the next current conduction cycle. This completes the description of the circuitry which comprises the analog circuit section, referred to as the reference welder circuit or modeling circuit, and is designated as the second section 83 of FIG. 7.

Figure 8D:
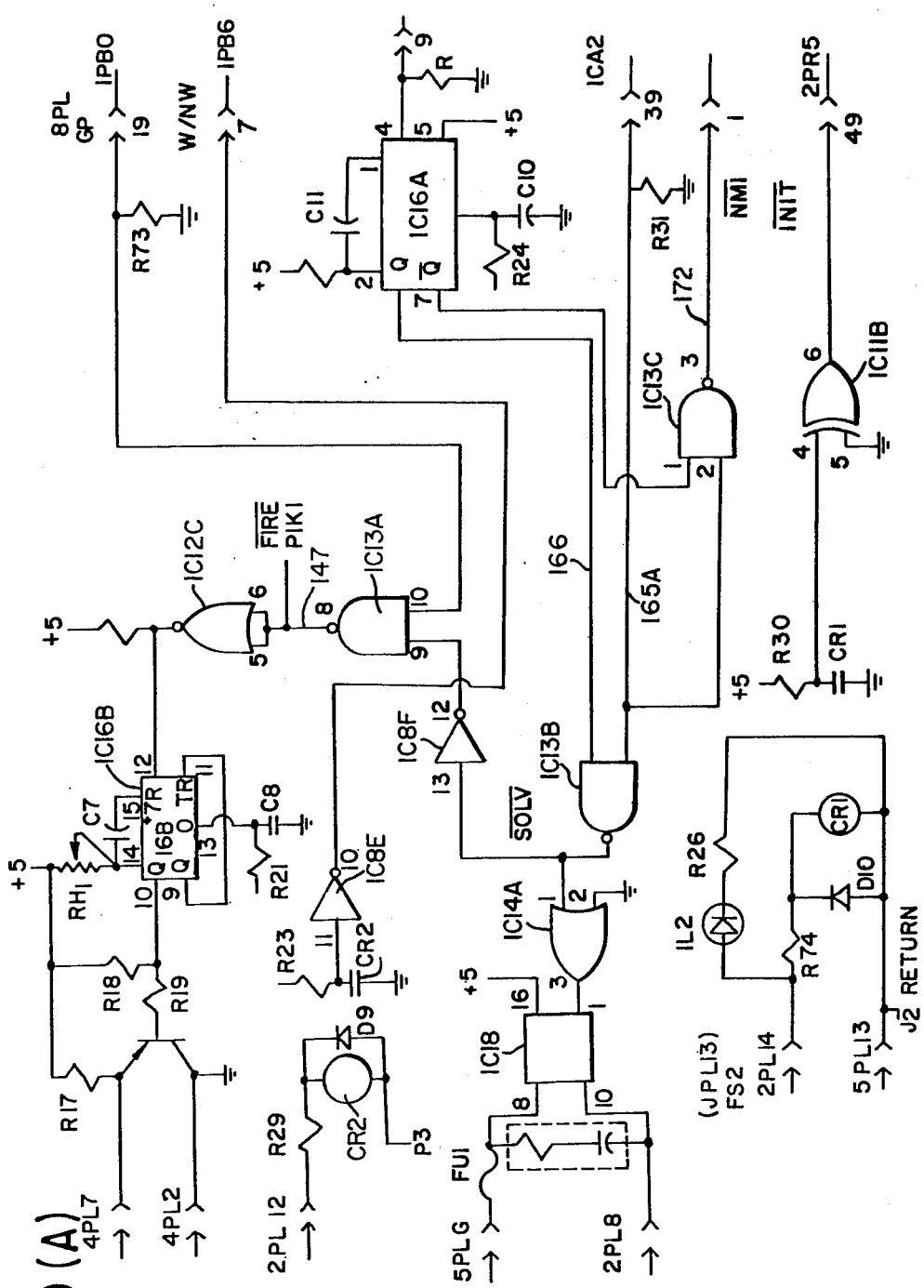
Figure 8D:
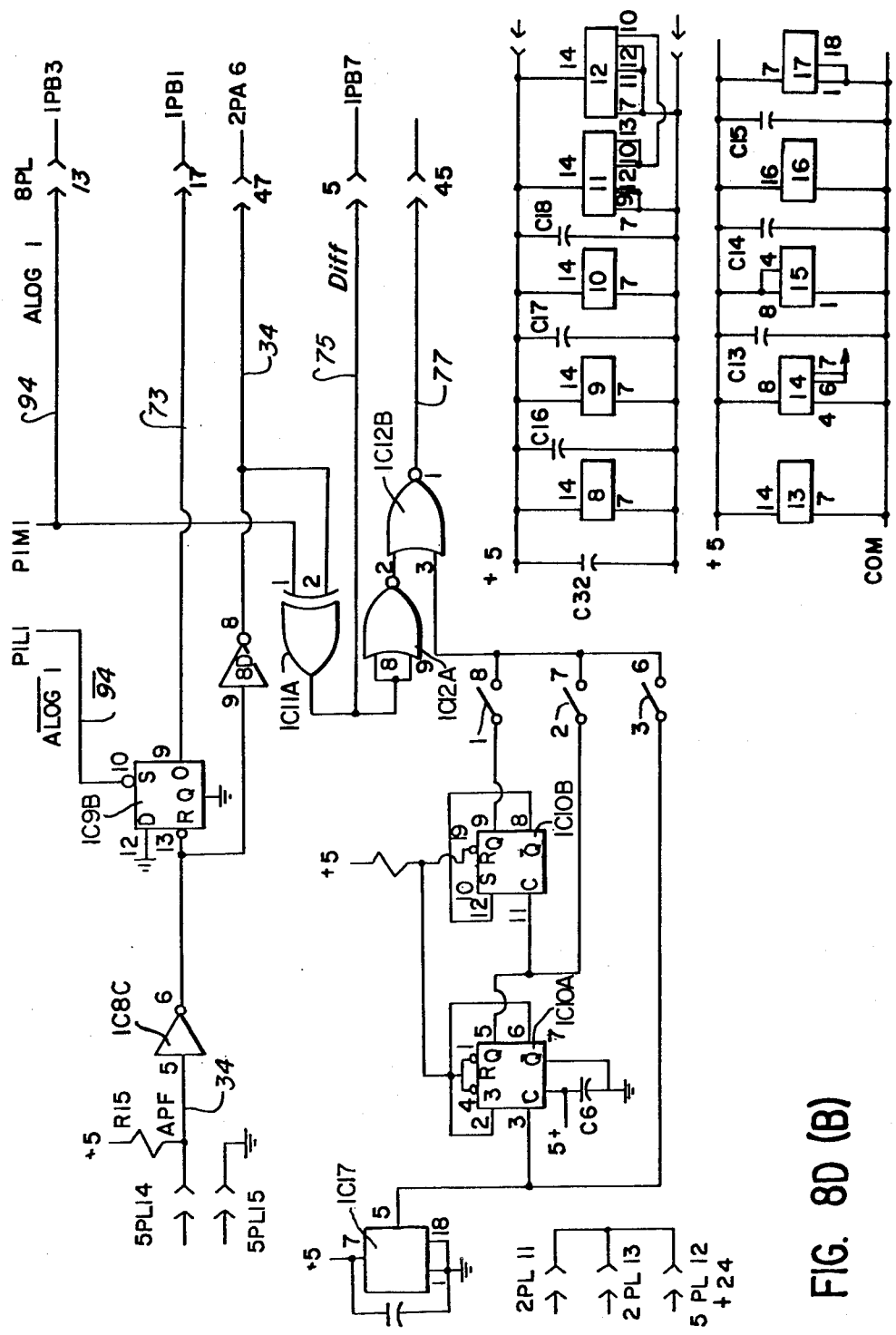

The timing sequence in the feedback welder control system, is shown in FIG. 8D(A and B) and section three or 85 in FIG. 7. Signals 34 from the welder as well as the ALOG-I signal 94 from the simulated welder are fed into the third section or the timer circuitry 85. The automatic power factor circuit of the actual welder produces a signal 34 (FIGS. 7 and 9A) and corresponds to current conduction of the SCRs in the actual welding circuit. This signal is buffered by integrated chip IC8C (FIG. 8D(B)) and is fed into an integrated chip IC9B (chip 129 in FIG. 8A). The presence of current flow through the welding SCRs will reset the chip IC9B if there is no ALOG-I signal 94 present. The ALOG-I signal 94 sets flip-flop IC9B in the absence of a reset signal (APF signal 34 inverse). The Q output of the chip IC9B is designated as the signal FIRST 73 of FIGS. 7. The FIRST signal 73 designates which of the two signals, APF 34 or ALOG-I 94, had the last 1-0 transition.

In this case the logic zero indicates that the APF signal 34 transition was last.

The DIFFERENCE signal 75 is produced from ALOG-I signal 94 and APF signal 34 are inputs to an exclusive OR integrated chip IC11A. The output signal from the exclusive OR ICW11A is named DIFFERENCE signal 75 and is a logic one whenever ALOG-I signal 94 and APF signal 34 do not match.

The difference clock consisting of a one megahertz clock oscillator integrated chip IC17 is used as a time base. A binary divider IC10A and IC10B receives the time base signal. The time base selection is accomplished by selective closing of switches 1, 2 or 3 to select one megahertz, 500 kilohertz, or 250 kilohertz respectively. The selected time base signal is gated by a difference signal from IC12B which acts as an inverter. Thus, IC12B gates the clock time base during the time difference between APF signal 34 and the AIOG-I signal 94. The output of IC12B is thus a number of clock pulses shown by waveform 77 in FIG. 9A, which represents the time difference between the ALOG-I signal 94 and the APF signal 34. The difference clock signal is fed to a binary counter integrated chip associated with the microprocessor 40 circuitry.

An override timer consists of integrated chip IC16A(-FIG. 8D(A)) and tixing components which are set-up as a retriggerable one-shot circuit. Its function is that of a monitor timer. If the microprocessor does not reset the chip IC16A by issuing an override reset signal 166, shown by waveform 166 in FIG. 9A, before 1.2 seconds have elapsed from the time at which it was enabled, the timer IC16A will time out. The output of integrated chip IC16A is gated with the solenoid signal 165A in FIG. 9A which, when present, indicates a weld is in progress. Integrated chip IC13C provides a logic low when the control is in the process of welding and the override timer IC16A times out. This signal is the NMI signal shown as waveform 172 in FIG. 9A and interrupts the microprocessor 50. A solenoid valve, not shown, is controlled by the integrated chip IC13B which receives both the timer output signal 166 and the solenoid signal 165A. The output of chip IC13B drives buffer IC14A which activates the solid state relay IC18.

The gate pulse circuit operates in the following manner: the signal 165A is inverted by the chip IC8F and is used to enable the chip IC13A. The chip IC13A thus allows the gate pulse signal 147 to be issued. The output of IC13A is the FIRE or gate pulse signal 147. This signal is inputted to the analog switch IC7A (see FIG. 8C(A)) via chip IC9A and also inverter IC12C. The output of the inverter IC12C triggers a one-shot circuit IC16B. This produces an output signal pulse of approximtely 25 microseconds duration which is amplified and used to trigger the welding contactor 18.

The initiation circuit includes an initiation switch 41. The initiating signal activates relay CR1. The contact closure of the relay CR1 is buffered by the chip IC11B and produces a logic zero at the output of chip IC11B indicating closure of the switch 41. The weld/no-weld circuit is similar to the initiation circuit. The contact closure of relay CR2 is buffered by IC8E.

As an overview to the timing sequence of the feedback welder control system of the present invention, the initiation switch 141 is closed when a weld is to be made. The microprocessor 50 initiates the override timer IC16A and issues a solenoid valve signal 165. After a timed squaeeze delay and squeeze period, as determined by counting transitions of each trail signal 99A, the weld period beings. During the weld period gate pulse signals 147 are issued to fire the SCR contactor 18. At each lead trail transition, the third section timer 85 is enabled. The timer 85 is sequentially reset and enabled. The timer 85 is conditioned to count the clocked difference (signal 75 in FIG. 9A) between the APF signal 34 and the ALOG-I signal 94. Referring to FIG. 9A, and with reference to an imaginary vertical line, the APF signal 34 is a logic one and a transition from one to zero has just occurred in the ALOG-I signal 94. A signal called DIFF or difference signal 75 will remain a logic one during the interval that the APF signal 34 and the ALOG-I signal 94 are at different logic levels. This permits a definite number of clock pulses to be counted which represents the time difference between the two signals. The FIRST signal 73 will indicated to the microprocessor 50 that the ALOG-I signal 94 made the transition from one to zero before the APF signal 34 switched from one to zero; the third section timer 85 is now disabled and the count is read by the microprocessor 50. This process is repeated throughout the weld period to ascertain the difference in time between zero crossings of the weld current and that of the modeling circuit. The time difference information is processed by the microprocessor 50 to extract resistive change information and, when the resistive change information falls within the preprogrammed pattern recognition limits, which characterize the formation of a good weld, the microprocessor 50 terminates the welding cycle.

The pattern recognition limits of a quality weld will depend on many variables such as the type of material to be welded and the particular welding transformer and the welder secondary circuit. In general, the area and convexity limits should be greater than zero and less than some large positive number. Typically, an experimental technique used to determine the lower limits may proceed as follows: (1) for material to be welded, a feedback welder control system, programmed via sequence module 36, controls to produce a weld of acceptable quality as evidenced by a few destructive tests of sample welds; (2) the weld time is reduced in one cycle steps until a minimum of time that will produce an acceptable weld is determined; (3) The sequence module is used to read and record the values of area, convexity and resistive drop for the welds made in step 2 above; (4) Using the sequence module 36 the values of the area, convexity and resistive drop determined in step 3 are programmed into the lower limit addresses 21, 23 and 25, respectively, of the RAM memories in the microprocessor 50 and, (5) the upper limits of area, convexity and resistive drop are used primarily to inhibit the welder control system from terminating a weld formation when values for these three parameters develop which are greatly different from typical welds. This will inhibit false tripping in event of disturbances external to the welding process. In general the upper limits are set on the basis of experience and judgement. If the upper limits are set too low, some welds will not be timely terminated, and if the upper limits are set too high, external disturbances may cause premature termination of a weld.

Figure 11:
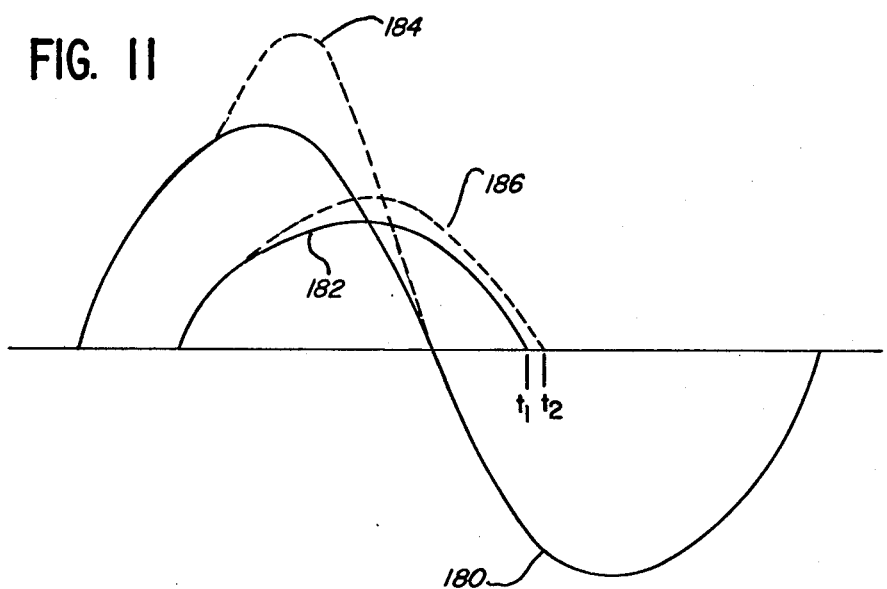
FIG. 11 shows waveforms illustrating the effect of line voltage distortions on extinction angle of current in a feedback welder control system.

Referring to FIG. 11, the effects of line voltage waveform distortions on the current extinction time is shown. A voltage having a waveform 180 shape that is a sinusoidal and free of distortion produces a weld current 182 that passes through zero at time T1. If the line voltage wavefrom 180 is distorted, as illustrated by a waveform 184, a current having waveform shape 186 which extinguishes at a time T2 which is later than the time T1 on the current waveform 182. Other distortions which tend to diminish the positive half cycle with respect to the negative half cycle of waveform 180 will have the opposite effect of causing current extinction to occur earlier than in the non-disturbed case. As can be seen by the change of the current waveforms from waveform 182 to 186 as caused by a line voltage waveform disturbance, it would ordinarily be impractical to make a reliable resistive measurement from the impractical extinction time change. What the control according to the present invention accomplishes by the electronic simulator is to provide a control with an immunity from line voltage waveform disturbances since a simulator circuitry and actual welder circuitry are energized by the same line voltage waveform and the only difference between ALOG-I signal 94 and the APF signal 34 results from a change in the resistance of the workpieces between the electrode tips as nugget formation occurs during a weld.

Figure 13A:
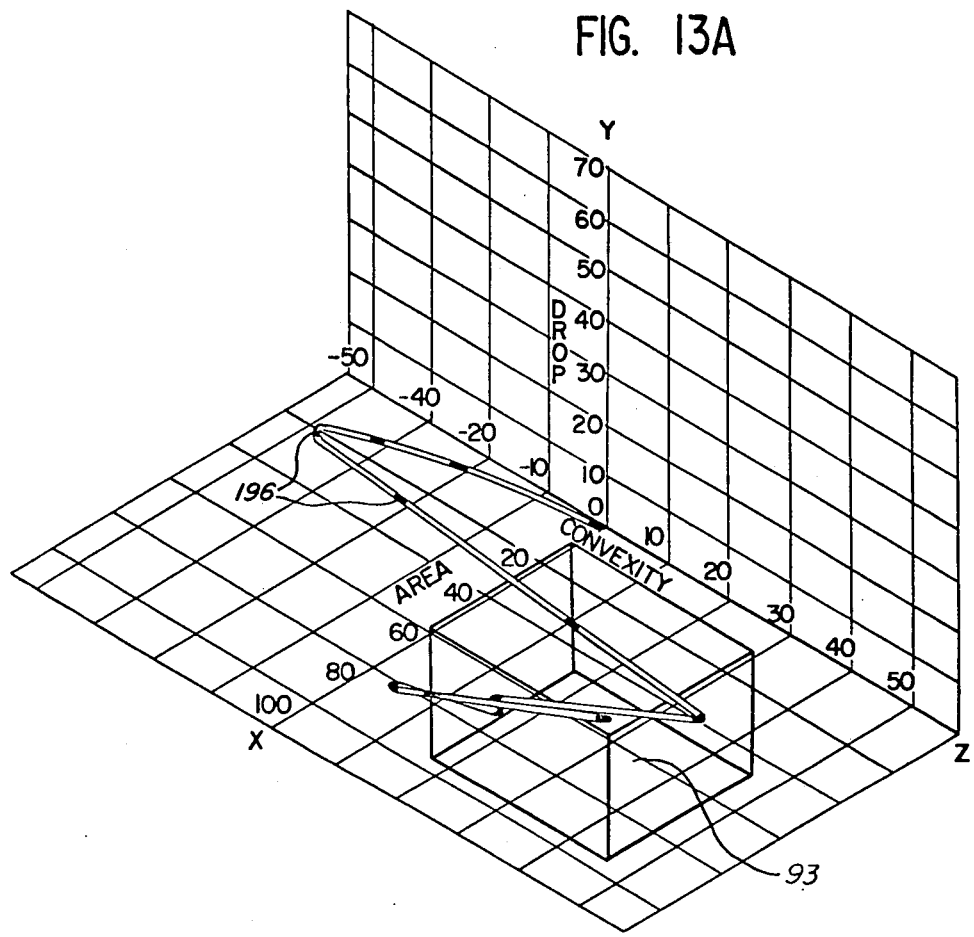
FIGS. 13(A–C) illustrate the pattern recognition features and their limits in the feedback welder control system of FIG. 4.
Figure 13B:
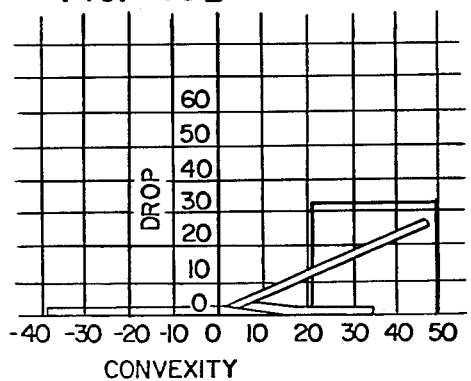
Figure 13C:
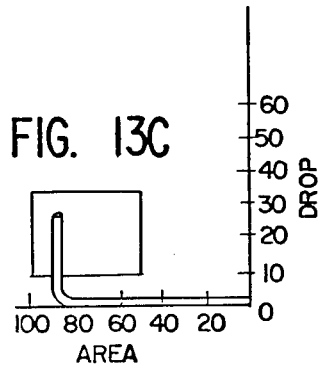

FIG. 12 shows a typical dynamic resistance curve 187 of mild steel during formation of a weld. The vertical axis represents resistance, and the horizontal axis is a measure of time or half cycles of weld current in each weld. During the first few half cycles of weld current during the blanking period data is ignored by the microprocessor 50. As the weld progresses past the valley of the curve at about the fifth half cycle, data is accumulated for the pattern recognition process. As illustrated by FIG. 12, the curve 187 has the following quantifiable features: a definable area 188 located under the curve. A convexity 190 located in vicinity of the peak of the curve and a resistive drop 192 form the peak of the curve 187. Relating FIG. 11 to FIGS. 13A-C, FIGS. 13A-C show the three-dimensional form of the pattern recognition features and feature limits of the feedback welder control system incorporating the concepts of the present invention. FIGS. 13A-C show a rectangular space 93 defined by the limits of resistive drop, convexity and area that are indicative of a quality weld. The first half cycle of the weld current begins at the coordinates 000 and progresses as shown by the dots 196, each dot representing the status of the resistance curve for an individual weld at the end of successive half cycles of current conduction, for approximately 11 half cycles before the plotted features fall within the limits of a rectangular space 93 indicating a quality weld. Thus, this three-dimensional representation of feature space maps out the three features of a resistive curve in FIG. 12. The three features are the resistive drop, as previously discussed, the delta R as being the drop, the area which is the area under the curve, and the convexity which is taken as being positive when the curve is higher in the center than it is at its ends. The three axes, as shown X, Y and Z, represent these features of area, resistive drop and convexity, respectively. The box 93 represents the limits on the acceptable values that these features can take and, as the weld progresses, the features are evaluated at each half cycle. The features start out with coordinates at 000 as their origin and, as the weld progresses for each half cycle, the features can be mapped into this three-dimensional space and they form a trajectory which eventually, if a quality weld is completed, ends up inside the box 93 (limit box). When this occurs the current to the weld is terminated. If the trajectory fails to enter the box 93, the weld is allowed to continue until the maximum number of preprogrammed cycles are expended.

Figure 10A:
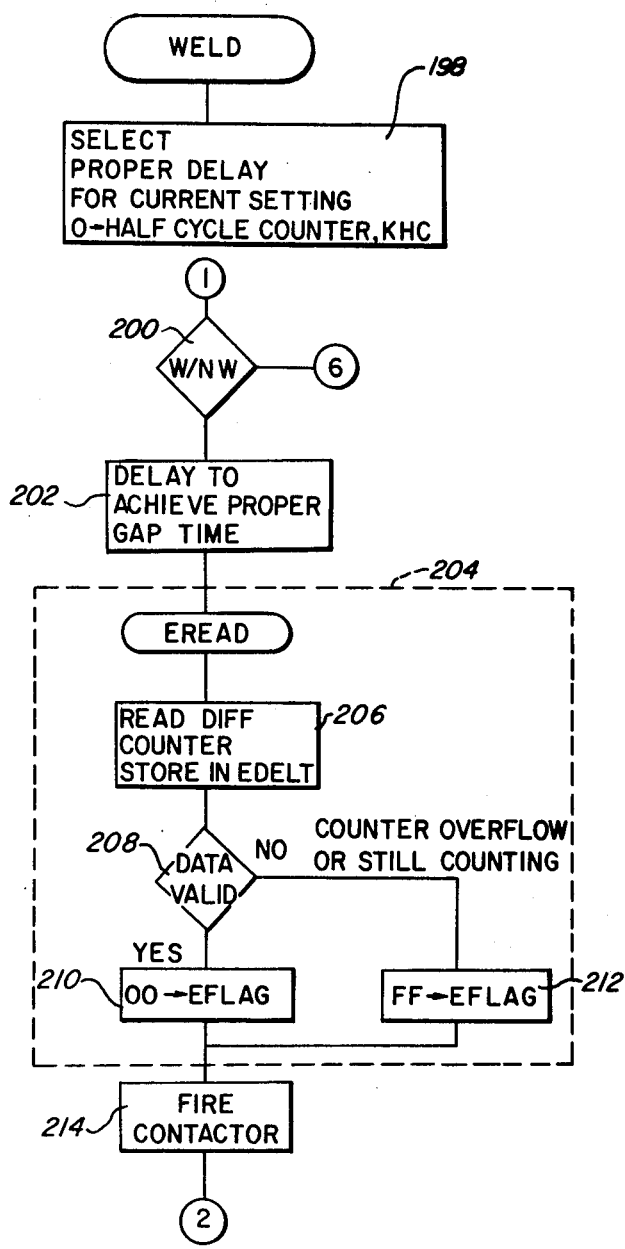
FIGS. 10A, 10A', 10B, 10B' and 10C are block diagrams of a flowchart of the embodiment of FIG. 4.
Figure 10A:
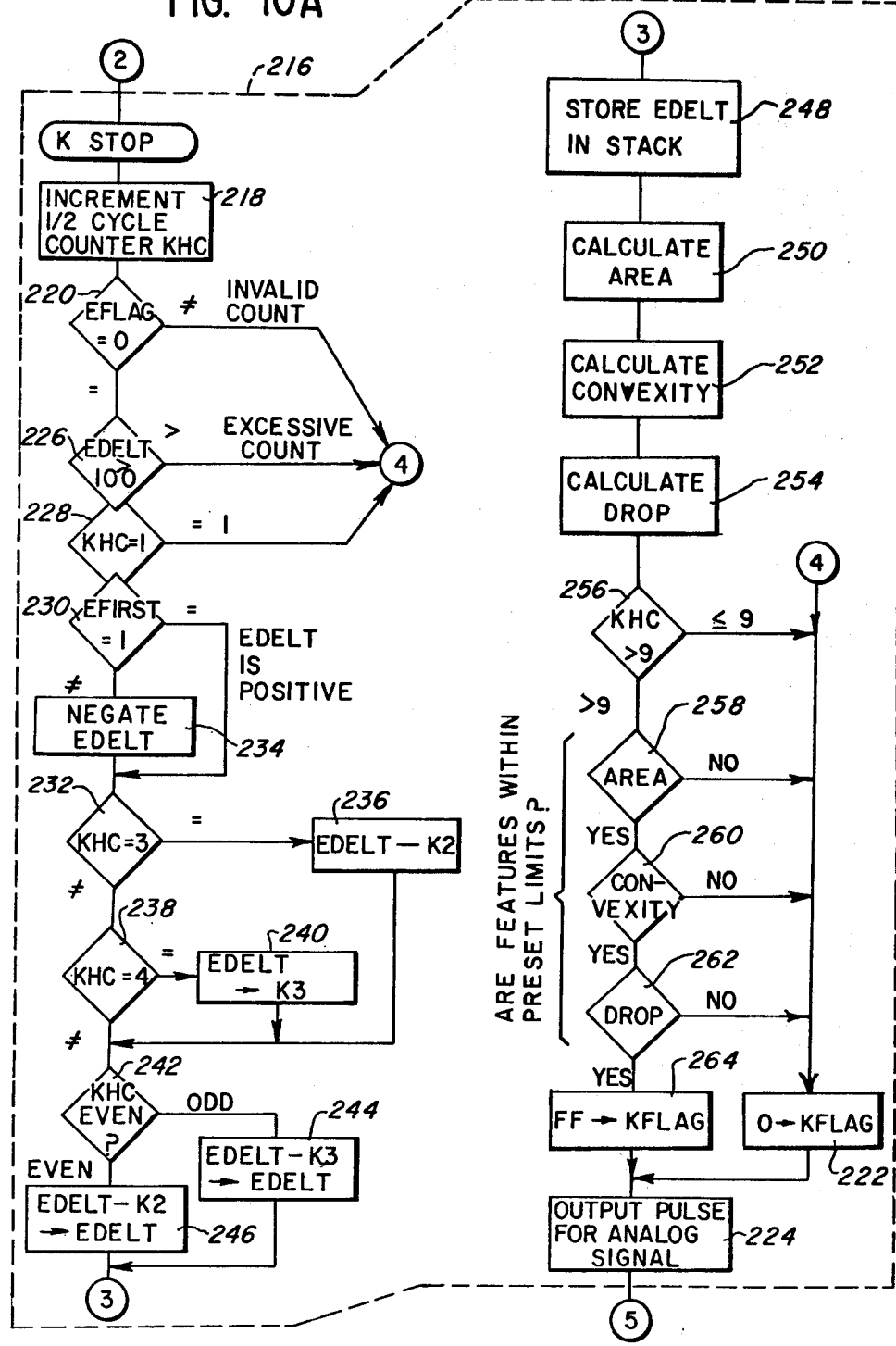
Figure 10B:
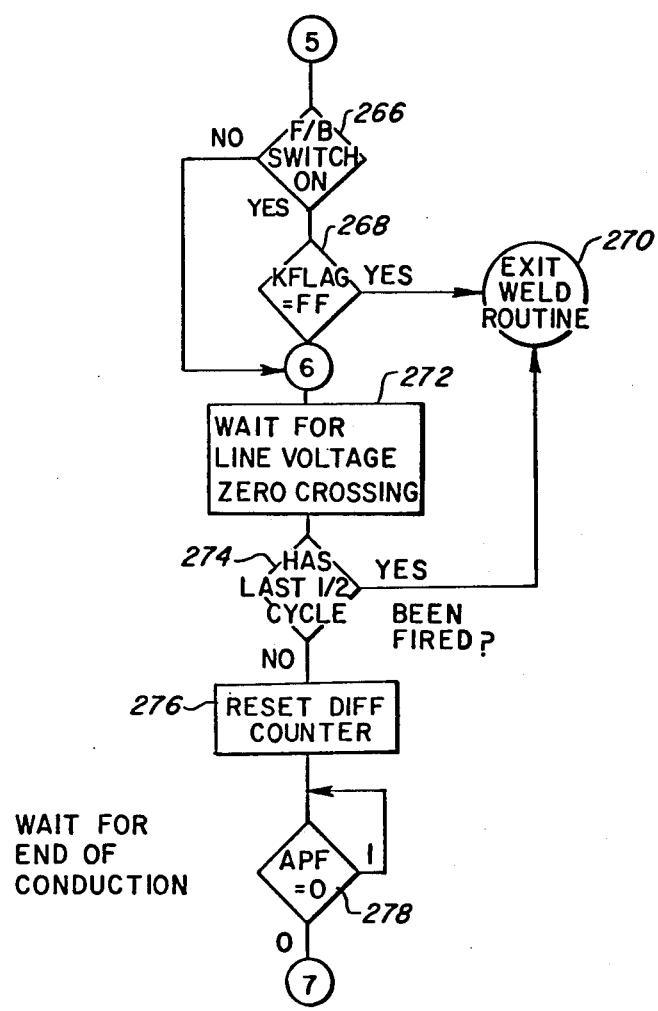
Figure 10B:
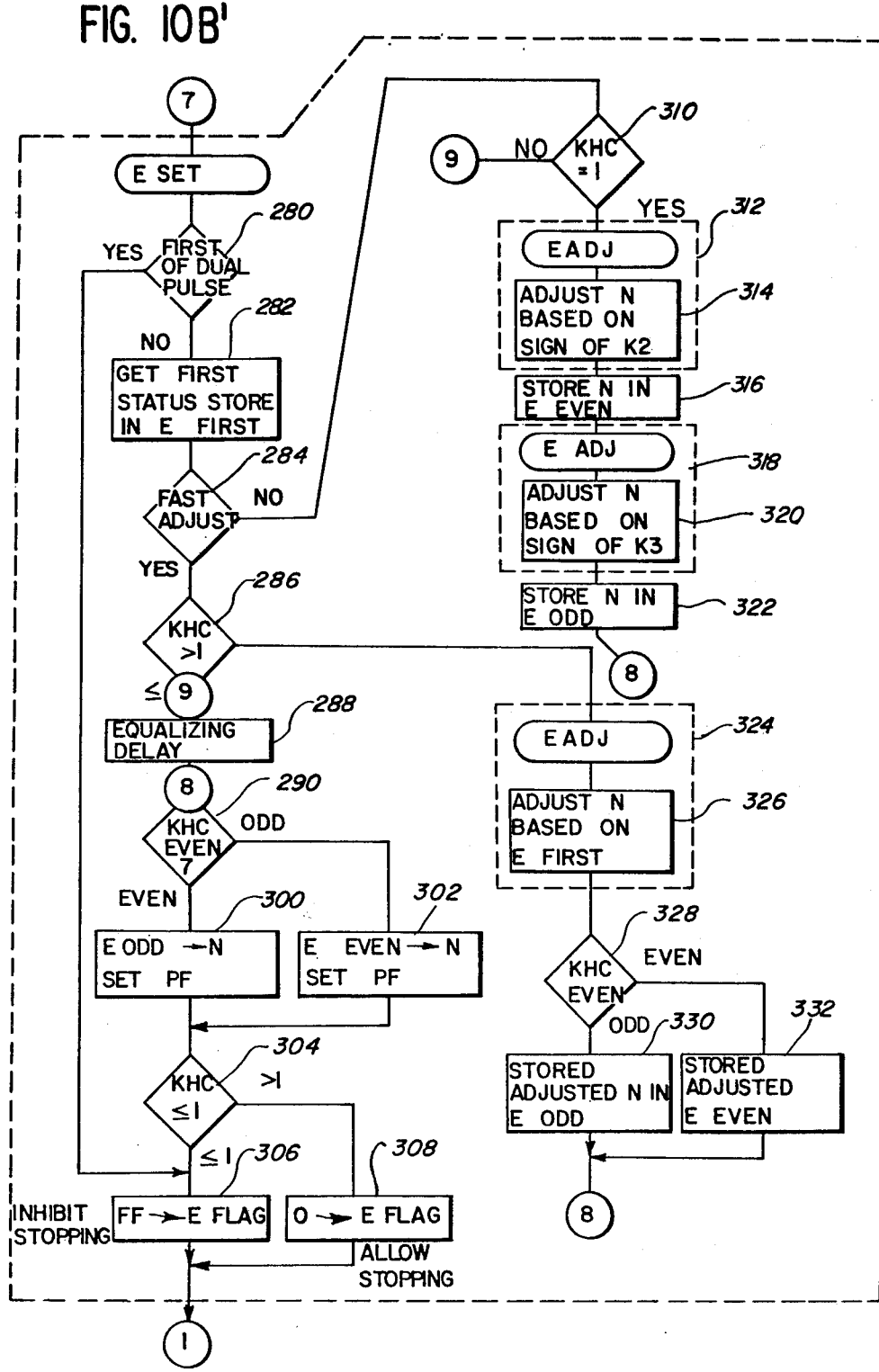
Figure 10C:
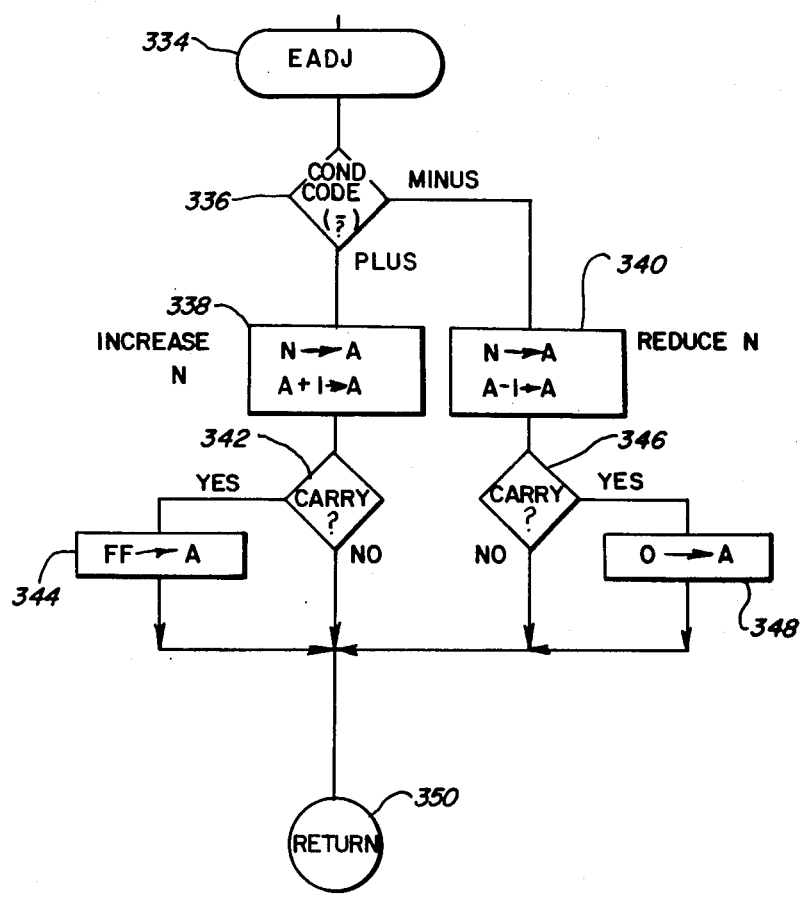

Referring to FIGS. 10A-C, upon initiation of a weld, the feedback welder control system provides a solenoid output to close the weld tips onto a workpiece and pauses for a sufficient length of time to permit the electrode tips to settle, as previously described. This sequence of events is identical to that described in the '724 patent and reference herein is made to that patent as well as the previous discussions herein.

At the end of the squeeze time period, the microprocessor 50 enters a weld subroutine as shown in FIG. 10A. Based on whether it is a first or second weld of a dual pulse schedule, a block 198 selects an appropriate preprogrammed current as described in the '724 patent, checks the selected current for limits and prepares for initiation of the weld current by setting appropriate delays in RAM memory locations in a manner similar to that described in the '724 patent. In addition, block 198 zeros a half cycle counter (KHC) for use later in the subroutine. A decision block 200 circumvents the current initiation and feedback process of the controller, if the feedback welder control system of the present invention is in a no-weld mode as previously described herein and in the '724 patent.

Continuing to a block 202, the microprocessor 50 by means of a fixed cycle time, as previously described in the '724 patent, provides a precision delay prior to the initiation of each half cycle current to both control the magnitude of the current and to avoid excessive in-rush currents. Just prior to initiating current, the microprocessor 50 momentarily enters an EREAD subroutine 204. The EREAD subroutine 204 includes a block 206 which interrogates the DIFF counter 85 in FIG. 7, as previously described, and transfers the contents of the DIFF counter 85 to a RAM memory location called EDELT. A block 208 is a decision block and it determines if the data entered in EDELT is valid. The data is considered valid if the counter 85 has not overflowed and if the counter 85 has stopped counting (the DIFF signal 75 must not be a logic one). For valid data, a block 210 sets a data invalid flag, EFLAG, to zero. For an invalid case, a block 212 sets EFLAG to FF. At this point, the microprocessor 50 returns to the weld subroutine at a block 214 where a weld firing signal or gate pulse is issued to initiate conduction of the SCR contactor 19. The block 214 also includes a half cycling diagnostic item 98 in the diagnostics table 44 in FIG. 5 similar to the one described in the '724 patent. The microprocessor 50 once again leaves the weld subroutine and enters into a subroutine called KSTOP blcok 216, shown in FIG. 10A.

The subroutine KSTOP performs the following functions: (1) converts the data in EDELT into standard 2's complement notation and normalizes it; (2) stores the data in a data stack; (3) extracts the features from the resistance curve (the data in the data stack); (4) compares extracted features to the preprogrammed pattern recognition limits entered as described in the explanation of FIG. 5; (5) sets or clears a weld stop flag, KFLAG, based on the feature comparison with the pattern recognition limits; and, (6) issues an output pulse proportional in length to the EDELT obtained from the last half cycle.

Upon entering the KSTOP subroutine 216, the microprocessor 50 increments the half cycle counter KHC in a block 218. The counter KHC is subsequently utilized during the weld to control sequences of operation for the feedback welder system. A decision block 220 checks EFLAG. If EFLAG is not equal to zero, invalid data is present in EDELT and the microprocessor 50 exits the KSTOP subroutine via blocks 222 and 224. Block 222 enters a zero in KFLAG, the weld stqp flag, to prevent the controller from terminating the weld. Block 224 provides an output pulse of a duration proportional to EDELT for conversion to an analog signal suitable for a strip chart recording. Returning to decision block 220, if the data is valid, EFLAG will be zero and control transfers to a decision block 226. In block 226, EDELT is tested for an excessive magnitude of 100 counts or more. From previous experimental data it is known a count of 100 or more is considerably larger than any data normally generated during a particular half cycle in a weld process. If the data is found to be excessively large, the microprocessor 50 exits KSTOP via blocks 222 and 224, as discussed above. A block 228 checks the half cycle counter KHC for equality to one. If KHC is one, block 228 transfers to blocks 222 and 224. This avoids saving data from the first half cycle in each weld.

Exiting block 228, blocks 230 and 234 change the sign and magnitude as defined by EFIRST and EDELT, respectively, into 2's complement notation. If current extinction on the previous half cycle occurred prior to the model current, then EFIRST will be a logic one and block 230 transfers control to a block 232. If the welder current extinguished last (an indication of a negative change in resistance), the block 230 transfers control to a block 234 where a negation or 2's complementation is performed on EDELT to make EDELT a negative number. In block 232, KHC, the half cycle counter, is compared to a numeral three. If equal to three, ELELT will be stored in an address K2 by a block 236. Similarly, blocks 238 and 240 will store EDELT in a location K3 if KHC equals a number four. Note that, at this point, KHC, the half cycle counter, will equal three when the data in EDELT is from the previous half cycle two, and, when KHC equals four, EDELT will be from half cycle three. Thus, K2 contains EDELT from half cycle two and K3 contains EDELT from half cycle three. These two values of EDELT are used subsequently to normalize the EDELTs generated during the remainder of the weld by subtracting K2 from the EDELTs generated by even numbered half cycles (KHC=2, 4, 6, etc.) and K3 when KHC is odd. Half cycles two and three have been selected for normalizing because they correspond approximately to the valley point of the resistance curve for most ferrous materials, see FIG. 12. Blocks 242, 244 and 246 perform an operation of subtracting either K2 or K3 from the EDELTs throughout the remainder of the weld. The normalized data EDELTs are then stored in an 8-word storage stack by a block 248. Operation of this block 248 is such that no more than eight EDELTs can be stored at any time. When an additional EDELT arrives from another half cycle nine or subsequent ones, the oldest EDELT is discarded. Thus, the stack always contains the eight most recent EDELTs.

The next three blocks, 250, 252 and 254, extract the curve features (area, convexity and resistive drop) from the EDELT data stack. Block 250 generates the feature called area. This is accomplished by summing the normalized EDELTs, starting with the half cycle two, and continuing the summation throughout the weld. Because the area may become very large (it could conceivably overflow an 8-bit register in the microprocessor 50), the area calculation is carried out using a double-precision (16-bit) method. In addition, the area is divided by 16 to facilitate a comparison with limits in a block 258. In the event that after division by 16 the area is too large to be entered in an 8-bit register, block 250 zeros the area to inhibit stopping on this weld.

The next curve feature extracted is convexity (block 252) which is used to detect the curvature over the last eight half cycles. If the normalized EDELT from the most recent half cycle is called R(n) and the next most recent is R(n−1) and so forth, the convexity function is defined as:
$KCV = -R(n) - R(n-1) + R(n-2) + R(n-3) + R(n-4) + R(n-5) - R(n-6) - R(n-7)$. The eight R(n)'s were previously stored in the stack by block 248. The convexity function produces a positive KCV if the eight data points, when plotted, have a region in the center which is higher than the end points. A negative KCV results if the opposite is true. Again, because of the possibility of register overflow in the microprocessor 50, a double-precision method of computation is used. Additionally, KCV is divided by two and, if still too large to fit in an 8-bit word, it is cleared to zero to inhibit terminating the weld.

The resistance drop from the peak is determined by the block 254. This block selects data corresponding to the highest point on a resistance curve and subtracts subsequent data values from the selected data to determine the amount of drop from the peak. If a new peak is detected, the previous selected data is discarded and the new highest peak data is retained. Because of dissymmetries in the control electronics and in the conductive properties of the welding circuit, the EDELTs, after normalization, may have an alternating variation in amplitude, i.e., those from odd half cycles may be larger than those from even half cycles, or vice versa. Block 254 avoids errors caused by this alternating phenomena by utilizing the average values of adjacent pairs of EDELTs. Thus, the peak value retained is the highest adjacent pair average and the resistive drop is based on a difference from the peak and subsequent adjacent pair averages. After the three features are extracted from the EDELT data train, a block 256 checks the value of the half cycle counter KHC. If KHC is less than or equal to nine, the data stack has not been filled and the convexity feature is not valid so control is passed to block 222 to prevent termination of the weld. If KHC is greater than nine, the convexity feature is compared to the preprogrammed limits as previously referred to in the description of FIG. 5. Block 258 compares the area to the upper and lower limits of area set in the sequence module panel 36, and, if the area is within the preprogrammed limits, control then passes to a block 260; if not, to block 222. The convexity decision block 260 then compares the convexity to the upper and lower preprogrammed limits of convexity. If the convexity is within the preprograxmed limits, control passes to a block 262; if not, the control passes to block 222. Finally, in a like manner, block 262 checks the value of the resistive drop against the preprogrammed resistive drop limits. If the resistive drop is within the preprogrammed limits, control passes to a block 264; if not, to block 222. Block 264 can be entered only if all three features are within the preprogrammed limits as set on the sequence module panel 36. Block 264 sets the weld stop flag, KFLAG, to hexadecimal FF. This causes a cessation of the weld current when a block 268 in FIG. 10B is encountered in the weld subroutine. The last block, 224, in the KSTOP routine produces an output pulse having a duration proportional to EDELT. This is used in the production of an analog signal for observing the resistance curve as it is being generated during the weld.

Control then returns to the weld subroutine block 266, as shown in FIG. 10B. The block 266 tests a preprogrammed word called the feedback switch. If it is set to any non-zero number, indicating the feedback mode as described in the description of FIG. 5, control transfers to the block 268 which terminates the weld current if KFLAG is set to FF by transferring to the exit point 270. If the feedback switch is preprogrammed to zero, block 268 is by-passed preventing early termination of the weld. Control then passes to a block 272 where the microprocessor 50 monitors the lead trail signal 99A, and waits until a transition indicating that the line voltage has crossed zero. Control then transfers to a block 274 which determines if the total number of preprogrammed half cycles have been expended in the particular weld. If all pre-programmed half cycles have been expended, a non-feedback type of exit is made from the weld routine via a block 270. If cycles remain, control passes to a block 276 which resets the DIFF counter (third section 95 in FIG. 7) in preparation for the extinction of the half cycle now conducting. A block 278 causes the microprocessor 50 to wait for the weld current to extinguish as indicated by the APF signal 34 switching to zero, as previously described. When the APF signal 34 becomes zero, control is transferred to the ESET subroutine to accomplish the following: (1) reads and retains the FIRST signal 73 in EFIRST; (2) performs a series of steps which adjust the power factor of the analog circuit to match the power factor of the welder; and, (3) selects the proper value of N for the next half cycle (N being the control word which determines the power factor of the analog circuit).

Upon transfer of control to the ESET subroutine, the microprocessor 50 using a block 280 checks if this weld is the first weld of a dual pulse weld (see FIG. 10B). It is assumed that the first weld of a dual pulse weld is used for electrode setting and fit-up improvement and no welding is not intended to take place during the first pulse. Thus, the feedback process is inhibited by setting the data invalid flag, EFLAG to hexadecimal FF, in a block 306. If the weld is a single pulse weld or the second pulse of a dual pulse weld, control then transfers to a block 282. In the block 282, the FIRST input signal 73 is read and its state is stored in EFIRST for subsequent use. Control then transfers to a decision block 284 which determines if the preprogrammed number in location 18 is non-zero indicating that the first adjust mode has been selected as described in the description of FIG. 5. If the normal mode is selected by a zero in location 18, a single adjustment of the analog circuit power factor is made during the first half cycle of the weld. Assuming the fast adjust mode is selected, control transfers to a block 286 where the contents of half cycle counter, KHC, is compared to one. If less than or equal to one, no adjustment is made, and control is transferred to a block 288. Half cycle one is not used for adjustment because oxides, oil and other foreign matter on the workpieces may create an abnormally high contact resistance which influences the extinction angle of the first half cycle. For half cycles greater than one, a subroutine EADJ block 324 is entered which adjusts N, the analog circuit power factor control word, based on the value of EFIRST. Referring to FIG. 10C which is a block diagram of the EADJ routine, a block 336 determines whether to increase or decrease N based on the condition code register in the microprocessor. If the EADJ subroutine has been entered by way of the block 286 on FIG. 10B', the condition code register would have been set to a minus if the analog circuit had extinguished first or positive for the opposite case. If positive, block 336 transfers to a block 338, where the present value of N is increased by one and retained in the accummulator A of the microprocessor. Similarly, if minus, a block 340 reduces the value of N by one and retains it in the accummulator A. A block 342 then checks for overflow on the addition of a block 338. If the carry bit is set in the microprocessor, accummulator A is set to FF in block 338. Similarly, blocks 346 and 348 detect and record an overflow condition resulting fron subtraction. The EADJ suhroutine is then exited via a block 350 with the new value of N in the accummulator A of the microprocessor.

Returning to FIG. 10B', after a block 326 has adjusted N, a block 328 determines whether the present value of the half cycle counter KHC is odd or even and, if even, the adjusted value of N is stored in EEVEN by a block 332. Similarly, if KHC is odd, a block 330 stores the adjusted value of N in EODD. Control then transfers to a block 290.

Referring to block 284, if the fast adjust mode is not selected, a block 310 obtains control. In block 310, the half cycle counter (KHC) is compared to one. If it is not equal to one, block 310 transfers control to a block 288, an equalizing delay designed to consume as much time as blocks 312–322 to avoid upsetting the weld timing. If KHC equals one, the block 312 tests the arithmetic sign of K2, the even half cycle offset from the previous weld, and transfers control to the EADJ subroutine.

Ihe EADJ subroutine increments the value passed to it if the condition code is positive and decrements the value if the condition code is negative. In the block 312, EADJ is given EEVEN and the sign of K2 is tested to set the condition code. In the block 316, the new value of N is stored in EEVEN. Block 320 performs in a similar manner to block 312 by adjusting EODD based on the sign of K3. The new N is then stored in EODD by the block 322. Following the block 322 control transfers to a block 290 where the half cycle counter KHC is tested for an even or odd value. If even, a block 300 takes the value in EODD and outputs it to the analog circuit where it sets the power factor for the next half cycle (an odd half cycle). Conversely, if KHC is odd, a block 302 takes the value in EEVEN and sets the power factor for the next half cycle. This procedure implements a dual system of control with the odd half cycles and the even half cycles treated independently for adjustment purposes. Thus, optimum adjustments are found even though some dissymmetries may exist in the electronic circuits or in the conductive properties of the welder circuit.

A block 304 is used to set or clear the data invalid EFLAG using blocks 306 and 308. The flag is set to invalid FF for the first half cycle and cleared for subsequent half cycles. Control then returns to block 200 in FIG. 10A the weld subroutine where the process begins for the next half cycle. In like manner, the previously outlined steps occur for each half-cycle throughout the weld.

The previously described pattern recognition technique for the welder, control system operated satisfactorily when used in conjunction with a modeling circuit for welding bare steel. A modified recognition technique is used for welding galvanized steel and other special applications. The second recognition technique manages bare steel welding in a manner similar to the previous pattern recognition technique insofar as the characteristic of resistive drop is utilized to determine a proper weld nugget formation. In the case of galvanized steel welding, a predictive methodology is applied in determining the weld terminations time to assure proper nugget formation.

The second recognition technique employs slightly different circuitry than that previously described in that it more closely resembles the circuitry of the '724 patent controller in its connections to various user supplied external devices; that is, it has three weld initiation inputs, three solenoid valve outputs and various other inputs and outputs identical to the '724 patent. However, these changes in circuitry do not materially affect the modeling circuit concept essential to this invention and, therefore, reference is made to the '724 patent for further details as to the operation of these external devices.

In FIG. 15, a front elevation of the sequence module showing the memory locations for the feedback parameters of the second recognition technique is shown. The feedback gun welder control in this embodiment is designed to be as versatile as possible for metals of varying thicknesses and composition, while still relatively easy to set-up and operate. Therefore, the feedback welder controller and a sequence module 700, as shown in FIG. 15, incorporates all of the features of the '724 patent. The controller also provides for two modes for feedback stop time computation, one for plain steel using the resistance drop technique, and, one for galvanized steel using a novel predictive recognition technique. The controller also provides for an additional dynamic stepper which is used in conjunction with either of the feedback modes to vary the weld current to keep the stop times for the welds within a certain predetermined range. To program the control for feedback operation, the control is adjusted to produce an acceptable weld by programming the weld sequence using the sequence module of FIG. 15; that is, a weld current must be selected to form a full size weld nugget within the time restraints of the weld schedule. The time restraints are the minimum and maximum weld time entries of the schedule.

For a single-pulse feedback weld, the maximum time of weld pulse one or two is set to zero. As a result the remaining pulse is used to perform the weld. The controller will not terminate the weld pulse sooner than the minimum weld time setting or later than the non-zero maximum weld time setting.

For dual-pulse feedback welds, weld pulse 1 is used for seating the electrodes to provide a good electrical contact. Weld pulse 2 is used to form the weld nugget. Weld pulse 1 stop time is restrained only by the Weld pulse 1 maximum time entry, not the minimum weld time.

The controller terminates Weld pulse 1 when good electrical contact has teen achieved. Weld pulse 2 stop time is restrained by the Weld pulse 2 maximum time and by the minimum time entry minus the number of cycles used by Weld pulse 1. For dual-pulse welds, the minimum weld time entry is the minimum combined weld time for both weld pulses.

After a valid weld schedule has been programmed including all feedback mode settings, a special adjust mode is entered to set-up the modeling circuitry of the controller. To enter the adjust mode, a 99 is programmed into the appropriate feed tack mode location associated with the desired sequence. After the 99 is programmed, a weld is initated by closing and maintaining closed the initiating switch until the electrodes open after being in engagement with workpieces. During the interval the electrodes are closed the controller automatically adjusts itself as previously described. After the controller senses that it is adjusted, the controller resets the feedback mode setting to the value it contained before the 99 was entered and welds a normal weld and opens the tips. Welding may now proceed without any further entry of data into the sequence module.

The programming of the sequence module in FIG. 15 for the second recognition technique will now be discussed. In the following description, when an X is used in an address, the X refers to the sequence number. For example, X0 refers to location 10 for sequence 1 and location 30 for sequence 3. The function of the storage locations programmed with the sequence module 700 is as follows. Location X0 is squeeze time in cycles which is the same as for the '724 patent. Location X1 for non-feedback welds is the Weld-1 time in cycles. For feedback welds, this is the maximum time for Weld-1. Location X2 is Weld-1 percent current. This is both the current that will be used when no stepper is on and also the initial current for the dynamic stepper. Location X3 is for cool time in cycles which is the same as for the '724 patent. Location X4 for non-feedback welds is the Weld 2 time in cycles. For feedback welds, location X-4 contains the maximum weld time for Weld-2. Location X5 is for Weld-2 percent current. This is both the current that will be used when no stepper is on and also the initial current for the dynamic stepper. Location X6 is for hold time in cycles which is the same as in the '724 patent. Location X7 is off time in cycles which is also the same as in the '724 patent. Location XB is only used for feedback welds. The content of the X8 location is the minimum weld time. Location X9 is used to control the feedback operation for this sequence. Valid data entries for location X9 and their meanings are as follows:

| | |
|---|---|
| 00 | Feedback off. |
| 01-50 | Bare steel feedback mode in effect. The smaller the number, the smaller the drop before weld termination. The larger the number, the greater the drop that is necessary before termination. |
| 72-88 | Galvanized typical steel feedback mode in effect. An 80 is a typical setting, a smaller number results in a shorter weld, a large number results in a longer weld. |
| 99 | Programs the contol into a special adjust mode for matching the modeling circuit to the actual welder. |

The significance of locations 40-43 is as follows:

| | |
|---|---|
| Location 40 | Refers to squeeze delay in cycles, which is the same as for the '724 patent. |
| Location 41 | Refers to the stepper mode selector. Valid data entries for the location and their meaning are as follows:<br>01   Standard or MICC stepper |

-continued

| | | |
|---|---|---|
| | | for sequence 1. No stepper for sequences 2 and 3. |
| | 02 | Standard or MICC stepper for sequences 1 and 2. No stepper for sequence 3. |
| | 03 | Standard or MICC stepper for sequences 1, 2 and 3. |
| | 11 | Dynamic stepper for sequence 1. No stepper for sequences 2 and 3. |
| | 12 | Dynamic stepper for sequences 1 and 2. No stepper for sequence 3. |
| | 13 | Dynamic stepper for sequences 1, 2 and 3. |
| Location 42 | | Refers to the adjust mode delay time in cycles. The number of cycles between adjust mode pulses is equal to the content of this location plus 30 cycles. |
| Location 43 | | Dynamic stepper delay. The content of this location is the minimum number of welds that are made before the dynamic stepper will increment or decrement its current by 1. This controls the gain of the dynamic stepper. |
| Location 44 | | Special dual pulse selector. A zero in location 44 programmes the control for normal operation. A non-zero number causes the control to operate in a special dual pulse feedback mode providing that location X9 is programmed for feedback welding. |

This mode ignores pulse-one of a dual pulse weld for feedback weld purposes. It uses pulse-two as a single pulse feedback weld, except that the number entered in location 44 is the number of cycles of blanking before the feedback process is initiated.

If stepper operation is desired, the operator has the option of selecting the standard stepper (MICC) similar to that described in the '724 patent or the dynamic stepper is available. Stepper selection is accomplished by programming the proper number in RAM memory location 41 via the sequence module 700. In event the standard stepper is desired, the number 01, 02, or 03 is programmed into location 41 signifying stepper control for sequence 1, or sequences 1 and 2, or sequences 1, 2, and 3, respectively. The dynamic stepper is selected by programming the numbers 11, 12, or 13 into location 41 signifying stepper action for sequence 1, or sequences 1and 2, or sequences 1, 2, and 3, respectively.

For the standard stepper MICC programming is accomplished in the manner disclosed in the '724 patent as shown in the block 700 B (FIG. 5). For the dynamic stepper weld 1 and weld 2 currents are programmed into paired locations 69–68, 79–78, 89–88, for sequences 1, 2 and 3 respectively. The dynamic stepper adjusts the welding current so that a quality weld is completed during the weld interval. If the weld current intervals under feed back control of a group of welds tends to be too short, weld current is decreased by a fixed increment by the dynamic stepper. Conversely if the weld current intervals tend to be too long, current is increased by a fixed increment by the dynamic stepper. The numerical size of the group of welds is preprogrammed in location 43 using the sequence panel in FIG. 15. A series of welds stopping at some median time or with a well balanced mix of weld stop times will produce no changes in stepper current, i.e., the current level in use is assumed to be acceptable.

As welding progresses and electrode tip wear becomes significant, spreading of the current over a larger area by the worn tips manifests itself as a tendency for the weld intervals as determined by the feedback control to increase. This causes the dynamic stepper to increase the current and as a result decrease the weld interval until tip wear again causes an increase in the weld interval. Unforeseen events, such as a sudden maintained increase in line voltage, make it desirable for the dynamic stepper to reduce the effective programmed current to maintain the actual welding current constant. In this invention, stepper reversal is limited to one-half the change in current from the initial weld current to the highest weld current achieved since the dynamic stepper was last reset.

The initial and ending weld current levels of the dynamic stepper are preprogrammed via the sequence module (FIG. 15). The initial current is programmed in the same location as the basic sequence currents; that is, locations 12, 22, and 32 for pulse 1, and location 15, 25, and, 35 for pulse 2. The ending current levels for the dynamic stepper are programmed into the MICC step 4 locations 63, 73, and 83 for pulse 1, and locations 67, 77 and 87 for pulse 2.

Either the dynamic stepper or the MICC (standard stepper) can be turned on or off using the MICC on/off push button on the sequence module. Resetting of the stepper is accomplished by using the stepper advance push button 708 on the sequence module 700. This procedure is described in the '724 patent.

The sequence module 700 includes the same five operating buttons as in the '724 patent, and those buttons are, left to right: (a) weld/no-weld switch 702; (b) repeat/non-repeat switch 704; (c) stepper on/off switch 706; (d) stepper advance switch 708, which are part of the MICC program; and (e) enter reset switch 710. The sequence module 700 also includes the data display 712 and address 714, a data entry 716 and a run/program switch 718, all functioning the same as in the '724 patent.

FIGS. 17, 17A–F show the hardware for the second recognition technique or the third embodiment. The hardware of this embodiment differs from the hardware of the second embodiment in that the controller more closely resembles the controller of the '724 patent in its connections to the various external devices; that is, the third embodiment utilizes three weld initiation inputs, three solenoid valve outputs and various other inputs and outputs as in the '724 patent. However, none of these differences are important to the modeling circuit concept and operation of these various features can be understood by referring to the '724 patent for greater detail.

Figure 17:
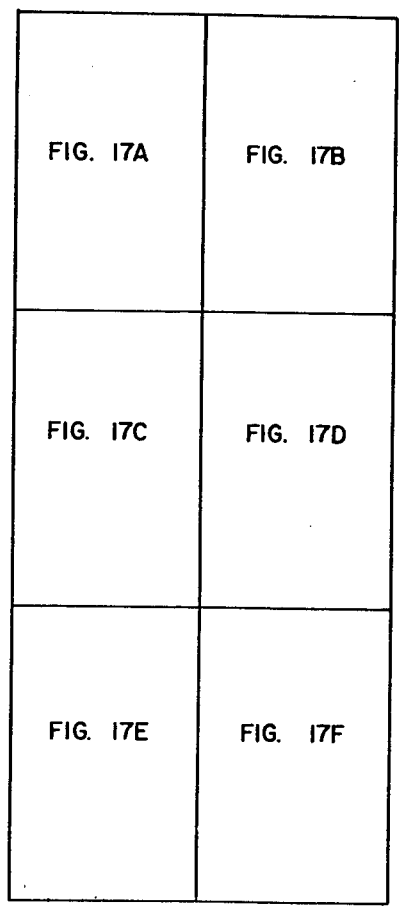
FIG. 17 is a plot showing the relation of FIGS. 17A, 17B, 17C, 17D, 17E and 17F.
Figure 17A:
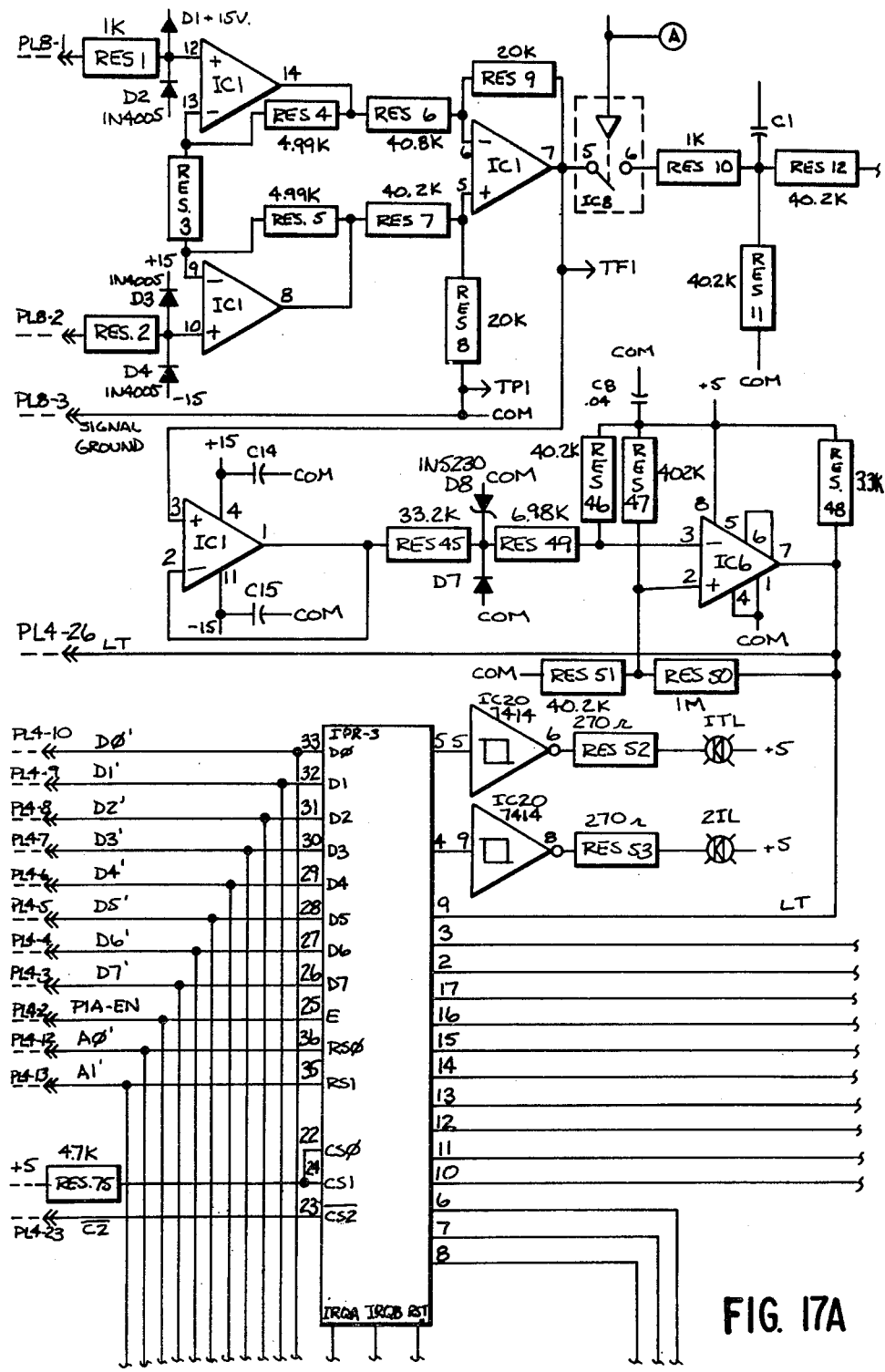
Figure 17B:
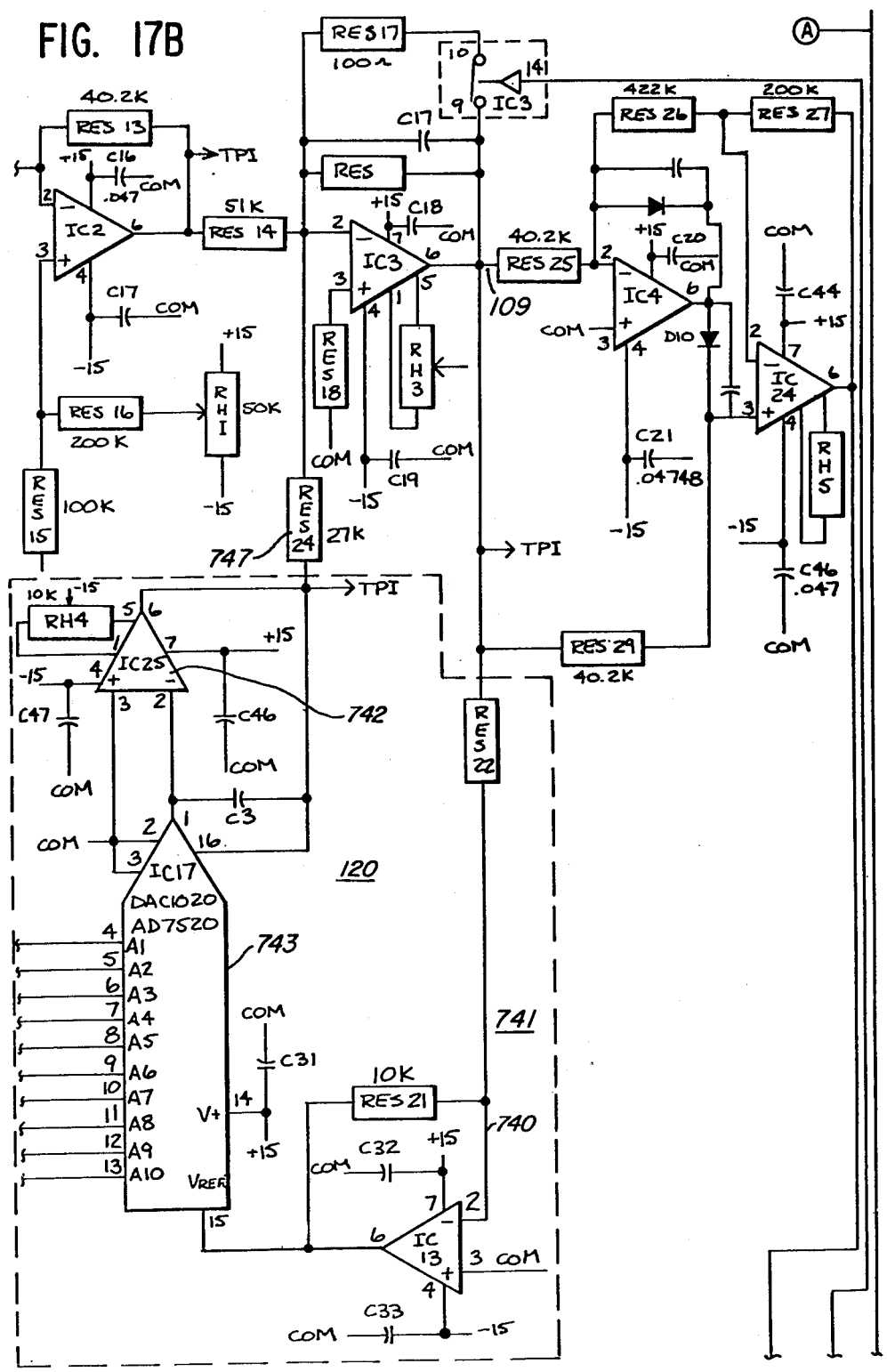

The power factor select circuit 741 for the third embodiment shown in FIG. 17B utilizes a digital-to-analog converter (DAC) 743, having switches plus an R-2R ladder resistor network. The DAC select circuit 743 also includes an input buffer amplifier 740 and an output buffer amplifier 742 for the resistor and switch network 741 which is the equivalent of the power factor select circuit 111 in FIG. 8A.

Furthermore, the manually selectable clock circuit consisting of IC10A, IC10B and switches 1, 2, and 3 in FIG. 8d(b) has been replaced by a software controlled clock frequency divider in block 744 (See FIG. 17C) that is (capable of dividing by powers of two from a maximum of four megahertz). This allows the software to select a suitable clock frequency for the particular welding apparatus and workpiece material. Also included in the hardware changes of the second recognition technique is a serial data output port 746 shown on FIG. 17E that is suitable for connection to a line printer or teletype. The software contains a series of instructions which, after each weld, outputs a message containing the various weld parameters, i.e., the weld sequence variables of current and time, the sequence selected, stepper on/off, etc., and a tabulated listing of the resistance value for each half cycle of weld current.

FIGS. 17 (A–F) illustrates a circuit diagram which is similar to FIGS. 8a–d with the digital-to-analog converter (DAC) 743, the clock divider circuit 744 and the digital data output port 746 added. DAC 743, its operational buffer amplifiers 740 and 742 replace the block 111 of FIG. 8a. In this circuit, the DAC 743 serves as a variable gain device in which the gain varies between zero and one in proportion to the numeric value of the data represented by the ten input lines, A1–A10. The buffer amplifiers 740 and 742 each have a gain of one, thus, the overall gain through the amplifiers 740 and 742 at the DAC 743 is equal to the DAC 743 gain. The integrator output 109 shown in FIG. 17B is multiplied by the DAC 743 gain and applied to the input via summing resistor 747. It can be shown that this integrator circuit with the DAC 743 in the feedback path has a phase shift angle between input and output under the condition of sinusoidal excitation of angle $\theta$ where:

$$\text{Power Factor} = \cos\theta = \cos(\tan^{-1}(WC(BR_3+R_2)))$$

Where:
 $W = 2\pi f = 377$ (freq. = 60 Hz.)
 $R_2 = 35k$ ohms
 $R_3 = 128k$ ohms
 $C = 0.047 \times 10^6$ Fd
 $B = N/1023$ where $0 \leq N \leq 1023$
thus $\theta \leq B \leq 1$.

Where N = the numerical value expressed on the input lines A1–A10 to the DAC 743.

The angle $\theta$ is analagous to the phase angle between the voltage and current in a series resistance and inductance circuit which is equivalent to a typical welder load. From the equation for $\theta$, it can be seen that, by varying N, $\theta$ or the cosine of $\theta$ (the power factor) can be varied over a range depending on the circuit values to match a welder load.

Figure 17C:
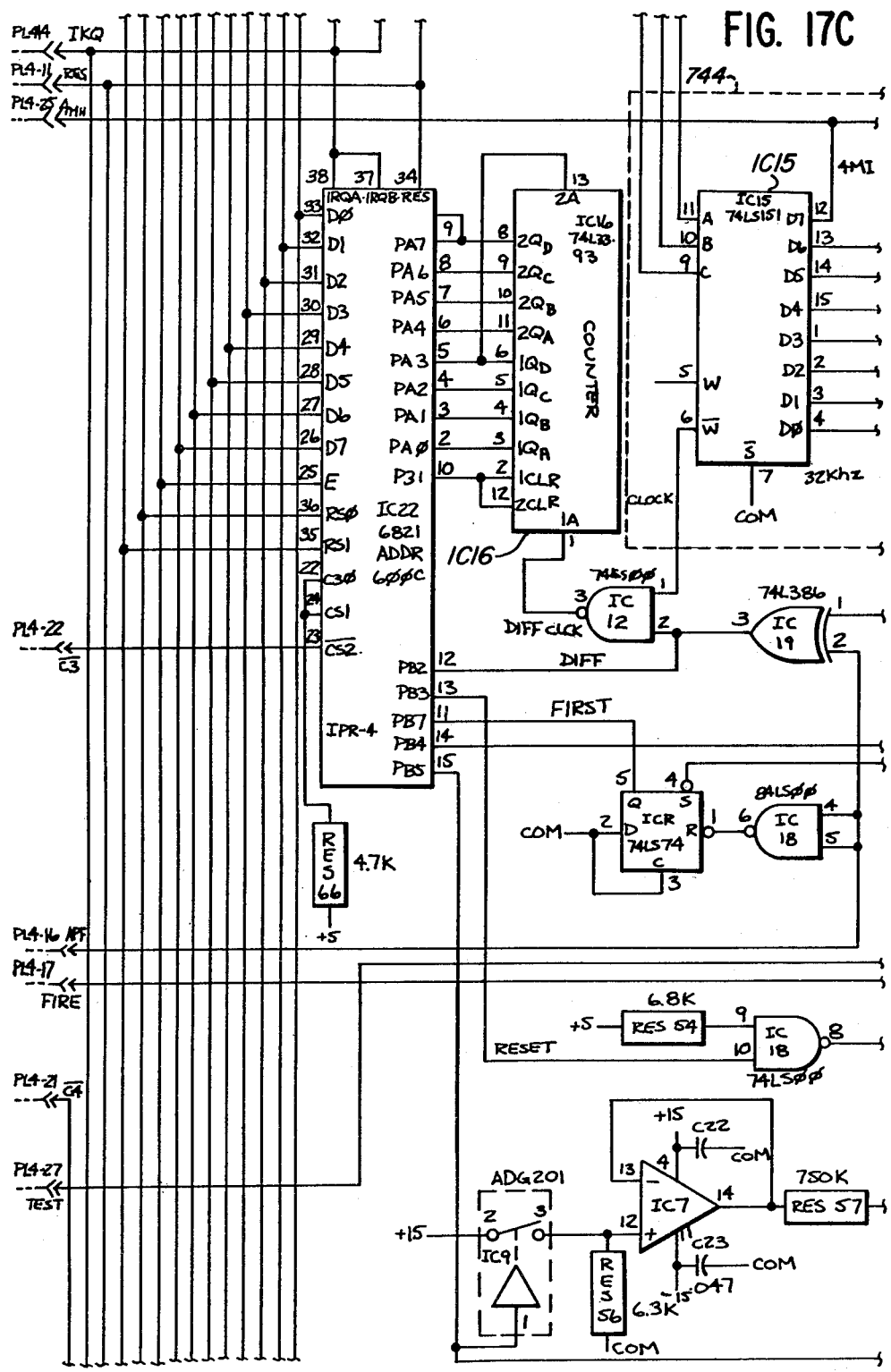
Figure 17D:
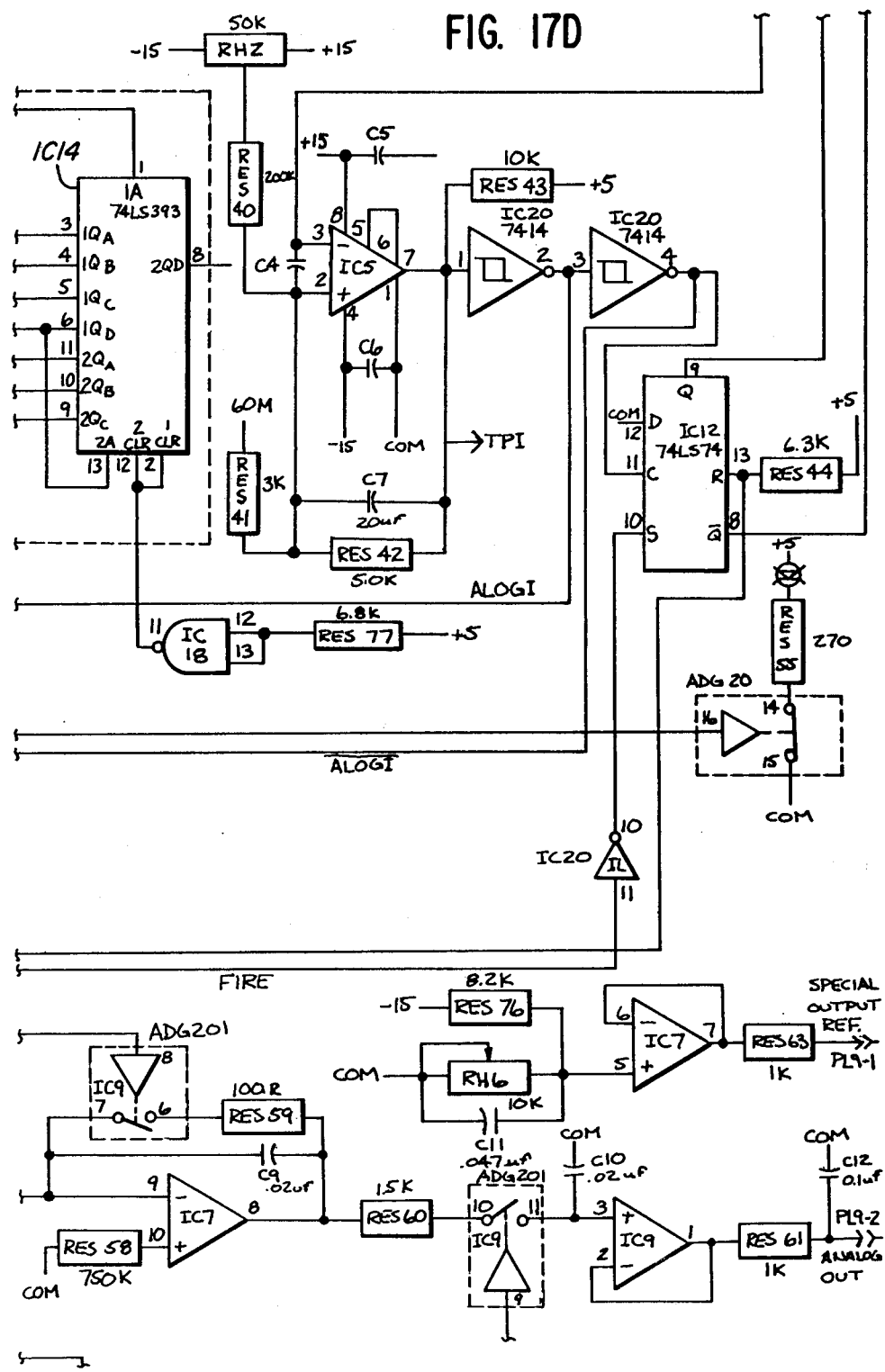

The clock used in this embodiment is a signal which is gated into a counter IC16 and is conditioned by a divider circuit consisting of IC14 (FIG. 17D) and a selector IC15 (FIG. 17C). This divider and selector circuit under microprocessor control via lines A, B and C divides the four megahertz clock (originating from the microprocessor board) by an integer (0–7) power of two. For maximum resolution, the highest clock rate of four megahertz is used. In some cases this can cause the counter, IC16, to overflow and thus lose data. The software program in the microprocessor is designed to monitor the counter, IC16, and between welds adjust to the maximum clock rate possible without overflow.

A digital data output circuit 746 FIG. 17E, provides what is commonly known as RS-232 serial signal that is compatible with a wide range of printing and display devices. This output port PL9-3 includes an asynchronous interface adapter (ACIA) IC23, which allows the selection of variable transmission rates under software control from the microprocessor and performs the parallel to serial conversion of the data transmitted. The operation of this device is well known in the art and further elaboration is not believed necessary. This concludes the differences in circuitry between the second embodiment and the third embodiment.

The pattern recogition technique developed for the welder control described as the second embodiment was designed to work with the resistance curve such as shown in FIG. 12 or 18A. Tests have shown this widely published curve to be an accepted representation of actual curves for bare steel welds between workpieces having approximately the same thickness. Weld nugget formation begins near the peak of the curve and the nugget size can be inferred by the amount the resistance falls from the peak. In the case of galvanized steel welding, the resistance curve is more complicated and appears to be the result of several processes, such as zinc melting, tip indentation, bulk heating, zinc shunting of the nugget area, etc., all of which proceed at their own rates, altering the character of the curve from weld to weld. It also has been found through experimentation that dual pulse welding has the effect of synchronizing those processes occurring at the tip interface at the beginning of the second pulse by means of the cool interval during which the tips and work piece surfaces in contact with the tips are brought to a uniform, reduced temperature. The resistance curve of FIG. 18B illustrates a typical dual pulse resistance curve using galvanized steel material in the welding process. Region I represents the resistance curve of the first pulse of a dual pulse weld. The first pulse is normally of a sufficient duration to break down the initial contact resistances and soften and deform microscopic asperities at the interfaces resulting in a minimum resistance at point A. A slight increase in resistance from point A occurs if the first pulse continues. This is due to heating of the work pieces and the positive temperature co-efficient of resistance of steel.

Region II, called the cool interval, is used to allow the water cooled electrode tips in contact with the work pieces to chill the electrode tip to work piece interface regions. Normally, the cool interval is of such a duration so that the workpiece to work piece interface region retains sufficient heat so that the interface region temperature advantage upon entering the Region III or Weld-2 of the second pulse.

The second pulse begins with a resistance considerably lower than it was at the end of Region I, having decayed during the cool time, Region II. Earlier in Weld-2, approximately at point B, the galvanized coating begins to melt in the work piece to work piece interface. This solders the two work pieces together and, as the soldered area increases in size, it increasingly shunts the area where nugget formation begins. The shunting effect masks the work piece to work piece interface resistance and allows the current to spread over a wider area that would be present when bare steel is welded. Thus, the heat value of the current is reduced in the workpiece to workpiece interface region. The current in the immediate vicinity of the electrode tips, however, is confined by the tip geometry to a small area, and thus is more effective. Experiments have shown that despite the cooling of the highly conductive copper tips and the temperature advantage of the work piece to work piece interface region, the electrode tip interface regions tend approach the temperature of the work piece to work piece interface.

At point C the work pieces have been sufficiently softened under the tips to allow rapid tip indentation. Thus, the peak at C is not related to nugget formation but is indicative in part of the shortening path of current flow caused by the tips' indenting. At point D, the curve becomes indeterminate but bounded by the lines E and F. Between these bounds, the curve typically, but not always, reaches another peak from which it may or may not decline by the time it reaches the line G at which time a nugget begins forming. The region from point D to line G is not well understood. However, this region is believed to be the result of further tip indentation, zinc melting and vaporization, nugget formation, bulk heating of the tips and work pieces, etc., all proceeding at their own somewhat independent rates.

Figure 19:
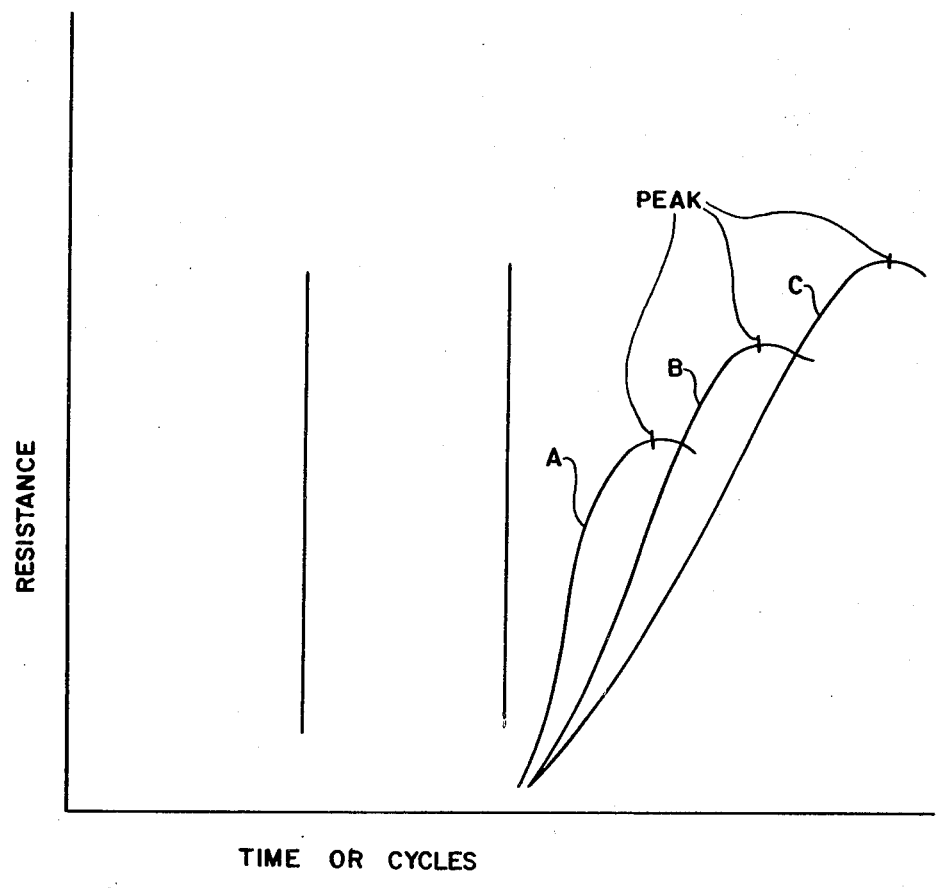
FIG. 19 shows resistance curves for galvanized steel at various current levels.

Thus, the resistance curve for galvanized steel is not considered a reliable indicator of weld nugget formation and growth. Indirectly, however, the resistance curve up to point C of FIG. 18B provides information of the rate that the temperature is rising in the tip interface region. If the current is varied, the length of time to reach point C from the beginning of weld pulse 2 varies. In FIG. 19, a curve labeled A resulted from a higher current than was used to make curve B. Similarly, curve B was made using a higher current than the current used to create curve C. Point C of FIG. 18B occurs earlier with higher current levels than with lower current levels. Thus the interval required to reach the peak at point C can be used to predict weld formation and growth. By measuring the time or number of cycles required to reach the first peak at point C and multiplying the time or cycles by a constant (determined empirically from prior test welds on the actual work pieces of galvanized steel) a predicted weld nugget formation time is ascertained. After welding has proceeded for the computed time, the welding current can be terminated.

THEORY OF OPERATION

Operation of the welder controller in the feedback mode utilizing the second recognition technique requires selection of the appropriate feedback options, such as: the bare steel feedback mode, the galvanized steel mode, dynamic stepper on/off, etc. This results in a large number of possible operation modes.

A typical set-up and run procedure is as follows:
1. The control is programmed in the non-feedback mode and the weld schedule is adjusted to produce the satisfactory welds as previously described in the '724 patent.
2. Depending on the type of metal to be welded, the feedback mode to be used is selected by programming the appropriate numbers into locations 44, and 19, 29 or 39, via the sequence module 700 of FIG. 15. The selection of the exact number is accomplished by a combination of previous experience and observation of weld quality as welding proceeds.
3. Prior to the first feedback weld, the modeling circuit is adjusted to a close match with the actual welder by programming the number 99 into location 19, 29 or 39 via the sequence module 700 and performing a weld on representative work pieces. Closure of the initiating switch causes the control to perform a short four-cycle weld followed by a two-second delay and then another four-cycle weld. This process continues until power factor select block 111 of FIG. 8a has adjusted the modeling circuit to a satisfactory match with the actual welder. When a satisfactory match is achieved, the controller removes the 99 in location 44, restores the number originally preprogrammed therein, and proceeds to perform a weld on the work pieces. Usually, 3 to 5 four-cycle welds are required for adjustment of the power factor select block 111. Fusion in the nugget area does not occur while adjusting, as the four-cycle welds are too short to accomplish an actual weld.
4. For subsequent welds, the controller gradually adjusts the clock and the power factor select block 111 as necessary to provide the best possible data.

Figure 20:
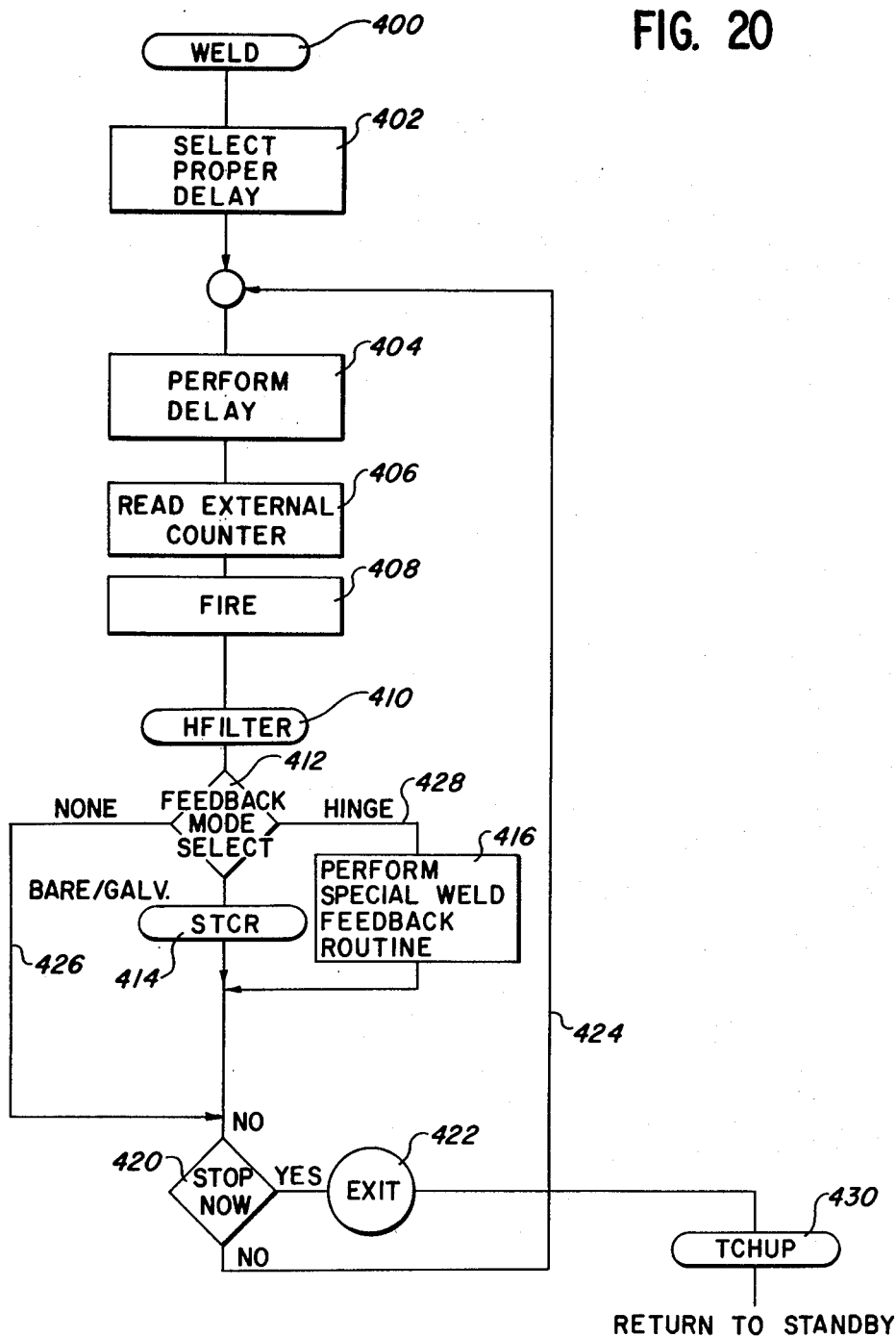
FIG. 20 is a block diagram of a flowchart of the second recognition technique embodiment of FIG. 15.

Referring now to FIG. 20, a flowchart of the weld subroutine for the third embodiment, blocks 402, 404, 406 and 408 are functionally equivalent to blocks 198, 202, 204 and 214 of FIG. 10a, respectively. Block 402 of FIG. 20 selects the proper-relay for the preprogrammed current setting and performs various set-up operations for the weld subroutine in a manner essentially the same as block 198 of FIG. 10a. Block 200 of FIG. 10a is not shown on FIG. 20 to help clarify the flow of the program during anormal weld. Block 404 of FIG. 20 performs the steps needed to achieve the delay prior to firing the SCRs. Block 406 reads the external counter to obtain the difference in time between the actual weld current extinction and the modeling circuit extinction. Finally, block 408 issues the necessary signal to initiate conduction of the SCRs. A detailed explanation of the above is found in the discussion of FIG. 10a.

Upon completing block 408 of FIG. 20, the microprocessor resumes the process of analyzing the resistance data (the counter value read each half cycle by block 406) in the HFILTER of subroutine block 410. In block 410, the microprocessor applies a low pass digital filter to the sequence of the resistance values as they occur to produce a sequence of output values which have high frequency components removed. The filter is designed to use finite impulse response (FIR) techniques that are well known to those familiar with digital signal processing art.

Block 412 is a decision block which routes control via line 426 to block 420, when the control is programmed to provide a nonfeedback mode of operation by entering a zero in location 44 via the sequence panel 700 of FIG. 15, and a zero at locations 19, 29 or 39 via the sequence panel module 700, FIG. 15. In the event that location 44 has been set to a non-zero number a special mode is selected and control is routed via a line 428 to a block 416. (the special weld feedback routine within the weld subroutine.) In this routine, the data in location 44 is used to designate a variable blanking interval to mask out the first pulse and the first portion of the second pulse of a dual pulse weld. At the end of the blanking period, the routine in the block 416 searches for a peak in the resistance values and, if found, evaluates subsequent resistance values for a drop equal to or greater than the preprogrammed value in location 19, 29 or 39. If the control is programmed to operate in one of the standard feedback modes, location 44 is set to zero and locations 19, 29 or 39 will be set to an appropriate non-zero number. If the non-zero number in locations 19, 29 or 39 is set to a value between 01 and 50, the bare steel feedback mode is selected. If the value is between 72 and 88, the predictive feedback mode is selected, as previously described. A range of values between 01 and 50 or 72 and 88, provide a precision adjustment to obtain optimum weld quality and provide control over the energy delivered to the weld area. In the bare steel feedback mode, an STCR subroutine, block 414, evaluates the resistance values for the presence of a valley. Only after a valley has been detected, are the resistance values evaluated for the presence of the peak. After a peak has been detected, the drop from the peak is compared to that preprogrammed in locations 19, 29 or 39 via the sequence module 700. If the resistance drop from the peak is found to be equal to or greater than the preprogrammed value, the subroutine causes the microprocessor to place the value of the present half cycle counter into a RAM memory location called WSTOP.

Selection of the galvanized steel feedback mode is indicated by programming any number between 72 and 88 and placing it in memory locations 19, 29 or 39. In this mode, the STCR subroutine 414 after detecting a valley, evaluates the resistance values for a first peak or inflection point C on FIG. 18B. The time and half cycles from the valley to the first Peak C, is multiplied by a number between 1 and 3 (depending on the exact number in locations 19, 29 or 39) to compute the number of additional half cycles to be fired in the weld. The computed number of half cycles is then added to the present number of half cycles and the result placed in the WSTOP location to be used by a block 420 to stop the weld.

In addition, all three feedback modes in the second recognition technique, the special mode, the bare steel mode, and the galvanized mode, incorporate an expulsion detection feature which will terminate the weld current as soon as expulsion is detected. In the case of a dual pulse weld, the expulsion detector is inhibited in the first pulse and until a peak has been found in the second pulse. The special feedback mode inhibits the expulsion detector during the first weld pulse and during the blanking period of the second pulse.

Decision block 420 compares the values of the half cycle counter with the contents of the WSTOP location. When the two are equal, the weld is terminated by exiting the weld subroutine via an exit block 422. If the half cycle counter is less than the contents of WSTOP, control is transferred to line 424 to return to block 404 where the process is repeated for the next half cycle. After exiting the weld subroutine via block 422, a TCHUP subroutine 430 is entered. This subroutine provides a touch-up adjustment to the power factor select circuit settings based on the data obtained during the previous weld. The subroutine 430, thus, compensates for drift of electronic circuits, cable warming, etc., to keep the modeling circuit accurately adjusted to the actual welding circuit. Upon completion of the TCHUP subroutine 430, the control returns to the standby mode to await another weld initiation.

Figure 21B:
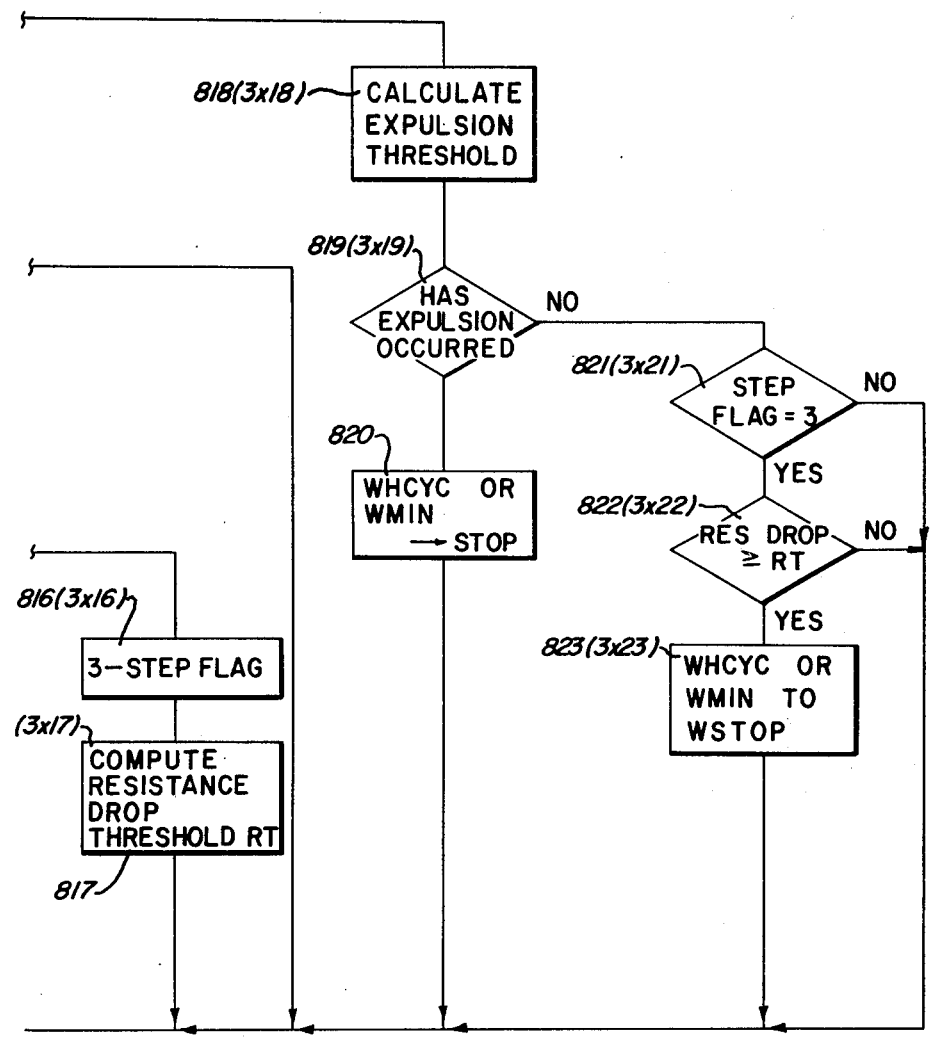

Referring now to FIGS. 21(A and B), 22(A and B), 23 and 24, a more detailed description of the stop time computation touch-up, digital filter and fast adjust subroutines will be discussed.

First, the Stop Time Computation Subroutine (STCR) 800, as shown in FIG. 21A, determines the time at which weld current is to be terminated, based on the resistance data obtained during each half cycle. Sequencing through the various parts of the STCR subroutine 800 is controlled by a Step Flag which is initially zero and set to 1 when a valley is found and set to 2 when a peak is found.

A decision block 801 tests the Step Flag for zero. If the Step Flag equals zero, control transfers to a decision block 802. Block 802 transfers control to a block 806 if the welder control is presently performing the second pulse of a dual pulse weld. This has the effect of assigning the valley of the second pulse resistance curve to the first half cycle of the second pulse, a procedure which is in agreement with experimental results. The decision block 802 transfers control to a block 803 in event of a single pulse weld or pulse 1 of a dual pulse weld is occurring.

In the block 803, the resistance data derivatives (from the HFILTR subroutine) are examined for the presence of a valley. If a valley is found, a block 804 transfers to a block 805; if not, via a return bLock 824 to the calling subroutine. A block 805 places the present value of the half cycle counter WHCYC into the RAM memory location called WVAL. The Step Flag is set to 1 in the block 806 indicating that a valley has been found and the filtered value of the resistance is stored in a memory location called WRVAL. A decision block 807 transfers to a block 808 if the welder control is presently performing the first pulse of a dual pulse weld; if not, block 807 transfers to the block 824 for return to the calling subroutine. The block 808 places the present value of the half cycle counter WHCYC into a memory location called WSTOP. This causes the weld current to cease, if a valley is found during a first pulse of a dual pulse weld.

Referring back to block 801, if a valley has previously been found, as indicated by a non-zero number in the Stop Flag, control is transferred to a block 809. Block 809 will transfer to a block 810 to search for a peak if a valley has been previously found and a peak has not been found as indicated by a 1 in the Step Flag. Block 810, using the resistance data derivatives searches for a peak or maximum in the filtered resistance data. If a peak is found, a block 811 transfers control to a block 812; if not, block 811 transfers control to the block 824 to return to the calling program. Block 812, entered only if a peak has been found, moves the present value of the half cycle counter to a memory location called WPEAK and the filtered resistance value at the peak to a memory location called WRPEAK.

A decision block 813 transfers control to a block 814 if the galvanized mode of feedback has been selected or to a block 816 (FIG. 21B) if the bare steel mode of feedback has been selected. If the galvanized steelfeedback mode control is programmed to operate in the galvanized steel feedback mode, block 814 places a 2 into the Step Flag counter indicating that both a valley and a peak have been found and that the galvanized mode has been selected. Control then transfers to block 815 where the programmed value in location 19, 29 or 39 is mapped linearly into a multiplier coefficient which takes on values between 1 and 3. That is, if location 19, 29 or 39 is a 72, the multiplier is 1; if location 19, 29 or 39 is a 73, the multiplier is 1 ⅛, etc. Next, block 815 determines the number of half cycles between the valley and the peak (WPEAK-WVAL) and multiplies this difference by the multiplier coefficient previously determined. This product is then added to the present value of the half cycle counter WHCYC to produce the calculated stop time. The memory location WSTOP, which controls the weld subroutine, is loaded with the calculated stop time or the minimum weld time, whichever is greater. The minimum weld time has previously been preprogrammed into location 18, 28 or 38. Control then transfers to the calling program via block 824.

Referring back to decision block 813, if the bare steel mode has been programmed, block 816 places a 3 in the Step Flag indicating that both a valley and a peak have been found and that the bare steel mode has been programmed. A block 817 then computes the amount of resistance drop from the peak which must take place for the weld to be stopped. This is done using the value (1 to 50) previously programmed into location 19, 29 or 39, and scaling it according to the clock frequency. That is, the drop threshold RT is scaled to a larger value for high clock frequencies and a smaller value for lesser clock frequencies. This allows the production of consistent weld quality even though the clock frequency may be changed by the TCHUP subroutine. After computing the scaled drop threshold RT, block 817 transfers to block 824 for return to the calling program.

Referring to block 809, if the step flag value is larger than 1, control will transfer to a block 818. Block 818 determines the expulsion threshold which is defined as ¼ the difference between the peak resistance and the valley resistance, ¼ (WRPEAK-WRVAL).

The explusion threshold is linearly limited to a value of 20 at the highest clock rate and down to 3 at clock rate of 500 Khz. or less. A block 819 detects if expulsion has occurred. Expulsion is defined as two adjacent half cycles in which the averaged resistance data exhibits a drop equal to or greater than the expulsion threshold. If the conditions for expulsion are met, a block 820 loads the WSTOP memory location with the present contents of the half cycle counter WHCYC or the minimum weld length WMIN, whichever is larger. Control then transfers to the block 824 to return to the calling program. If expulsion is not detected, the block 819 transfers control to a decision block 821 which, if the Stop Flag is equal to 3 (indicating that a valley and a peak have been found and that the bare steel feedback mode has been selected), transfers control to a decision block 822. If the Step Flag is not equal to 3, the block 821 transfers directly to the block 824 which returns to the calling program. The decision block 822 determines if the total resistance drop from the peak value of resistance (WRPEAK) equals or exceeds the threshold value RT. If yes, control transfers to a block 823 where the present value of WHCYC or WMIN, whichever is larger, is loaded into WSTOP. Control then transfers to the block 824 for return to the calling program. If the resistance drop is not equal to or greater than the resistance drop threshold, block 822 transfers control directly to the block 824 for return to the calling program.

A touch-up (TCHUP) subroutine 850, FIG. 22(A and B), performs the following functions:
1. Monitors the weld resistance data from the previous weld and makes appropriate changes to the modeling circuit (DAC settings) in order to maintain adjustment over an extended period of time.
2. Adjusts the clock speed to achieve the maximum practical resolution without counter overflow.
3. If the feedback controlled stepper option (dynamic stepper) is selected, determines the level of current for the next weld based on previous welds.

A decision block 851 bypasses the subroutine if the controller is in the adjust mode as indicated by a 99 in location 19, 29 or 39. In the non-adjust mode, control transfers to a decision block 852. In the block 852, the alternating component of the resistance data from the previous weld (HBOBL), from FIG. 23, is examined. If HBOBL, is greater than zero, it means that the odd half cycle DAC setting is too small and the even half cycle DAC setting is too large. A block 854 compensates by adding 1 to the odd half cycle DAC setting and subtracting 1 from the even half cycle DAC setting. If the value of HBOBL is negative, a block 853 compensates in the opposite manner. This procedure, performed after each weld, tends to maintain the minimum amount of alternating component in the resistance data.

A block 855 examines the difference between the maximum (HMAX) and the minimum (HMIN) average value of the resistance data from the previous weld. If the difference is less than 180 and more than 65 counts, the clock rate is satisfactory and control transfers to a block 858. If the difference is less than 65, the clock rate is doubled by a block 856 to provide greater resolution. If the difference is greater than 180, the clock rate is halved in a decision block 857 to lessen the danger of counter overflow (maximum counter capacity is 255 counts).

Block 858 examines the value of HMAX and, in conjunction with a block 859, adjusts both the odd and even DAC settings to cause the values of HMAX to range between −19 and −50. Thus, when properly adjusted, all resistance values will tend to be negative in value with the peak resistance (HMAX), the least negative. This has the effect of causing the model circuit to always extinguish slightly earlier than the actual welder current. Any changes in the line voltage waveform caused by the extinction of current in the welder are, thus, prevented from influencing the model.

The remaining portion of the TCHUP subroutine 850, starting with a decision block 860, performs the dynamic stepper function. Block 860 transfers control to a block 861, if the dynamic stepper feature is on; if not, control is transferred to a block 875 which returns to the calling program. Block 861 determines if the previous weld was stopped under feedback control before, during or after an internally-calculated threshold interval.

The threshold interval is equal to the central two quarters of the difference in cycles between the minimum time (location 18, 28 or 38) and the maximum time (location 14, 24 or 34). Ftr example, if the minimum time is set to 9 cycles and the maximum time is set to 18 cycles, the threshold interval is the cycles 12, 13, 14 and 15. Welds terminating within the threshold interval are considered to have been made with a satisfactory current level and no adjustment is warranted. Thus, block 861 transfers control directly to a block 864. If the weld terminates prior to the minimum of the threshold interval (cycle 12, in this case), the current is assumed to be excessive. Similarly, if the weld terminates after the maximum of the threshold interval (cycle 15, in this case), the current is assumed to be insufficient. Blocks 862 and 863 add 1 or subtract 1 from a stepper counter D, depending on whether the current is considered insufficient or excessive. The decision block 864 evaluates the contents of the D counter with respect to the value programmed as the stepper gain SG, (location 43) via the sequence panel 700. If the D counter equals or exceeds the stepper gain SG (taken as a positive number), the current for the next weld is increased by 1% by the block 866. If the D counter is equal to or less than the stepper gain (taken as a negative number), the current for the next weld will be reduced by 1% by a block 865. If the D counter value lies between the points defined by the positive and negative of the stepper gain SG, no change in current is made and control passes directly to a block 867. The effect of the blocks 861 through 866 is to require a trend to persevere over several welds (as determined by the stepper gain SG setting) before a change in the weld current is made.

Decision block 867 compares the newly calculated current value with the minimum preprogrammed value. If the new current is less than the minimum value, a block 868 forces the new current value to the minimum value. If the new current is greater than the maximum value allowed, a block 870 forces the new current value to the maximum value.

Figure 22B:
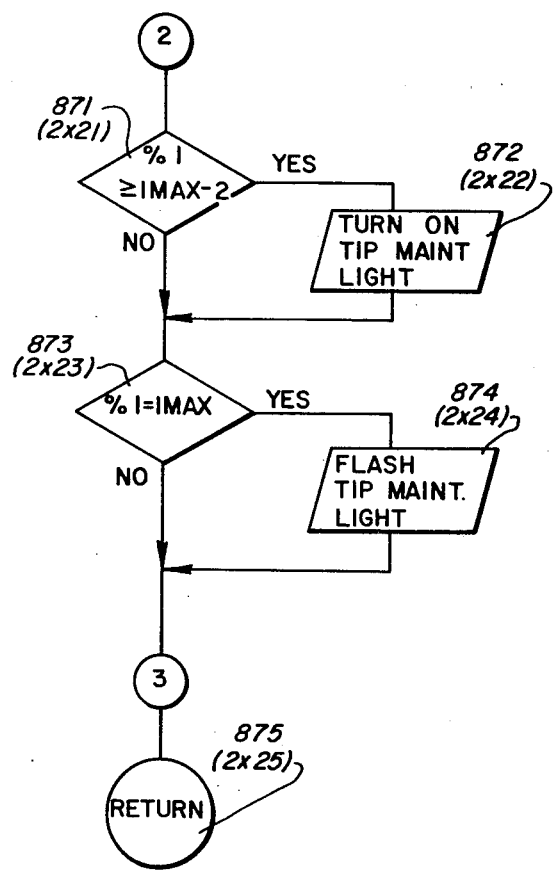

Blocks 871 through 874 in FIG. 22B control the tip maintenance light output, a feature common to the '724 patent welder control. Blocks 871 and 872 turn on the tip maintenance output if the current is within 2% of the maximum value. Blocks 872 and 874 set the tip maintenance output to the flashing mode when the current equals the maximum value. Finally, block 875 returns control to the calling program.

A filter subroutine (HFILTR) 880, FIG. 23, conditions the resistance data by passing it through a group of low pass digital filters to minimize the influence of spurious data. In addition, the subroutine HFILTR 880 saves the minimum and maximum values of filtered data and calculates a value of the alternating component in the data for subsequent use by other subroutines. Also, the HFILTR 880 takes the discrete time derivative of the filtered resistance data for use in the detection of peaks and valleys in the STCR subroutine 800.

Decision block 881 bypasses the functional part of the subroutine HFILTER 880 early in the weld before at least two valid data samples have then received. A block 886 clears the filter outputs and returns control to the calling program via a block 893. Block 881 transfers control to a block 882 after at least two valid resistance samples have been received (the data from half cycle one of the first pulse is considered invalid while the data from half cycle one of the second pulse of a dual pulse weld is considered valid).

Decision block 882 transfers control to a block 885 to clear the maximum (HMAX), the minimum (HMIN), and the bobble accumulator (HBOBL) on the first pass. Subsequently, block 882 transfers control to a block 883, an internal subroutine HFA which forms the average value of the resistance data from this half cycle and the data from the previous half cycle (this is a low pass digital filter with a cutoff frequency of 30 Hz for a 60 Hz welder). The average filter output called H1 is used by a block 884 to select the maximum and minimum values during a weld. The maximum value of H1 found in a weld is stored in HMAX and the minimum value of H1 is stored in HMIN. Block 884 also calculates a measure of the alternating component of the resistance values. It accomplishes this by adding the unfiltered resistance values resulting from even numbered half cycles to an accumulator called HBOBL and subtracting the unfiltered resistance values resulting from odd numbered half cycle from the accumulator HBOBL. The effect of this action is such that if there a small alternating component in the unfiltered resistance data, HBOBL at the end of a weld will be close to zero. If the unfiltered resistance values from the even half cycles tends to be larger than from the odd half cycles, the value accumulated in HBOBL will be a large positive number. If the data from the odd half cycles is larger, HBOBL will be a large negative number. The value of HBOBL is subsequently used in the TCHUP subroutine to help maintain proper model adjustment.

A selector block 887 selects a low pass digital filter based on the value of the weld pulse half cycle counter, WHC. The action of the selector block 887 is to progressively select digital filters with lower cutoff frequencies until a filter with a cutoff frequency of approximately 11 Hz is finally selected. This procedure results in improved transient response at the beginning of each weld pulse along with a low cutoff frequency later in the weld pulse. Five finite impulse response (FIR), linear phase filters are used. Transition errors between the filters are minimized by the selector block 887 selecting an averaging block such as 890 to develop the average output of the two filters on either side of the block 890. Thus the filter selection process proceeds as follows: for WHC less than or equal to 2, no filter is selected and the output HOUT block 888 is zeroed. For WHC equal to 3, filter H1 block 889 the adjacent pair average filter is selected. When WHC equals 4, both the H1 and H2 filters are selected and the average value of the two filters becomes the output HOUT block 890. When WHC equals 5, only the H2 filter is selected (cutoff frequency of 21.5 Hz) to compute the output HOUT block 890. Proceeding on to WHC equal to 6 both the H2 and H3 filters are selected and averaged too for HOUT. In this manner, a smooth progression of filters with lower and lower cutoff frequencies is used to process the resistance data. When WHC equals or exceeds 11, the H5 filter 891 is used exclusively to generate HOUT.

A block 892 stores all data from a weld in three tables located in memory. The actual unfiltered resistance data is stored in the table called HRTBL. The averaged data H1 and the selectively filtered data HOUT are stored in tables called HATBL and HFTBL respectively. In addition, the block 892 forms the discrete time differences (analogous to derivative in the continuous case) in the values of HOUT. These values now called the derivatives are retained only for the current and the previous half cycle and are referred to as WDIR and WDIRL respectively. Exit from this subroutine is then made via the block 893. A fast adjust subroutine (ESET) 900 shown in FIG. 24, is used to rapidly adjust the model circuit to match the actual welder load. It accomplishes this by a procedure which uses data from each half cycle of a series of short test weld pulses while in the adjust mode.

Referring to FIG. 24, a block 901 transfers control to blocks 902, 903, and 904 on the first pass through in the adjust mode. Block 902 sets both the odd and even half cycle DAC settings to a median value corresponding to a power factor of about 0.64. The convergence counters for both the even and odd half cycles are set to a small positive number in the block 903 and finally the block 904 sets the clock rate to 250 Khz.

Next, a block 905 transfers control to a block 913 if the presently available resistance value is from the first half cycle of a test weld pulse. This data is not used as a basis for adjustment. A decision block 906 bypasses further adjustment if the model adjustment process has already converged as evidenced by the EPASS flag (this flag is set in a block 912). Adjustment on this half cycle is skipped by a decision block 907 if the model is still conducting from the previous half cycle. This indicates a model power factor much less than the actual welder power factor. When a previous half cycle is found to still be conducting or running on, the action of block 907 is to allow only adjustment on every other half cycle until it no longer runs on and interferes with the next half cycle. Then adjustment proceeds on both half cycles.

A decision block 908 checks the present resistance data for values within limits indicating satisfactory adjustment of the model. If the value of resistance data is found to be outside of the acceptance limits, control transfers to block a 909. The function of the block 909 is to calculate the new odd or even DAC setting using the value of resistance from the previous odd or even half cycle. The calculation carries out the following equation;

$$NDAC = OLDAC + (RES + OFFSET) A.$$

Where NDAC is the new DAC value, OLDAC is the previous DAC value, RES is the measured resistance value and offset is a constant used to force convergence to some desired final value. The variable A is an integer between 1 and 4 selected on the basis of the OLDAC value and is used to make the effective open loop gain of the adjustment feedback loop approximately equal to 1 for the fastest possible convergence. Block 909 when completed, transfers control to the block 913 which returns to the calling program.

Returning to block 908, if the present value of resistance is found to be within the limits of acceptance; control is transferred to block 910. In block 910 the odd or even convergence counter is decremented by 1 and control is passed to block a 911. The block 911 tests the value of both the odd and the even convergence counters and if both are found to be decremented to negative values, the adjustment process is complete and control passes to the block 912. Only if both odd and even half cycle convergence counters have not been decremented to negative values, control passes to the block 913 to return to the calling program and ultimately for further repeated passes through the ESET subroutine. The block 912 sets the converged flag EPASS to FF indicating that adjustment is satisfactorily completed. This action will terminate the adjust mode and cause the control to revert to the normal welding mode. Finally, block 912 sets the clock rate to 1 Mhz and transfers control to the block 913 to return to the calling program.

Turning now to FIG. 14, FIG. 14 shows the reference voltage 78 and half cycles of current conduction 79. Moreover, the drawing shows when events occur during the welding period with reference to these waveforms. For instance, the typical half cycle of current conduction lasts approximately a minimum of four milliseconds to 8.33 milliseconds depending upon the weld heat desired. EREAD, where the counter is read, occurs just before the gate pulse signal to fire the SCR happens. KSTOP is sequenced before one millisecond elapses after the GP signal. ESET is issued during the gap time between half cycles of current conduction and so forth.

While certain preferred embodiments of the invention have been specifically disclosed, it is understood that the invention is not limited thereto, as many variations will be readily apparent to those skilled in the art, and the invention is to be given its broadest possible interpretation within the terms of the following claims:

We Claim:

1. A control system for controlling the quality of a weld as formed in a resistive welding apparatus wherein the apparatus includes a pair of welding electrodes engagable with workpieces to be welded together and connectable through a means to an AC source for energizing the electrodes with alternating polarity half cycles of welding current comprising:
   means providing a weld signal indicative of the actual welding current through the electrodes and workpieces;
   means providing a model signal indicative of a simulated welding current through the electrodes when workpieces are absent and the electrodes, are engaging each other;
   and means responsive to a selected difference between the weld signal and the model signal for terminating the welding current when the difference satisfies a preselected criteria.

2. In a control system for controlling the quality of a weld in a resistive welding apparatus including a pair of welding electrodes that are engagable with workpieces to be welded together and connectable to an AC source for energizing the electrodes with alternating polarity half cycles of welding current the combination comprising:
   means providing a model simulative of a welding current through the electrodes when work pieces are absent from a position between the electrodes and a model signal indicative of an instant when each half cycle of the simulated model welding current is extinguished,
   means providing a weld signal indicative of the actual welding current through the electrodes and the workpieces and the instant when each half cycle of welding current is extinguished,
   and means for measuring intervals between the model signal and the weld signal and interrupting the welding current when a measured interval is at least equal to a preselected value.

3. A control system for controlling the quality of a weld in a resistance welding apparatus with the apparatus including a pair of welding electrodes that are engagable with workpieces to be welded together and a welding transformer having a secondary winding connected to the electrodes and a primary winding connectible to an AC source for energizing the primary and the secondary windings with alternating polarity half cycles of welding current comprising:
   means providing a model signal simulative of alternating polarity half cycles of a simulated welding current through the electrodes when workpieces are absent from a position between the electrodes and indicative of the instant when each half cycle of the model signal is extinguished;
   means providing a weld signal indicative of the actual welding current through the electrodes and the workpieces and the instant when each half cycle of actual welding current is extinguished; and
   means for measuring an interval between the model signal and the weld signal and interrupting the energizing circuit between the source and the primary winding when the interval is at least equal to a preselected value.

4. The control system as recited in claim 3 wherein the primary winding is connected to the source by a pair of solid state switches connected in inverse parallel and the signal indicative of the welding current is provided by a means connected across the switches.

5. The control system as recited in claim 4 wherein the means for providing a model of the welding current and the model signals includes a solid state switch that is switched to a conductive state concurrently with the switching of the inverse connected solid state switches to a conductive state.

6. The control system as recited in claim 3 wherein the means providing the model of the welding current, the means providing the weld signal, the means for measuring the time difference between the model signal and the actual weld signals and the means for interrupting the energizing circuit are controlled by a microprocessor.

7. A control system for controlling the quality of a weld in a resistance welding apparatus with the apparatus including a pair of welding electrodes that are engagable with workpieces to be welded together and a welding transformer having a secondary winding connected to the electrodes and a primary winding connectible to an AC source for energizing the primary and the secondary winding with alternating polarity half cycles of actual welding current comprising:

means providing a model indicative of a welding current through the electrodes when workpieces are absent from a position between the electrodes and a model signal indicative of the instant when each half cycle of the simulated welding current is extinguished;

means providing a weld signal indicative of the actual welding current through the electrodes and the workpieces and the instant when each half cycle of the welding current is extinguished;

means for measuring a time difference between the model signal and the weld signal during a half cycle when the value of the time difference between the signals is minimum and storing the value of the minimum difference; and means for interrupting the actual welding current when the difference between the minimum difference value and a signal indicative of the difference between the model signal and the actual weld signal during a half cycle subsequent to the half cycle producing the minimum difference value is greater than or equal to a preprogrammed value.

8. A method of controlling the quality of a weld as the weld is formed by a resistive welder apparatus having a welding transformer including a secondary winding connected in a circuit to a pair of electrodes engagable with workpieces that are to be welded together and a primary winding connectable to an alternating current source for energizing the primary and the secondary windings with alternating polarity half cycles of welding current comprising:

sensing the instant of extinction of each half cycle of weld current pulses through the workpieces and generating a signal indicative of the instants of extinction;

simulating the electrical characteristics of the secondary winding circuit excluding the workpieces by a modeling circuit that is connected to the AC source to generate a model signal that is indicative of the instants simulated weld current pulses are extinguished in the simulated secondary winding circuit, determining the order of occurence of the weld current signal and the model signal and generating and accumulating counted clock pulses that are indicative of the duration of the interval between the signals, programming a memory with preselected count values indicative of a quality weld for comparison with the counted pulses, and terminating the weld current pulses when the accumulated counted pulses equals the preselected value.

9. A control system for controlling the quality of a weld in a resistance welding apparatus with the apparatus including a pair of welding electrodes and a welding transformer having a secondary winding connected in a circuit with the electrodes and a primary winding connectable to an AC source for energizing the primary and the secondary winding with alternating polarity half cycles of welding current comprising:

means providing a model of a simulated welding current in the primary winding when workpieces are absent from a position between the electrodes and a signal indicative of the power factor of the model during each half cycle of the simulated welding current;

means providing a weld signal indicative of the power factor of the actual welding current in the primary winding when workpieces are present between the electrodes;

means for measuring a time difference between the power factors of the model and the weld signal during a half cycle when the value of the difference between the signals is minimum and storing the value of the minimum difference; and means for interrupting the welding current in the primary winding when the difference between the minimum difference value and a signal indicative of the difference between the power factor of the model and the power factor of the weld signal during a half cycle subsequent to the half cycle producing the minimum difference value is greater than or equal to a preprogrammed value.

* * * * *